US012552656B2

(12) United States Patent
Hayakawa

(10) Patent No.: US 12,552,656 B2
(45) Date of Patent: Feb. 17, 2026

(54) CONTENT-FILLING SYSTEM AND STERILIZING METHOD

(71) Applicant: DAI NIPPON PRINTING CO., LTD., Tokyo (JP)

(72) Inventor: Atsushi Hayakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 18/627,650

(22) Filed: Apr. 5, 2024

(65) Prior Publication Data

US 2024/0270557 A1 Aug. 15, 2024

Related U.S. Application Data

(63) Continuation of application No. PCT/JP2022/038387, filed on Oct. 14, 2022.

(30) Foreign Application Priority Data

Oct. 14, 2021 (JP) .................................. 2021-169183

(51) Int. Cl.
  B67C 7/00 (2006.01)
  B67C 3/00 (2006.01)
  B67C 3/20 (2006.01)

(52) U.S. Cl.
  CPC .............. *B67C 7/004* (2013.01); *B67C 3/001* (2013.01); *B67C 3/007* (2013.01); *B67C 3/208* (2013.01); *B67C 2007/006* (2013.01)

(58) Field of Classification Search
  CPC ......... B67C 7/004; B67C 3/001; B67C 3/007; B67C 3/208; B67C 2007/006;
  (Continued)

(56) References Cited

U.S. PATENT DOCUMENTS 5,376,281 A 12/1994 Safta
5,512,178 A 4/1996 Dempo
(Continued)

FOREIGN PATENT DOCUMENTS

CN 107792974 A 3/2018
EP 0 558 790 A1 9/1993
(Continued)

OTHER PUBLICATIONS

Japanese Office Action (Application No. 2024-072908) dated Jun. 7, 2024 (with English translation) (7 pages).
(Continued)

*Primary Examiner* — Jacob A Smith
(74) *Attorney, Agent, or Firm* — BURR PATENT LAW, PLLC

(57) ABSTRACT

A content-filling system (10) includes a water sterilization line (50) that sterilizes water, an undiluted-solution sterilization line (70) that sterilizes a product undiluted solution, a water-filling device (21) that is connected to the water sterilization line (50) and is disposed in a first sterile chamber (70*f*), an undiluted-solution-filling device (22) that is connected to the undiluted-solution sterilization line (70) and is disposed in a second sterile chamber (70*h*), and a control unit (90) that controls the water-filling device (21) and the undiluted-solution-filling device (22). The control unit (90) causes the inside of the second sterile chamber (70*h*) to be cleaned with the inside of the first sterile chamber (70*f*) kept sterile. The control unit (90) causes the inside of the second sterile chamber (70*h*) to be sterilized with the inside of the first sterile chamber (70*f*) kept sterile.

17 Claims, 26 Drawing Sheets

(58) Field of Classification Search
CPC .......... B67C 7/0073; B67C 2003/227; B67C 2003/228; B67C 3/005; B67C 7/00
USPC .................................................. 53/426, 425
See application file for complete search history.

(56) References Cited

U.S. PATENT DOCUMENTS

| | | | |
|---|---|---|---|
| 6,475,435 B1 * | 11/2002 | Taggart | B67C 7/0073 53/425 |
| 7,683,354 B2 | 3/2010 | Girodet et al. | |
| 2003/0094406 A1 | 5/2003 | Smith | |
| 2004/0208781 A1 | 10/2004 | Hayashi et al. | |
| 2010/0170867 A1 | 7/2010 | Hayakawa | |
| 2011/0094616 A1 | 4/2011 | Hayakawa et al. | |
| 2016/0185584 A1 | 6/2016 | Hayakawa et al. | |
| 2017/0341791 A1 | 11/2017 | Weiler et al. | |
| 2018/0257039 A1 | 9/2018 | Giglia et al. | |
| 2018/0334372 A1 * | 11/2018 | Hayakawa | B67C 7/00 |
| 2019/0002136 A1 | 1/2019 | Bomgaars et al. | |
| 2019/0276166 A1 | 9/2019 | Nishino et al. | |
| 2019/0375622 A1 | 12/2019 | Hayakawa | |
| 2020/0268917 A1 | 8/2020 | Hayakawa | |
| 2020/0277178 A1 | 9/2020 | Hayakawa et al. | |
| 2020/0297000 A1 | 9/2020 | Wang et al. | |
| 2021/0261397 A1 | 8/2021 | Hayakawa | |
| 2021/0269298 A1 | 9/2021 | Hayakawa et al. | |
| 2022/0127125 A1 | 4/2022 | Hayakawa et al. | |
| 2024/0059541 A1 | 2/2024 | Hayakawa et al. | |

FOREIGN PATENT DOCUMENTS

| | | |
|---|---|---|
| JP | S62-287888 A | 12/1987 |
| JP | H02-095491 A | 4/1990 |
| JP | H05-229595 A | 9/1993 |
| JP | H05-293469 A | 11/1993 |
| JP | H05-305298 A | 11/1993 |
| JP | H07-285505 A | 10/1995 |
| JP | H09-066905 A | 3/1997 |
| JP | H11-277061 A | 10/1999 |
| JP | 2001-204439 A | 7/2001 |
| JP | 2001-259394 A | 9/2001 |
| JP | 2004-018496 A | 1/2004 |
| JP | 2005-131559 A | 5/2005 |
| JP | 2006-062660 A | 3/2006 |
| JP | 2006-116536 A | 5/2006 |
| JP | 4526820 B2 | 8/2010 |
| JP | 2012-187037 A | 10/2012 |
| JP | 2013-095504 A | 5/2013 |
| JP | 2014-103893 A | 6/2014 |
| JP | 2015-034013 A | 2/2015 |
| JP | 2015-202897 A | 11/2015 |
| JP | 2017-070255 A | 4/2017 |
| JP | 2018-012102 A | 1/2018 |
| JP | 2018-500246 A | 1/2018 |
| JP | 2018-122044 A | 8/2018 |
| JP | 2018-203340 A | 12/2018 |
| JP | 2019-501375 A | 1/2019 |
| JP | 2019-505168 A | 2/2019 |
| JP | 2019-508325 A | 3/2019 |
| JP | 2019-172377 A | 10/2019 |
| JP | 2019-206366 A | 12/2019 |
| JP | 2020-111369 A | 7/2020 |
| JP | 2020-116294 A | 8/2020 |
| JP | 2020-138802 A | 9/2020 |
| JP | 2020-183233 A | 11/2020 |
| JP | 2021-013769 A | 2/2021 |
| JP | 2021-031066 A | 3/2021 |
| JP | 2021-080028 A | 5/2021 |
| JP | 7022247 B1 | 2/2022 |
| JP | 2023-129481 A | 9/2023 |
| JP | 2023-175962 A | 12/2023 |
| KR | 10-2021-0102081 A | 8/2021 |
| WO | 2013/094587 A1 | 6/2013 |
| WO | 2014/098058 A1 | 6/2014 |
| WO | 2018/052048 A1 | 3/2018 |
| WO | 2019/069967 A1 | 4/2019 |
| WO | 2019/111994 A1 | 6/2019 |

OTHER PUBLICATIONS

U.S. Office Action dated Aug. 6, 2025 (U.S. Appl. No. 18/455,710).
Anonymous: "*UV Medium-Pressure Lamps*," Jun. 22, 2021 (Jun. 22, 2021), XP093185634, Online, Retrieved from the Internet: Jul. 15, 2024. URL:https://www.heraeus.com/en/hng/products_and_solutions/uv_lamps_and_systems/uv_lamps/uv_medium_pressure_lamps/ uv_medium_pressure_lamps.html#tabs-43875-4.
European Office Action dated Jul. 18, 2024 (Application No. 22881115.4).
Japanese Office Action (with English translation) dated Aug. 29, 2025 (Application No. 2025-136587).
Japanese Decision of Dismissal of Amendment (with English translation) dated Sep. 3, 2024 (Application No. 2024-072803).
Japanese Decision of Refusal (with English translation) dated Sep. 3, 2024 (Application No. 2024-072803).
Japanese Decision of Dismissal of Amendment (with English translation) dated Sep. 3, 2024 (Application No. 2024-072889).
Japanese Decision of Refusal (with English translation) dated Sep. 3, 2024 (Application No. 2024-072889).
Japanese Office Action (Application No. 2024-209775) dated Aug. 26, 2025 (with English translation) (9 pages).
U.S. Appl. No. 18/455,710, filed Aug. 25, 2023, Hayakawa, Atsushi.
U.S. Appl. No. 18/455,736, filed Aug. 25, 2023, Hayakawa, Atsushi.
U.S. Appl. No. 18/629,066, filed Apr. 8, 2024, Hayakawa, Atsushi.
English translation of the International Preliminary Report on Patentability (Chapter I) dated Apr. 25, 2024 (Application No. PCT/JP2022/038387).
English translation of the International Preliminary Report on Patentability (Chapter I) dated Apr. 25, 2024 (Application No. PCT/JP2022/038385).
English translation of the International Preliminary Report on Patentability (Chapter I) dated Apr. 25, 2024 (Application No. PCT/JP2022/038386).
English translation of the International Preliminary Report on Patentability (Chapter I) dated Apr. 25, 2024 (Application No. PCT/JP2022/038388).
International Search Report and Written Opinion (Application No. PCT/JP2022/038387) dated Dec. 6, 2022 (8 pages).
Japanese Office Action (Application No. 2022-109308) dated Sep. 30, 2022 (with English translation) (7 pages).
Japanese Office Action (Application No. 2022-110782) dated Oct. 11, 2022 (with English translation) (5 pages).
Japanese Office Action (Application No. 2022-122232) dated Dec. 2, 2022 (with English translation) (6 pages).
Japanese Office Action (Application No. 2022-109308) dated Feb. 3, 2023 (with English translation) (4 pages).
Japanese Office Action (Application No. 2022-110782) dated Feb. 14, 2023 (with English translation) (6 pages).
Japanese Office Action (Application No. 2023-013595) dated Feb. 17, 2023 (with English translation) (5 pages).
Japanese Office Action (Application No. 2023-013608) dated Feb. 17, 2023 (with English translation) (5 pages).
Japanese Office Action (Application No. 2023-013558) dated Feb. 24, 2023 (with English translation) (6 pages).
Japanese Office Action (Application No. 2023-013558) dated Apr. 7, 2023 (with English translation) (6 pages).
Japanese Office Action (Application No. 2023-013558) dated May 19, 2023 (with English translation) (5 pages).
Japanese Office Action (Application No. 2023-115396) dated Aug. 1, 2023 (with English translation) (5 pages).
Japanese Office Action (Application No. 2023-115416) dated Aug. 1, 2023 (with English translation) (5 pages).
Extended European Search Report (Application No. 22881115.4) dated Dec. 6, 2023 (8 pages).
Japanese Office Action (Application No. 2023-174502) dated Jan. 19, 2024 (with English translation) (9 pages).

(56) References Cited

OTHER PUBLICATIONS

Japanese Office Action (Application No. 2022-190672) dated Jan. 30, 2024 (with English translation) (9 pages).
International Search Report and Written Opinion (Application No. PCT/JP2022/038385) dated Dec. 13, 2022 (11 pages).
International Search Report and Written Opinion (Application No. PCT/JP2022/038386) dated Dec. 13, 2022 (8 pages).
Japanese Office Action (Application No. 2024-072803) dated May 31, 2024 (with English translation) (7 pages).
Japanese Office Action (Application No. 2024-072832) dated May 31, 2024 (with English translation) (6 pages).
Japanese Office Action (Application No. 2024-072889) dated May 31, 2024 (with English translation) (7 pages).
Extended European Search Report dated Sep. 25, 2025 (Application No. 22881116.2).
Extended European Search Report dated Sep. 25, 2025 (Application No. 22881117.0).
Japanese Office Action (Application No. 2024-209775) dated Dec. 19, 2025 (with English translation) (13 pages).
U.S. Office Action (U.S. Appl. No. 18/455,736) dated Jan. 8, 2026 (14 pages).

\* cited by examiner

CONTENT-FILLING SYSTEM AND STERILIZING METHOD

TECHNICAL FIELD

The present disclosure relates to a content-filling system and a sterilizing method.

BACKGROUND ART

A known sterile filling system (an Aseptic filling system) fills a sterilized content in a sterilized container (a PET bottle) in a sterile environment and subsequently caps the container by using a cap (see, for example, Patent Document 1).

Specifically, as for the sterile filling system, a molded container is supplied to the sterile filling system, a hydrogen peroxide solution that serves as a sterilizing agent is sprayed to the container in the sterile filling system. Subsequently, the hydrogen peroxide solution is dried, and the container is consequently sterilized. Subsequently, the content is sterilely filled in the container.

In recent years, there has been a need to decrease the amount of discharged carbon dioxide in order to decrease an environmental load.

CITATION LIST

Patent Literature

PATENT DOCUMENT 1: Japanese Patent No. 4526820

The present disclosure has been accomplished in view of these matters, and it is an object of the present disclosure to provide a content-filling system and a sterilizing method that enable the amount of discharged carbon dioxide to be decreased.

SUMMARY OF INVENTION

According to a first aspect of the present disclosure, a content-filling system includes a water sterilization line that sterilizes water, an undiluted-solution sterilization line that sterilizes a product undiluted solution, a water-filling device that is connected to the water sterilization line and is disposed in a first sterile chamber, an undiluted-solution-filling device that is connected to the undiluted-solution sterilization line and is disposed in a second sterile chamber, and a control unit that controls the water-filling device and the undiluted-solution-filling device. The control unit causes the inside of the second sterile chamber to be cleaned with the inside of the first sterile chamber kept sterile. The control unit causes the inside of the second sterile chamber to be sterilized with the inside of the first sterile chamber kept sterile.

According to a second aspect of the present disclosure, a content-filling system includes a water sterilization line that sterilizes water, an undiluted-solution sterilization line that sterilizes a product undiluted solution, a water-filling device that is connected to the water sterilization line and is disposed in a first sterile chamber, an undiluted-solution-filling device that is connected to the undiluted-solution sterilization line and is disposed in a second sterile chamber, and a control unit that controls the water-filling device and the undiluted-solution-filling device. The control unit causes the undiluted-solution-filling device to be cleaned with the inside of the first sterile chamber kept sterile. The control unit causes the undiluted-solution-filling device to be sterilized with the inside of the first sterile chamber kept sterile.

According to a third aspect of the present disclosure, as for the content-filling system according to the first aspect described above or the second aspect described above, the pressure in the first sterile chamber may be higher than the pressure in the second sterile chamber.

According to a fourth aspect of the present disclosure, as for the content-filling system according to any one of the first aspect described above to the third aspect described above, when the inside of the second sterile chamber is cleaned and sterilized, the pressure in the first sterile chamber may be 40 Pa or more and 100 Pa or less, and the pressure in the second sterile chamber may be 0 Pa or more and 20 Pa or less.

According to a fifth aspect of the present disclosure, as for the content-filling system according to any one of the first aspect described above to the fourth aspect described above, when the undiluted-solution-filling device is cleaned and sterilized, the pressure in the first sterile chamber may be 40 Pa or more and 100 Pa or less, and the pressure in the second sterile chamber may be 0 Pa or more and 20 Pa or less.

According to a sixth aspect of the present disclosure, as for the content-filling system according to any one of the first aspect described above to the fifth aspect described above, a third sterile chamber that couples the first sterile chamber and the second sterile chamber with each other may be disposed between the first sterile chamber and the second sterile chamber, and the pressure in the third sterile chamber may be lower than the pressure in the first sterile chamber and equal to or more than the pressure in the second sterile chamber.

According to a seventh aspect of the present disclosure, as for the content-filling system according to the sixth aspect described above, when the inside of the second sterile chamber is cleaned and sterilized, the pressure in the third sterile chamber may be 10 Pa or more and 40 Pa or less.

According to an eighth aspect of the present disclosure, as for the content-filling system according to the sixth aspect described above or the seventh aspect described above, when the undiluted-solution-filling device is cleaned and sterilized, the pressure in the third sterile chamber may be 10 Pa or more and 40 Pa or less.

According to a ninth aspect of the present disclosure, as for the content-filling system according to any one of the first aspect described above to the eighth aspect described above, a fourth sterile chamber may be disposed upstream of the first sterile chamber, and the pressure in the fourth sterile chamber may be equal to or lower than the pressure in the first sterile chamber.

According to a tenth aspect of the present disclosure, as for the content-filling system according to the ninth aspect described above, when the inside of the second sterile chamber is cleaned and sterilized, the pressure in the fourth sterile chamber may be 10 Pa or more and 40 Pa or less.

According to an eleventh aspect of the present disclosure, as for the content-filling system according to the ninth aspect described above or the tenth aspect described above, when the undiluted-solution-filling device is cleaned and sterilized, the pressure in the fourth sterile chamber may be 10 Pa or more and 40 Pa or less.

According to a twelfth aspect of the present disclosure, as for the content-filling system according to any one of the first aspect described above to the eleventh aspect described above, a bypass line that connects the water sterilization line and the second sterile chamber to each other may be disposed at the water sterilization line.

According to a thirteenth aspect of the present disclosure, as for the content-filling system according to the twelfth aspect described above, when the inside of the second sterile chamber is cleaned, the control unit may cause the water that is sterilized by the water sterilization line to be supplied to the second sterile chamber via the bypass line.

According to a fourteenth aspect of the present disclosure, as for the content-filling system according to the twelfth aspect described above or the thirteenth aspect described above, when the undiluted-solution-filling device is cleaned, the control unit may cause the water that is sterilized by the water sterilization line to be supplied to the second sterile chamber via the bypass line.

According to a fifteenth aspect of the present disclosure, as for the content-filling system according to any one of the first aspect described above to the fourteenth aspect described above, the control unit may determine the amount of the water that is used to clean and sterilize the content-filling system and may determine the amount of the water that is sterilized by the water sterilization line while the product bottles are manufactured, based on the determined amount of the water.

According to a sixteenth aspect of the present disclosure, a sterilizing method of sterilizing a content-filling system, the content-filling system includes a water sterilization line that sterilizes water, an undiluted-solution sterilization line that sterilizes a product undiluted solution, a water-filling device that is connected to the water sterilization line and is disposed in a first sterile chamber, and an undiluted-solution-filling device that is connected to the undiluted-solution sterilization line and is disposed in a second sterile chamber. The sterilizing method includes a step of cleaning the inside of the second sterile chamber with the inside of the first sterile chamber kept sterile, and a step of sterilizing the inside of the second sterile chamber with the inside of the first sterile chamber kept sterile.

According to a seventeenth aspect of the present disclosure, a sterilizing method of sterilizing a content-filling system, the content-filling system includes a water sterilization line that sterilizes water, an undiluted-solution sterilization line that sterilizes a product undiluted solution, a water-filling device that is connected to the water sterilization line and is disposed in a first sterile chamber, and an undiluted-solution-filling device that is connected to the undiluted-solution sterilization line and is disposed in a second sterile chamber. The sterilizing method includes a step of cleaning the undiluted-solution-filling device with the inside of the first sterile chamber kept sterile, and a step of sterilizing the undiluted-solution-filling device with the inside of the first sterile chamber kept sterile.

According to the present disclosure, the amount of carbon dioxide that is discharged by a content-filling system can be decreased.

DESCRIPTION OF EMBODIMENTS

Embodiments of the present invention will hereinafter be described with reference to the drawings. FIG. 1 to FIG. 10B illustrate an embodiment of the present invention.
(Content-Filling System)

A content-filling system (a sterile filling system) according to the embodiment will now be described with reference to FIG. 1.

Figure 1:
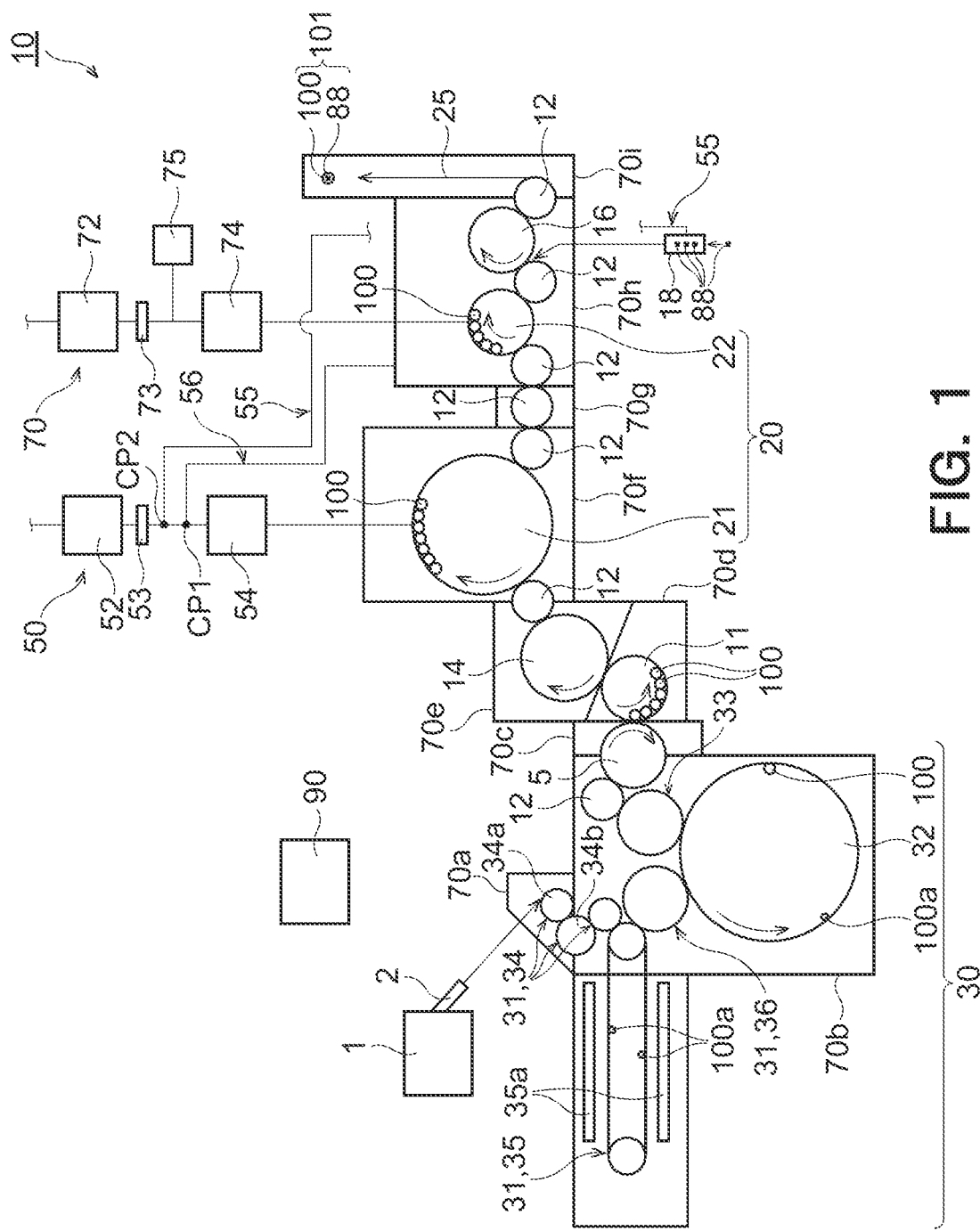
FIG. 1 schematically illustrates a plan view of a content-filling system according to an embodiment.

A content-filling system 10 illustrated in FIG. 1 fills a content such as a beverage in bottles (containers) 100. The content can be manufactured by diluting a product undiluted solution with water. In this case, the product undiluted solution may be diluted with the water by a factor of 1.1 or more and 100 or less and is preferably diluted by a factor of 2 or more and 10 or less. The product undiluted solution may be diluted with the water by a factor of 10 or more and 80 or less, diluted by a factor of 20 or more and 70 or less, or diluted by a factor of 30 or more and 50 or less. The bottles 100 can be manufactured in a manner in which preforms 100a that are manufactured by injection-molding a synthetic resin material are molded by biaxial stretching blow molding. The bottles 100 may be manufactured by direct blow molding. A thermoplastic resin, particularly, PE (polyethylene), PP (polypropylene), PET (polyethylene terephthalate), or PEN (polyethylene naphthalate) is preferably used as the materials of the bottles 100. Other than these, the containers may be glass, can, paper, pouch, or cup containers, or composite containers thereof. In an example described according to the present embodiment, the containers are synthetic resin bottles.

As illustrated in FIG. 1, the content-filling system 10 includes a water sterilization line 50 that sterilizes the water, an undiluted-solution sterilization line 70 that sterilizes the product undiluted solution, and a filling device (a filler) 20 that is connected to the water sterilization line 50 and the undiluted-solution sterilization line 70. The content-filling system 10 further includes a control unit 90 that controls the filling device 20. The content-filling system 10 further includes a bottle-molding unit 30, a sterilizing device (a container-sterilizing device) 11, an air-rinsing device 14, the filling device 20 described above, a cap-mounting device (a capper, a seamer, and a capping machine) 16, and a product-bottle-unloading unit 25. The bottle-molding unit 30, the sterilizing device 11, the air-rinsing device 14, the filling device 20, the cap-mounting device 16, and the product-bottle-unloading unit 25 are arranged in this order from an upstream position to a downstream position in a direction in which the bottles 100 are conveyed. Multiple conveyance wheels 12 that are disposed, for example, between the air-rinsing device 14 and the filling device 20 and between the filling device 20 and the cap-mounting device 16 convey the bottles 100 therebetween. The bottle-molding unit 30, the sterilizing device 11, the air-rinsing device 14, the filling device 20, the cap-mounting device 16, and the product-bottle-unloading unit 25 will now be described.

The bottle-molding unit 30 receives the preforms 100a from the outside and molds the bottles 100. The bottle-molding unit 30 conveys the bottles 100 that are molded toward the sterilizing device 11. This enables a process of supplying the preforms 100a, a process of molding the bottles 100, a process of filling the content in the bottles 100, and a process of capping to be continuously performed at the content-filling system 10. In this case, instead of the bottles 100 that have a large volume, the preforms 100a that have a small volume are conveyed from the outside to the content-filling system 10. For this reason, conveyance costs can be reduced.

The bottle-molding unit 30 includes a preform-conveying unit 31 that conveys the preforms 100a, a blow molding unit (a container-molding device) 32 that performs blow molding on the preforms 100a and that consequently molds the bottles 100 by using the preforms 100a, and a bottle-conveying unit 33 that conveys the bottles 100 that are molded.

Among these, the preform-conveying unit 31 includes a receiving portion 34, a heating portion 35, and a delivering portion 36. Among these, the receiving portion 34 receives the preforms 100a that are supplied from a preform-supplying device 1 via a preform-supplying conveyor 2. The receiving portion 34 includes a preform-sterilizing device 34a that sterilizes the preforms 100a and a preform-air-rinsing device 34b that air-rinses the preforms 100a. In an example illustrated, the receiving portion 34 includes the single preform-sterilizing device 34a and the single preform-air-rinsing device 34b. The number of the preform-sterilizing device 34a and the number of the preform-air-rinsing device 34b are not limited thereto.

At the receiving portion 34, the preform-sterilizing device 34a blows gas or mist of a hydrogen peroxide solution to the preforms 100a and sterilizes the preforms 100a (preliminary sterilization).

A sterilizing agent for sterilizing the preforms 100a has properties for inactivating microorganisms. For example, hydrogen peroxide, peracetic acid, acetic acid, peroxynitric acid, nitric acid, a chlorinated chemical, sodium hydroxide, potassium hydroxide, alcohol such as ethyl alcohol or isopropyl alcohol, chlorine dioxide, ozone water, acid water, or a surfactant alone may be used, or a combination of two or more of these may be used.

The preform-sterilizing device 34a thus sterilizes the preforms 100a in advance (preliminary sterilization). Consequently, microbes adhering to the bottles 100 that are manufactured by using the preforms 100a can be reduced. For this reason, the amount of hydrogen peroxide that is used for the sterilizing device 11 that sterilizes the bottles 100 can be decreased, and the time for sterilization can be decreased. The amount of the sterilizing agent that is used for sterilizing the preforms 100a that have a small volume may be typically smaller than the amount of the sterilizing agent that is used for sterilizing the bottles 100. For this reason, the preliminary sterilization of the preforms 100a enables the total amount of the sterilizing agent that is used to be decreased.

Since the amount of hydrogen peroxide that is used for the sterilizing device 11 can be decreased, and the time for sterilization can be decreased, the size of the sterilizing device 11 can be decreased. Since the time for sterilization for which the bottles 100 are sterilized can be decreased, a thermal load on the bottles 100 can be reduced. For this reason, the bottles 100 can be inhibited from deforming due to the heat of the sterilizing agent even when the bottles 100 are light or the bottles 100 are composed of recycled PET.

Since the preliminary sterilization of the preforms 100a enables the microbes adhering to the bottles 100 to be reduced, sterilization conditions as for the sterilizing device 11 may become less strict. In order to improve a sterilizing effect as for the sterilizing device 11, heat setting is typically performed on trunk portions of the bottles 100 in a manner in which warm water in a mold temperature controller (not illustrated) is supplied to a mold at the blow molding unit 32. This enables the sterilizing effect as for the sterilizing device 11 to be improved and can inhibit the bottles 100 from shrinking at the sterilizing device 11. According to the present embodiment, however, the preliminary sterilization of the preforms 100a enables the microbes adhering to the bottles 100 to be reduced as described above. For this reason, the blow molding unit (the container-molding device) 32 may mold the bottles 100 without adjusting the temperature of the bottles 100 by using warm water. That is, at the blow molding unit 32, the warm water that is typically supplied to the mold in order to improve the sterilizing effect may not be supplied to the mold. As a result, the amount of carbon dioxide that is discharged by the content-filling system 10 can be decreased. Since the warm water may not be supplied to the mold of the blow molding unit 32, the blow molding unit 32 can be simplified. Since the blow molding unit 32 can be simplified, the amount of heat that is provided to the bottles 100 can be decreased. For this reason, the bottles 100 can be inhibited from shrinking at the sterilizing device 11 even in the case where the warm water described above is not supplied to the mold.

Such a sterilizing process may be performed by not only the receiving portion 34 but also the heating portion 35 or the delivering portion 36. The sterilizing process may be performed between the bottle-conveying unit 33 and the filling device 20 after the bottles 100 are molded. The sterilizing process may be performed at multiple locations. In the sterilizing process, the sterilizing agent may not be used, and the microbes may be inactivated by using, for example, ultraviolet radiation or electron beam radiation.

Referring to FIG. 1, the preform-air-rinsing device 34b described above is disposed downstream of the preform-sterilizing device 34a. The preforms 100a to which the sterilizing agent is blown are dried by using hot air at the preform-air-rinsing device 34b. At this time, the hot air is preferably supplied to the preforms 100a with the mouths of the preforms 100a facing downward. This enables foreign material to be effectively removed from the preforms 100a. For this reason, a process of cleaning the preforms 100a by using sterile water can be omitted, and the amount of carbon dioxide that is discharged by the content-filling system 10 can be decreased. As for the receiving portion 34, the preform-air-rinsing device 34b may not be provided. As for the receiving portion 34, a foreign-material-removing device (not illustrated) that removes foreign material adhering to the preforms 100a may be disposed upstream of the preform-sterilizing device 34a.

The heating portion 35 receives the preforms 100a from the receiving portion 34 and heats the preforms 100a while conveying the preforms 100a. The heating portion 35 includes a heater 35a that heats the preforms 100a. An example of the heater 35a may be an infrared heater. The heater 35a heats the preforms 100a roughly to a temperature of, for example, 90° C. or more and 130° C. or less. The temperature of the mouths of the preforms 100a is maintained at a temperature of 70° C. or less, for example, so as not to deform.

The delivering portion 36 receives the preforms 100a that are heated by the heating portion 35 and delivers the preforms 100a to the blow molding unit 32.

The blow molding unit 32 includes the mold not illustrated. The bottles 100 are molded in a manner in which blow molding is performed on the preforms 100a by using the mold. The bottle-conveying unit 33 conveys the bottles 100 that are molded to a downstream position.

An adjustment conveying unit 5 that receives the bottles 100 from the bottle-conveying unit 33 and that delivers the bottles 100 to the sterilizing device 11 is disposed between the bottle-molding unit 30 and the sterilizing device 11. At least a portion of the adjustment conveying unit 5 is contained in an atmosphere shielding chamber 70c (described later) that is disposed upstream of a sterilizing-agent spray chamber 70d (described later). In an example illustrated, the adjustment conveying unit 5 extends over a molding unit chamber 70b (described later) that contains the bottle-molding unit 30 and the atmosphere shielding chamber 70c. At least a portion of the adjustment conveying unit 5 is thus contained in the atmosphere shielding chamber 70c, and consequently, gas or mist of the sterilizing agent that is generated in the sterilizing-agent spray chamber 70d or a mixture thereof can be inhibited from entering the molding unit chamber 70b.

In an example illustrated, one of the conveyance wheels 12 is disposed between the adjustment conveying unit 5 and the bottle-conveying unit 33 of the bottle-molding unit 30. That is, the bottle-conveying unit 33 of the bottle-molding unit 30, one of the conveyance wheels 12, and the adjustment conveying unit 5 are disposed between the blow molding unit 32 of the bottle-molding unit 30 and the sterilizing device 11. This enables the content-filling system 10 to be compact, unlike the case where the multiple conveyance wheels 12 are disposed between the adjustment conveying unit 5 and the bottle-conveying unit 33 of the bottle-molding unit 30. Only the adjustment conveying unit 5 may be disposed between the blow molding unit 32 of the bottle-molding unit 30 and the sterilizing device 11 although this is not illustrated. In this case, the content-filling system 10 can be more compact.

The sterilizing device 11 sprays the sterilizing agent to the bottles 100 and consequently sterilizes the bottles 100. In this way, the bottles 100 are sterilized by using the sterilizing agent before the content is filled. An example of the sterilizing agent is a hydrogen peroxide solution. At the sterilizing device 11, gas or mist of a hydrogen peroxide solution is generated, and the gas or the mist is sprayed to the inner and outer surfaces of the bottles 100. The bottles 100 are thus sterilized by using the gas or mist of the hydrogen peroxide solution, and accordingly, the inner and outer surfaces of the bottles 100 are uniformly sterilized.

The air-rinsing device 14 supplies heated air or room temperature air that is sterile to the bottles 100 and consequently removes, for example, foreign material and hydrogen peroxide from the bottles 100 while activating the hydrogen peroxide. At this time, the sterile air is preferably supplied to the bottles 100 with the mouths of the bottles 100 facing downward. This enables the foreign material to be effectively removed from the bottles 100. For this reason, a process of cleaning the bottles 100 by using sterile water can be omitted, and the amount of carbon dioxide that is discharged by the content-filling system 10 can be decreased. Condensation mist of hydrogen peroxide having a low concentration may be mixed with the room temperature air that is sterile, and the hydrogen peroxide may be gasified and supplied to the bottles 100 as needed.

The filling device 20 fills the water and the product undiluted solution in the bottles 100. That is, the filling device 20 fills the water and the product undiluted solution that are sterilized in advance in the bottles 100 via the mouths of the bottles 100. In this way, at the filling device 20, the content that is manufactured by diluting the product undiluted solution is filled in the bottles 100 that are empty. At the filling device 20, the content is filled in the bottles 100 while the multiple bottles 100 are rotated and conveyed.

The filling device 20 may include a water-filling device 21 that is connected to the water sterilization line 50 and an undiluted-solution-filling device 22 that is connected to the undiluted-solution sterilization line 70. The water-filling device 21 and the undiluted-solution-filling device 22 are arranged in this order from an upstream position to a downstream position in the direction in which the bottles 100 are conveyed. The water-filling device 21 is disposed in a first sterile chamber 70f described later. The undiluted-solution-filling device 22 is disposed in a second sterile chamber 70h described later. The water-filling device 21 and the undiluted-solution-filling device 22 may be so-called rotary fillers.

The water-filling device 21 fills the sterilized water in the bottles 100. In this case, the water-filling device 21 fills the sterilized water in the bottles 100 that are empty. The undiluted-solution-filling device 22 fills the sterilized product undiluted solution in the bottles in which the water is filled. The filling device 20 thus includes the water-filling device 21 and the undiluted-solution-filling device 22, and consequently, the size of the filling device (that is, the undiluted-solution-filling device 22) that comes into contact with the product undiluted solution or the content can be decreased, unlike the case where a single filling device fills the content. For this reason, a region in which the filling device 20 is cleaned and sterilized can be narrowed as described later.

A filling rate at which the water-filling device 21 fills the water in the bottles 100 may be higher than a filling rate at which the undiluted-solution-filling device 22 fills the product undiluted solution in the bottles 100. That is, the water-filling device 21 fills the water in the bottles 100 that are empty, and consequently, the filling rate at which the water is filled can be increased. In some cases where the content is filled in the bottles 100 at a rapid filling rate, a part of the content splashes to the outside via the mouths of the bottles 100, for example, due to bubbling in the bottles 100. There is a possibility that the content splashes to the outside, and the content leaves a stain around the bottles 100. In the case where the water is filled in the bottles 100 that are empty, however, no stain is left around the bottles 100 even when the water splashes to the outside via the mouths of the bottles 100. For this reason, the filling rate at which the water is filled can be increased. As a result, the number of water-filling nozzles (see, for example, FIG. 16B described later) of the water-filling device 21 can be decreased. For this reason, the size of the water-filling device 21 can be decreased.

As for the water-filling device 21, the filling rate at which the water is filled may be 100 ml/sec or more and 500 mL/sec or less, preferably 200 ml/sec or more and 400 mL/sec or less. When the filling rate at which the water is filled is 100 mL/sec or more, the number of the water-filling nozzles of the water-filling device 21 can be further decreased. For this reason, the size of the water-filling device 21 can be further decreased. When the filling rate at which the water is filled is 500 mL/sec or less, the water can be inhibited from splashing to the outside via the mouths of the bottles 100 while the water is filled in the bottles 100. For this reason, a content volume and a magnification at which the product undiluted solution is diluted can be inhibited from varying among product bottles 101. As for the undiluted-solution-filling device 22, the filling rate at which the product undiluted solution is filled may be 30 mL/sec or more and 200 ml/sec or less.

The cap-mounting device 16 mounts caps 88 on the bottles 100 and caps the bottles 100. At the cap-mounting device 16, the bottles 100 in which the water and the product undiluted solution (the content) are filled are closed by the caps 88 and are sealed such that neither outside air nor microorganisms enter the bottles 100. At the cap-mounting device 16, while the multiple bottles 100 in which the content is filled are rotated (revolved), the caps 88 are mounted on the mouths thereof. In this way, the caps 88 are mounted on the bottles 100, and the product bottles 101 are consequently obtained.

The caps 88 are sterilized by a cap-sterilizing device 18 in advance. The cap-sterilizing device 18 is disposed near the cap-mounting device 16, for example, outside the second sterile chamber 70h (described later). At the cap-sterilizing device 18, a large number of the caps 88 to be loaded from a location outside the content-filling system 10 are collected in advance and are conveyed in a row toward the cap-mounting device 16. The caps 88 are dried by using hot air and are sterilized before reaching the cap-mounting device 16 after gas or mist of hydrogen peroxide is blown to the inner and outer surfaces of the caps 88.

The product-bottle-unloading unit 25 continuously unloads the product bottles 101 on which the caps 88 are mounted by the cap-mounting device 16 toward a location outside the content-filling system 10.

The content-filling system 10 includes a preform-sterilizing chamber 70a, the molding unit chamber 70b, the atmosphere shielding chamber 70c, the sterilizing-agent spray chamber 70d, an air-rinsing chamber (a fourth sterile chamber) 70e, the first sterile chamber 70f, an intermediate area chamber (a third sterile chamber) 70g, the second sterile chamber 70h, and an exit chamber 70i. Among these, the intermediate area chamber (the third sterile chamber) 70g that couples the first sterile chamber 70f and the second sterile chamber 70h with each other is disposed between the first sterile chamber 70f and the second sterile chamber 70h. The air-rinsing chamber (the fourth sterile chamber) 70e is disposed upstream of the first sterile chamber 70f. That is, the preform-sterilizing chamber 70a, the molding unit chamber 70b, the atmosphere shielding chamber 70c, the sterilizing-agent spray chamber 70d, the air-rinsing chamber 70e, the first sterile chamber 70f, the intermediate area chamber 70g, the second sterile chamber 70h, and the exit chamber 70i are arranged in this order from an upstream position to a downstream position in the direction in which the preforms 100a and the bottles 100 are conveyed.

The chambers 70a to 70i are separated from each other by partition walls. The partition walls have a function of preventing, for example, the sterilizing agent from flowing in an unintentional direction between the chambers 70a to 70i and stabilizing pressure in the chambers 70a to 70i. The partition walls have respective gaps sized such that the preforms 100a or the bottles 100 can pass therethrough. The gaps have, for example, a size roughly equal to the size of the single preform 100a or the single bottle 100 at minimum in order to prevent the pressure in the chambers 70a to 70i from changing. The partition walls may include shutters that cover the gaps described above. The shutters may automatically open and close, for example, in response to a signal from the control unit 90.

Among the chambers 70a to 70i, the preform-sterilizing chamber 70a contains, for example, the preform-sterilizing device 34a.

The molding unit chamber 70b contains, for example, the blow molding unit 32 of the bottle-molding unit 30.

The atmosphere shielding chamber 70c contains at least a portion of the adjustment conveying unit 5. The atmosphere shielding chamber 70c may contain a camera. The camera may be used to inspect whether the bottles 100 have a problem about molding. The atmosphere shielding chamber 70c may contain a thermometer. The thermometer may measure the temperature of the bottles 100 before sterilization. The temperature of the bottles 100 is an important factor in sterilization efficiency on the bottles 100. That is, maintaining the appropriate temperature of the bottles 100 enables the sterilization efficiency on the bottles 100 to be improved. For this reason, measuring the temperature of the bottles 100 by using the thermometer before sterilization enables the appropriate temperature of the bottles 100 to be maintained during sterilization and enables the sterilization efficiency on the bottles 100 to be improved.

The sterilizing-agent spray chamber 70d contains the sterilizing device 11. The air-rinsing chamber 70e contains the air-rinsing device 14.

The first sterile chamber 70f contains the water-filling device 21 of the filling device 20. The second sterile chamber 70h contains the undiluted-solution-filling device 22 of the filling device 20 described above and the cap-mounting device 16. The exit chamber 70i contains the product-bottle-unloading unit 25. The intermediate area chamber 70g may contain only the conveyance wheel 12.

In the preform-sterilizing chamber 70a, the sterilizing-agent spray chamber 70d, the air-rinsing chamber 70e, the first sterile chamber 70f, the intermediate area chamber 70g, the second sterile chamber 70h, and the exit chamber 70i described above, pressure gauges (not illustrated) that measure the pressure in the chambers are mounted. In the molding unit chamber 70b and/or the atmosphere shielding chamber 70c, pressure gauges that measure the pressure in the chambers may be mounted.

The content-filling system 10 includes the control unit 90 that controls the filling device 20 as described above. The control unit 90 is electrically connected to the filling device 20 and controls the undiluted-solution-filling device 22 and the water-filling device 21 of the filling device 20. The control unit 90 may be electrically connected to the water sterilization line 50, the undiluted-solution sterilization line 70, the bottle-molding unit 30, the sterilizing device 11, the air-rinsing device 14, the cap-mounting device 16, the product-bottle-unloading unit 25, and the cap-sterilizing device 18. The control unit 90 may controls, for example, the water sterilization line 50.

The control unit 90 may cause the insides of the chambers to be cleaned and sterilized and may cause, for example, a water sterilizer 60 described later in the water sterilization line 50 to be cleaned and sterilized. According to the present embodiment, the control unit 90 causes the inside of the second sterile chamber 70h to be cleaned (in the following description, the cleaning of the insides of the chambers is also referred to as COP) with the inside of the first sterile chamber 70f kept sterile. The control unit 90 causes the undiluted-solution-filling device 22 to be cleaned (in the following description, cleaning of the inside of the filling device 20 such as the undiluted-solution-filling device 22 is also referred to as CIP (Cleaning in Place)) with the inside of the first sterile chamber 70f kept sterile. That is, the control unit 90 keeps the inside of the first sterile chamber 70f sterile without cleaning (COP) the inside of the first sterile chamber 70f when the inside of the second sterile chamber 70h and the undiluted-solution-filling device 22 are cleaned. The control unit 90 keeps the inside of the first sterile chamber 70f sterile without cleaning (CIP) the water-filling device 21 when the inside of the second sterile chamber 70h and the undiluted-solution-filling device 22 are cleaned.

The first sterile chamber 70f contains the water-filling device 21 that fills the sterilized water as described above. No stain due to the content is left around the water-filling device 21 and a flow path for the water in the water-filling device 21. For this reason, hygiene in the first sterile chamber 70f can be maintained even in the case where the inside of the first sterile chamber 70f is not cleaned (COP) or sterilized (in the following description, the sterilization of the insides of the chambers is also referred to as SOP) when the kind of the content is changed. At this time, the hygiene of the water-filling device 21 can be maintained even in the case where the water-filling device 21 that is contained in the first sterile chamber 70f is not cleaned (CIP) or sterilized (SIP (Sterilization in Place)), and a next content can be inhibited from being mixed with the previous content. In the case where the inside of the first sterile chamber 70f is thus not cleaned when the inside of the second sterile chamber 70h is cleaned, the number of times the inside of the first sterile chamber 70f is cleaned can be decreased, and regions to be cleaned at the content-filling system 10 can be narrowed. For this reason, the amount of the water, vapor, electricity, and detergent that are used can be decreased. In addition, since the regions to be cleaned can be narrowed, the time for cleaning can be decreased. For this reason, the amount of carbon dioxide that is discharged by the content-filling system 10 can be decreased.

The control unit 90 causes the inside of the second sterile chamber 70h to be sterilized (SOP) with the inside of the first sterile chamber 70f kept sterile. The control unit 90 causes the undiluted-solution-filling device 22 to be sterilized (SIP) with the inside of the first sterile chamber 70f kept sterile. That is, the control unit 90 keeps the inside of the first sterile chamber 70f sterile without sterilizing (SOP) the inside of the first sterile chamber 70f when the inside of the second sterile chamber 70h and the undiluted-solution-filling device 22 are sterilized. The control unit 90 keeps the inside of the first sterile chamber 70f sterile without sterilizing (SIP) the water-filling device 21 when the inside of the second sterile chamber 70h and the undiluted-solution-filling device 22 are sterilized. This enables regions to be sterilized to be reduced. For this reason, the amount of the vapor that is used can be decreased. In addition, the time for sterilization can be decreased. For this reason, the amount of carbon dioxide that is discharged by the content-filling system 10 can be decreased.

The pressure in the first sterile chamber 70f described above is preferably higher than the pressure in the second sterile chamber 70h. This can inhibit air in the second sterile chamber 70h from entering the first sterile chamber 70f. For this reason, the state of the inside of the first sterile chamber 70f that is sterile can be successfully maintained.

When the inside of the second sterile chamber 70h is cleaned and sterilized, the pressure in the first sterile chamber 70f is preferably 40 Pa or more and 100 Pa or less, and the pressure in the second sterile chamber 70h is preferably 0 Pa or more and 20 Pa or less. When the undiluted-solution-filling device 22 is cleaned and sterilized, the pressure in the first sterile chamber 70f is preferably 40 Pa or more and 100 Pa or less, and the pressure in the second sterile chamber 70h is preferably 0 Pa or more and 20 Pa or less. This can effectively inhibit the air in the second sterile chamber 70h from entering the first sterile chamber 70f and enables the state of the inside of the first sterile chamber 70f that is sterile to be more successfully maintained. When the product bottles 101 are manufactured, the pressure in the first sterile chamber 70f is preferably 30 Pa or more and 60 Pa or less, and the pressure in the second sterile chamber 70h is preferably 10 Pa or more and 40 Pa or less.

The pressure in the intermediate area chamber (the third sterile chamber) 70g is preferably lower than the pressure in the first sterile chamber 70f and equal to or more than the pressure in the second sterile chamber 70h. When the pressure in the intermediate area chamber 70g is lower than the pressure in the first sterile chamber 70f, air in the intermediate area chamber 70g can be inhibited from entering the first sterile chamber 70f. When the pressure in the intermediate area chamber 70g is equal to or more than the pressure in the second sterile chamber 70h, the air in the second sterile chamber 70h can be inhibited from entering the intermediate area chamber 70g. For this reason, the air in the second sterile chamber 70h can be inhibited from entering the first sterile chamber 70f via the intermediate area chamber 70g. As a result, the state of the inside of the first sterile chamber 70f that is sterile can be successfully maintained.

When the inside of the second sterile chamber 70h is cleaned and sterilized, the pressure in the intermediate area chamber 70g is preferably 10 Pa or more and 40 Pa or less. When the undiluted-solution-filling device 22 is cleaned and sterilized, the pressure in the intermediate area chamber 70g is preferably 10 Pa or more and 40 Pa or less. This can inhibit the air in the second sterile chamber 70h from entering the intermediate area chamber 70g and enables the state of the inside of the first sterile chamber 70f that is sterile to be more successfully maintained. When the product bottles 101 are manufactured, the pressure in the intermediate area chamber 70g is preferably 20 Pa or more and 50 Pa or less.

The pressure in the air-rinsing chamber (the fourth sterile chamber) 70e is preferably equal to or lower than the pressure in the first sterile chamber 70f. This can inhibit air in the air-rinsing chamber 70e from entering the first sterile chamber 70f. For this reason, the state of the inside of the first sterile chamber 70f that is sterile can be successfully maintained.

When the inside of the second sterile chamber 70h is cleaned and sterilized, the pressure in the air-rinsing chamber 70e is preferably 10 Pa or more and 40 Pa or less. When the undiluted-solution-filling device 22 is cleaned and sterilized, the pressure in the air-rinsing chamber 70e is preferably 10 Pa or more and 40 Pa or less. This can inhibit the air in the air-rinsing chamber 70e from entering the first sterile chamber 70f and enables the state of the inside of the first sterile chamber 70f that is sterile to be more successfully maintained. When the product bottles 101 are manufactured, the pressure in the air-rinsing chamber 70e is preferably 10 Pa or more and 30 Pa or less.

The pressure in the sterilizing-agent spray chamber 70d is preferably equal to or lower than the pressure in the atmosphere shielding chamber 70c. This can inhibit air in the sterilizing-agent spray chamber 70d from entering the atmosphere shielding chamber 70c and the molding unit chamber 70b. Since the air in the sterilizing-agent spray chamber 70d can be inhibited from entering the molding unit chamber 70b, humidity in the molding unit chamber 70b can be inhibited from increasing. The molding unit chamber 70b contains the blow molding unit 32 of the bottle-molding unit 30 as described above. For this reason, since the humidity in the molding unit chamber 70b is inhibited from increasing, a machine that is included in the blow molding unit 32 can be inhibited from corroding.

When the inside of the second sterile chamber 70h is cleaned and sterilized, the pressure in the sterilizing-agent spray chamber 70d is preferably 0 Pa or more and 20 Pa or less. When the undiluted-solution-filling device 22 is cleaned and sterilized, the pressure in the sterilizing-agent spray chamber 70d is preferably 0 Pa or more and 20 Pa or less. This can inhibit the air in the sterilizing-agent spray chamber 70d from entering the atmosphere shielding chamber 70c and the molding unit chamber 70b and can inhibit the humidity in the molding unit chamber 70b from increasing. When the product bottles 101 are manufactured, the pressure in the sterilizing-agent spray chamber 70d is preferably −10 Pa or more and 10 Pa or less.

When the inside of the second sterile chamber 70h is cleaned and sterilized, the pressure in the exit chamber 70i is preferably 0 Pa or more and 20 Pa or less. When the undiluted-solution-filling device 22 is cleaned and sterilized, the pressure in the exit chamber 70i is preferably 0 Pa or more and 20 Pa or less. This can inhibit air in the exit chamber 70i from entering the first sterile chamber 70f via, for example, the second sterile chamber 70h and enables the state of the inside of the first sterile chamber 70f that is sterile to be more successfully maintained. When the product bottles 101 are manufactured, the pressure in the exit chamber 70i is preferably 10 Pa or more and 20 Pa or less.

The above description is summarized. The pressure in the sterilizing-agent spray chamber 70d to the exit chamber 70i may be determined as illustrated in Table 1 bellow.

TABLE 1

|  | During Cleaning and Sterilization of Inside of Second Sterile Chamber and/or Undiluted-solution-filling Device | During Manufacturing of Product Bottle |
|---|---|---|
| Sterilizing-agent Spray Chamber 70d | 0 Pa or more and 20 Pa or less | −10 Pa or more and 10 Pa or less |
| Air-rinsing Chamber 70e | 10 Pa or more and 40 Pa or less | 10 Pa or more and 30 Pa or less |
| First Sterile Chamber 70f | 40 Pa or more and 100 Pa or less | 30 Pa or more and 60 Pa or less |
| Intermediate Area Chamber 70g | 10 Pa or more and 40 Pa or less | 20 Pa or more and 50 Pa or less |
| Second Sterile Chamber 70h | 0 Pa or more and 20 Pa or less | 10 Pa or more and 40 Pa or less |
| Exit Chamber 70i | 0 Pa or more and 20 Pa or less | 10 Pa or more and 20 Pa or less |

In this case, the pressure in the preform-sterilizing chamber 70a to the atmosphere shielding chamber 70c may be determined as illustrated in Table 2 below.

TABLE 2

| | During Cleaning and Sterilization of Inside of Second Sterile Chamber and/or Undiluted-solution-filling Device | During Manufacturing of Product Bottle |
|---|---|---|
| Preform-sterilizing Chamber 70a | −10 Pa or more and 10 Pa or less | −10 Pa or more and 10 Pa or less |
| Molding unit Chamber 70b | 0 Pa or more and 10 Pa or less | 0 Pa or more and 10 Pa or less |
| Atmosphere Shielding Chamber 70c | −10 Pa or more and 10 Pa or less | 0 Pa or more and 10 Pa or less |

For example, the content-filling system 10 may include a sterile filling system. In this case, the insides of the sterilizing-agent spray chamber 70d, the air-rinsing chamber 70e, the first sterile chamber 70f, the intermediate area chamber 70g, the second sterile chamber 70h, and the exit chamber 70i are kept sterile. A chamber (not illustrated) that couples a sterile zone that is sterile and a non-sterile zone that is not sterile with each other may be disposed downstream of the exit chamber 70i.

The water sterilization line 50 and the undiluted-solution sterilization line 70 of the content-filling system 10 will now be described. The water sterilization line 50 will be first described.

Water Sterilization Line

The water sterilization line 50 sterilizes the water without heating. The water sterilization line 50 may sterilize the water by using ultraviolet rays. In the present specification, the phrase "to sterilize without heating" means to sterilize the water without using thermal energy from, for example, an electric heater or vapor.

Figure 2A:
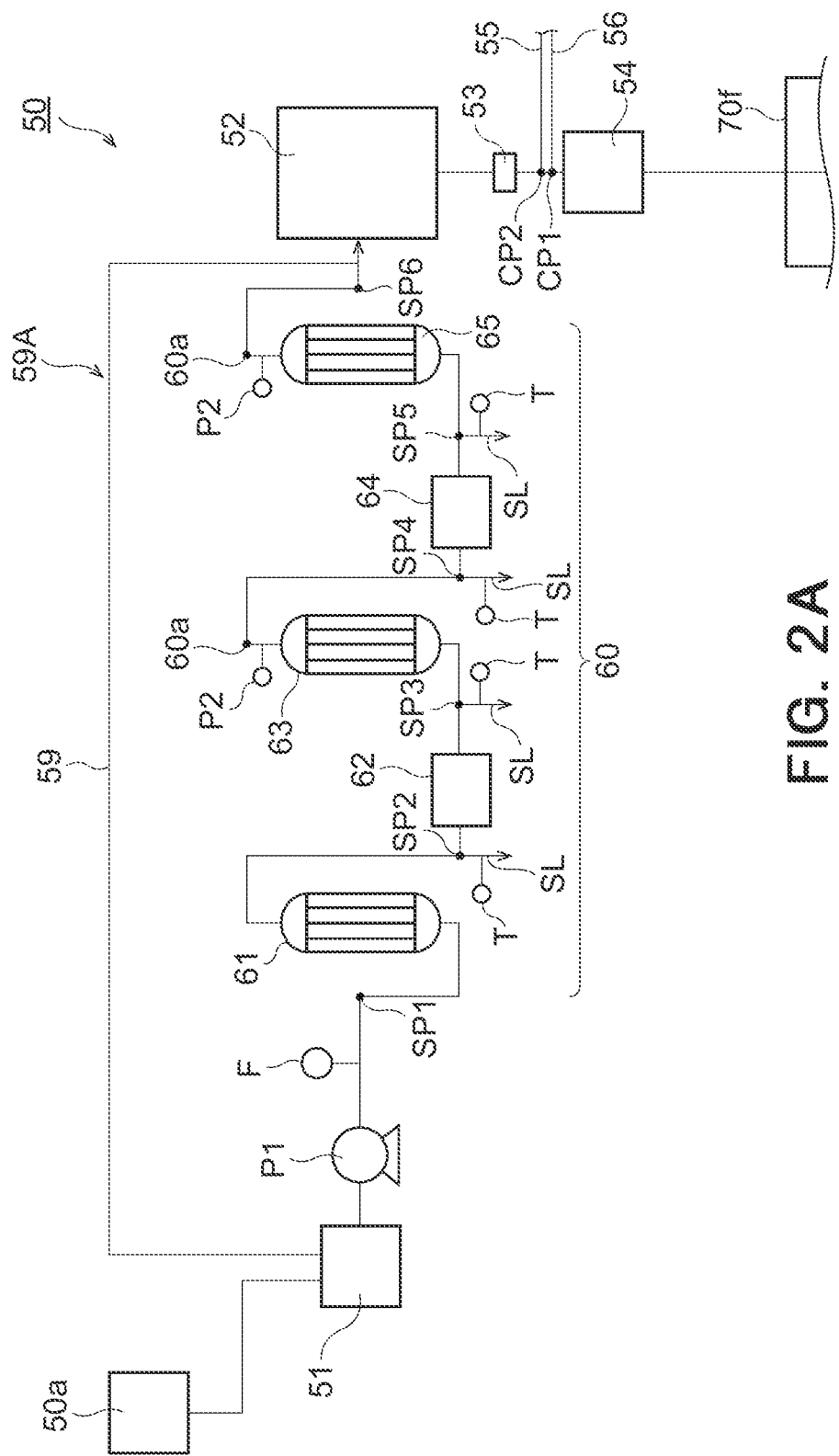
FIG. 2A schematically illustrates a water sterilization line according to an embodiment.

As illustrated in FIG. 2A, the water sterilization line 50 includes a first water tank 51, the water sterilizer 60, and a second water tank 52. The first water tank 51, the water sterilizer 60, and the second water tank 52 are arranged in this order from an upstream position to a downstream position in the direction in which the water is conveyed.

The first water tank 51 stores the water (the pure water) that is supplied from a water supply source (for example, a pure-water-manufacturing device 50a described later). It is obligated to use food production water that is defined by the Food Sanitation Act as water for a soft drink. The food production water is the pure water that is manufactured by the pure-water-manufacturing device 50a that has, for example, activated carbon, a reverse osmosis membrane, or ion exchange resin (including EDI). The pure water is water from which impurities such as calcium, magnesium, chlorine, iron, or a mineral component are removed. In this case, the pure water contains an evaporation residue of 20 mg/L or less. The electrical conductivity of the pure water is 0.1 μS/cm or more and 20 μS/cm or less. According to the present embodiment, the water is sterilized by using the ultraviolet rays as described later. For this reason, when the electrical conductivity of the water to be sterilized is 20 μS/cm or less, an inorganic substance (such as a calcium oxide), for example, can be inhibited from adhering to a surface of, for example, a first ultraviolet lamp 67a described later. For this reason, ultraviolet transmittance can be prevented from decreasing.

The first water tank 51 has a function of storing the water and consequently causing the water to smoothly flow. The volume of the first water tank 51 may be 30 $m^3$ or more and 100 $m^3$ or less and may be, for example, 50 $m^3$.

The number of microbes in the first water tank 51 is preferably 0.01 CFU/mL or more and 10 CFU/mL or less.

When the number of microbes in the first water tank 51 is more than 10 CFU/mL, the first water tank 51 is preferably sterilized by using chlorine, hot water, or vapor. The number of the microbes in the first water tank 51 may be always monitored and may be controlled so as to be in the range described above. This enables the water that is sterile to be manufactured without additional equipment. For this reason, the cost of the water sterilizer 60 is not high, and the amount of carbon dioxide that is discharged by the water sterilizer 60 can be decreased.

A pump P1 that conveys the water and a flow meter F that measures the flow rate of the water may be disposed downstream of the first water tank 51. The pump P1 and the flow meter F may be arranged in this order from an upstream position to a downstream position in the direction in which the water is conveyed. The water sterilizer 60 described above is disposed downstream of the flow meter F.

The water sterilizer 60 sterilizes the water that stored in the first water tank 51. The water sterilizer 60 will be described in detail later.

The second water tank 52 is a tank (a so-called aseptic tank) that stores the water that is sterilized by the water sterilizer 60. The second water tank 52 has a function of storing the sterilized water and consequently causing the water to smoothly flow. The volume of the second water tank 52 may be 5 $m^3$ or more and 50 $m^3$ or less and may be, for example, 10 $m^3$.

An auxiliary filter 53 that filters the sterilized water and a third water tank 54 that stores the water that passes through the auxiliary filter 53 may be disposed downstream of the second water tank 52. In this case, the third water tank 54 may be a so-called filling tank and may be installed above the water-filling device 21 in the vertical direction in order to improve the filling accuracy of the water-filling device 21. The third water tank 54 may function as a so-called cushion tank that ensures the smooth flow of the water even in the case where the amount of the water that is used at a position downstream of the third water tank 54 changes. The volume of the third water tank 54 may be 0.1 $m^3$ or more and 1 $m^3$ or less and may be, for example, 0.3 $m^3$.

A first bypass line (a bypass line) 55 (see, for example, FIG. 1 and FIG. 2A) that connects the water sterilization line 50 and the cap-sterilizing device 18 to each other may be disposed downstream of the second water tank 52. This enables the water that is sterilized by the water sterilizer 60 to be used to clean the caps 88. The caps 88 can be cleaned by using the sterile water after being sterilized by using the sterilizing agent. Consequently, the caps 88 are cooled, and foreign material adhering to the caps 88 is removed. Since the caps 88 are cleaned by using the sterile water, friction between a conveyance chute (not illustrated) that conveys the caps 88 and the caps 88 can be reduced due to the sterile water adhering to the caps 88. For this reason, the conveyance chute can be inhibited from cutting the caps 88 while the caps 88 are conveyed.

The first bypass line 55 is disposed downstream of the second water tank 52 as described above, and consequently, the water that is sterilized by the water sterilizer 60 can be used for cleaning the caps 88. For this reason, the amount of carbon dioxide that is discharged by the content-filling system 10 can be further decreased, unlike the case where the caps 88 are cleaned by using sterile water that is manufactured by using a sterilizer that heats and sterilizes water. The sterilization conditions, a conveyance speed, and/or the materials of the caps 88, for example, are appropriately determined, and consequently, the caps 88 can be conveyed without being cut. In the case where the caps 88 are thus not cut, the caps 88 may not be cleaned by using the sterile water.

A second bypass line 56 that connects the water sterilization line 50 and the second sterile chamber 70h to each other may be disposed downstream of the second water tank 52. When the inside of the second sterile chamber 70h is cleaned, the control unit 90 may cause the water that is sterilized by the water sterilization line 50 to be supplied to the second sterile chamber 70h via the second bypass line 56. When the undiluted-solution-filling device 22 is cleaned, the control unit 90 may cause the water that is sterilized by the water sterilization line 50 to be supplied to the second sterile chamber 70h via the second bypass line 56. This enables the amount of carbon dioxide that is discharged by the content-filling system 10 to be further decreased, unlike the case where the inside of the second sterile chamber 70h is cleaned by using sterile water that is manufactured by using a sterilizer that heats and sterilizes water.

In the second sterile chamber 70h, the undiluted-solution-filling device 22 fills the product undiluted solution in the bottles 100. The mouths of the bottles 100 can be cleaned after the product undiluted solution (the content) is filled in the bottles 100. When the mouths of the bottles 100 are thus cleaned, the water that is supplied to the second sterile chamber 70h via the second bypass line 56 may be used. This enables the amount of carbon dioxide that is discharged by the content-filling system 10 to be further decreased, unlike the case where the mouths of the bottles 100 are cleaned by using sterile water that is manufactured by using a sterilizer that heats and sterilizes water. In the case where the product undiluted solution (the content) does not adhere to the mouths of the bottles 100, the mouths of the bottles 100 may not be cleaned. In the case where there is no possibility that the microbes multiply, the mouths of the bottles 100 may not be cleaned even in the case where the product undiluted solution adheres to the mouths of the bottles 100.

The second bypass line 56 may connect the water sterilization line 50 and the chambers 70a to 70i to each other. When the insides of the chambers 70a to 70i are cleaned, the water that is sterilized by the water sterilization line 50 may be supplied to the chambers 70a to 70i via the second bypass line 56. When machines that are disposed in the chambers 70a to 70i are cleaned, the water that is sterilized by the water sterilization line 50 may be supplied to the chambers 70a to 70i via the second bypass line 56.

As illustrated in FIG. 2A, a circulation line 59 may be connected upstream of the second water tank 52 of the water sterilization line 50. The circulation line 59 may be connected to the first water tank 51. In this way, a foreign-material removal filter 61, a first sterilizer 62, a first sterile filter 63, a second sterilizer 64, a second sterile filter 65, the circulation line 59, and the first water tank 51 may be included in a circulation system 59A through which the water circulates.

[Water Sterilizer]

The water sterilizer 60 will now be described. The water sterilizer 60 sterilizes the water that is used by the content-filling system 10. According to the present embodiment, the water sterilizer 60 sterilizes the water without heating. The water sterilizer 60 sterilizes the water (the pure water) that is stored in the first water tank 51 as described above. For this reason, the water sterilizer 60 sterilizes the water having an electrical conductivity of 0.1 μS/cm or more and 20 μS/cm or less.

As illustrated in FIG. 2A, the water sterilizer 60 includes the foreign-material removal filter 61, the first sterilizer 62, the first sterile filter 63, the second sterilizer 64, and the second sterile filter 65. The foreign-material removal filter 61, the first sterilizer 62, the first sterile filter 63, the second sterilizer 64, and the second sterile filter 65 are arranged in this order from an upstream position to a downstream position in the direction in which the water is conveyed.

Figure 2B:
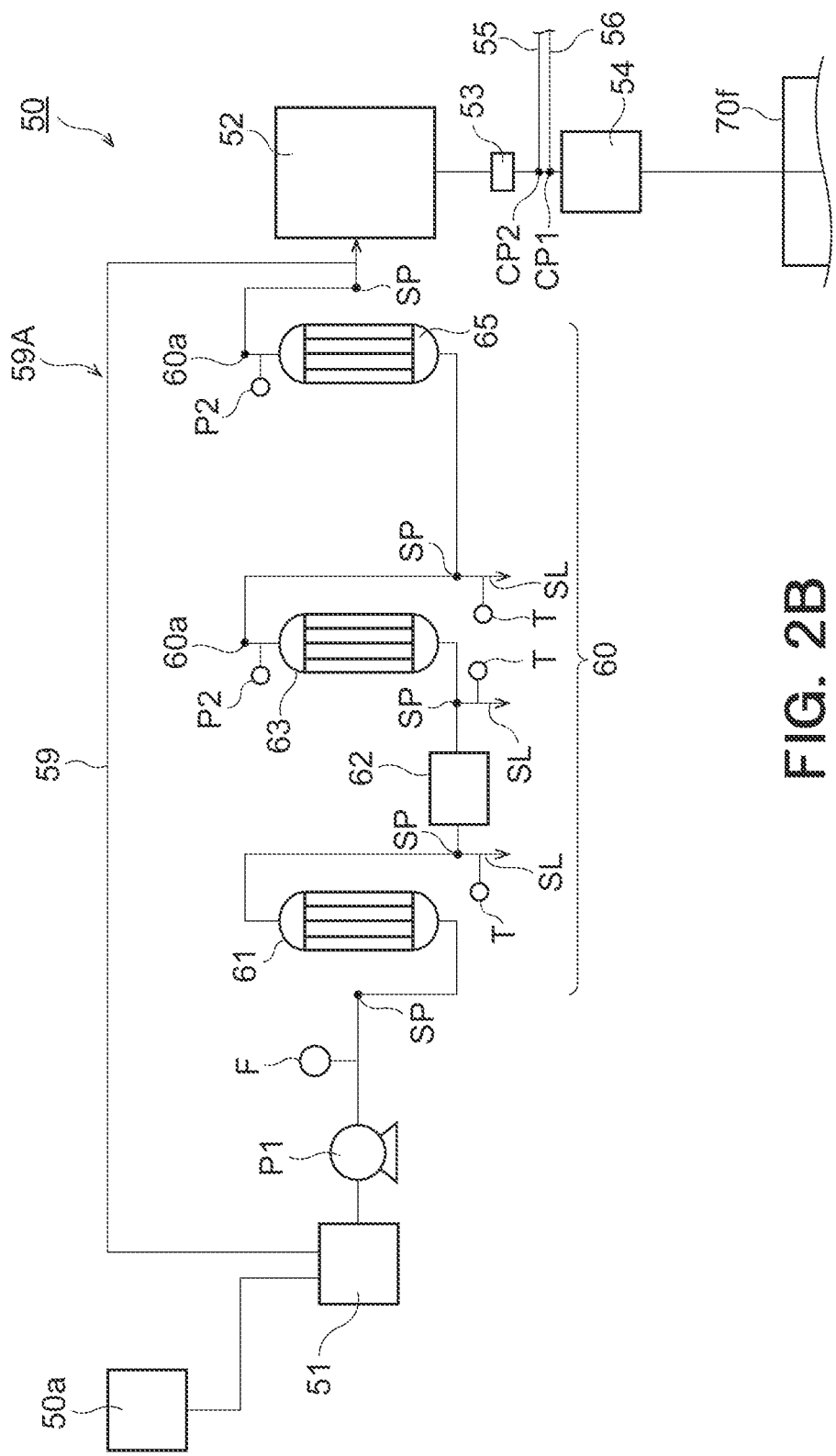
FIG. 2B schematically illustrates another example of the water sterilization line according to an embodiment.
Figure 2C:
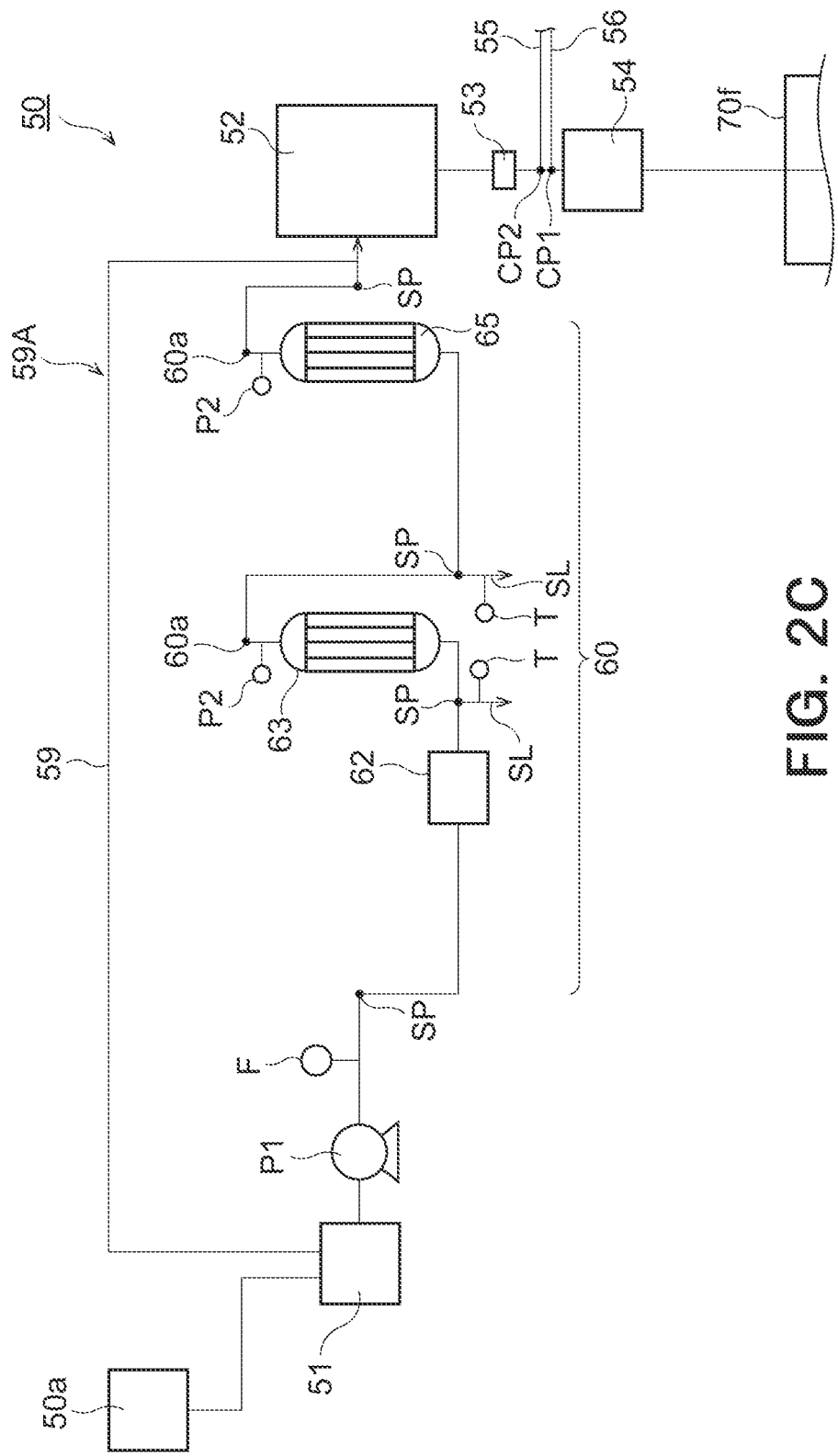
FIG. 2C schematically illustrates another example of the water sterilization line according to an embodiment.

As illustrated in FIG. 2B, the water sterilizer 60 may include the foreign-material removal filter 61, the first sterilizer 62, the first sterile filter 63, and the second sterile filter 65. The foreign-material removal filter 61, the first sterilizer 62, the first sterile filter 63, and the second sterile filter 65 may be arranged in this order from an upstream position to a downstream position in the direction in which the water is conveyed. As illustrated in FIG. 2C, the water sterilizer 60 may include the first sterilizer 62, the first sterile filter 63, and the second sterile filter 65. The first sterilizer 62, the first sterile filter 63, and the second sterile filter 65 may be arranged in this order from an upstream position to a downstream position in the direction in which the water is conveyed. In these cases, the water sterilizer 60 may further include the second sterilizer 64 that is disposed between the first sterile filter 63 and the second sterile filter 65.

The foreign-material removal filter 61, the first sterilizer 62, the first sterile filter 63, the second sterilizer 64, and the second sterile filter 65 will now be described. The foreign-material removal filter 61 will be first described.

The foreign-material removal filter 61 removes foreign material in the water. The mesh size (filter precision) of the foreign-material removal filter 61 may be, for example, 0.45 μm or more and 10 μm or less. The mesh size of the foreign-material removal filter 61 is preferably a size that enables fungus (such as mold and yeast) to be removed. As for, for example, the first sterilizer 62 that is disposed downstream of the foreign-material removal filter 61, ultraviolet rays are radiated to the water as described later. For this reason, the mesh size of the foreign-material removal filter 61 is preferably a size that enables mold that is resistant to the ultraviolet rays to be removed and is preferably 0.45 μm or more and 1.0 μm or less. A sterile grade filter having a mesh size of 0.1 μm or more and 0.22 μm or less may be used as the foreign-material removal filter 61 in order to improve the sterile properties of the water that passes through the foreign-material removal filter 61.

The first sterilizer 62 is disposed downstream of the foreign-material removal filter 61. The first sterilizer 62 is disposed upstream of the first sterile filter 63. The first sterilizer 62 sterilizes the water by using the ultraviolet rays. This enables the microbes (bacteria other than mold and yeast) that pass through the foreign-material removal filter 61 to be killed. The amount of carbon dioxide that is discharged by the content-filling system can be decreased in a manner in which the first sterilizer 62 sterilizes the water by using the ultraviolet rays, unlike the case where the water is sterilized by being heated. In particular, in the case where the content is manufactured as described above, the product undiluted solution can be diluted with the water by a factor of 1.1 or more and 100 or less, preferably by a factor of 2 or more and 10 or less. In the case where the product undiluted solution is diluted with the water by a factor of 2 or more and 10 or less, 50% or more and 90% or less of the content is the water. For this reason, the water is sterilized without being heated, and the amount of carbon dioxide that is discharged when the content is manufactured can be consequently greatly decreased.

Figure 3:
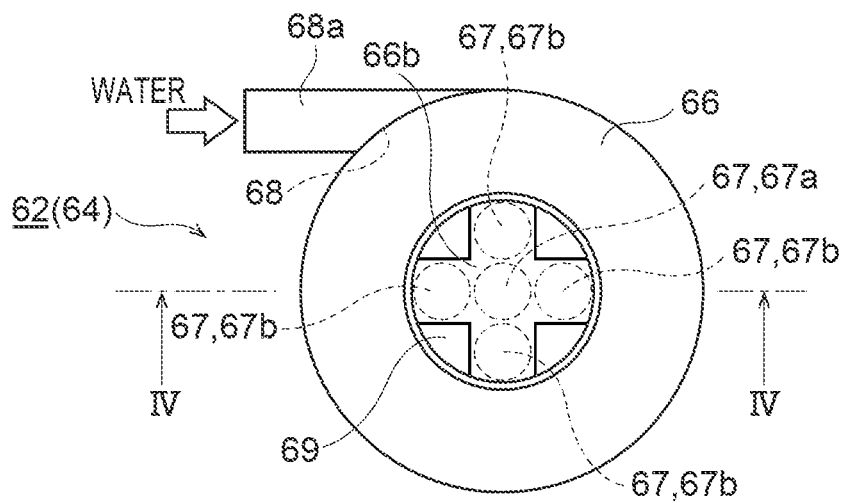
FIG. 3 illustrates a plan view of a first sterilizer of a water sterilizer according to an embodiment.

According to the present embodiment, the first sterilizer 62 sterilizes the water by using the ultraviolet rays as described above. In this case, as illustrated in FIG. 3 and FIG. 4, the first sterilizer 62 may include a body 66 and an ultraviolet radiation unit 67 that is disposed in the body 66.

Of these, the body 66 is hollow. The shape of the body 66 is a truncated cone shape. Specifically, the body 66 has an inner surface having a truncated cone shape, and an end portion thereof having a small diameter is higher than an end portion thereof having a large diameter. An introduction portion 68 that introduces the water into the body 66 may be formed at a lower portion of the body 66, and a discharge portion 69 that discharges the sterilized water from the body 66 may be formed at an upper portion of the body 66. An introduction tube 68a may be coupled with the introduction portion 68 that is formed at the body 66, and the introduction tube 68a may extend in a tangential direction of an inner surface of the body 66 in a plan view. In this case, the tangential direction of the inner surface is the direction of a tangent at a position at which the water to be introduced collides with the inner surface of the body 66 among tangents of a circle that is defined by the inner surface of the body 66 in a horizontal section including the introduction portion 68.

The water that is introduced into the body 66 via the introduction portion 68 is guided along the inner surface of the body 66 and consequently turns in a circumferential direction. The water turns, moves upward, and is discharged via the discharge portion 69. This can inhibit the flow of the water that is introduced into the body 66 from deviating. For this reason, a part of the water that is introduced into the body 66 can be prevented from being discharged via the discharge portion 69 in a short time (so-called short pass).

Figure 4:
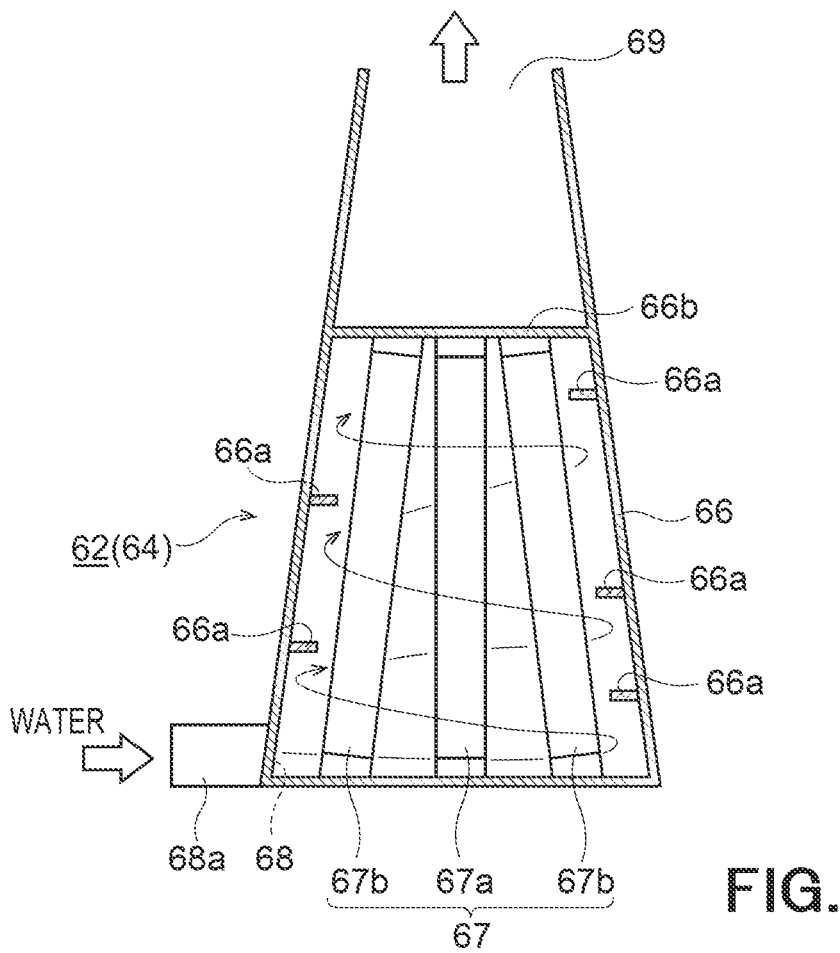
FIG. 4 illustrates a sectional view (a sectional view taken along line IV-IV in FIG. 3) of the first sterilizer of the water sterilizer according to an embodiment.

As illustrated in FIG. 4, a baffle plate 66a that restricts the flow of the water may be disposed in the body 66. The baffle plate 66a may radially protrude from the inner surface of the body 66 so as to be spirally wound. The baffle plate 66a that is disposed in the body 66 can inhibit the water that is introduced into the body 66 via the introduction portion 68 from moving upward without turning in the circumferential direction. For this reason, the so-called short pass can be prevented with certainty. The baffle plate 66a may not be spirally wound in the body 66 although this is not illustrated. In this case, for example, multiple baffle plates 66a that are annular in a plan view may be disposed in the body 66 such that the water passes through a central opening portion.

The body 66 may contain a fixation member 66b that fixes the first ultraviolet lamp 67a and second ultraviolet lamps 67b of the ultraviolet radiation unit 67 described later. The shape of the fixation member 66b is, for example, a cross shape in a plan view. This can inhibit the fixation member 66b from hindering upward movement of the water. Alternatively, the shape of the fixation member 66b may be, for example, a disk shape or may be a circular shape in a plan view. In this case, the fixation member 66b may have a through-hole not illustrated, and the through-hole may allow the water to pass therethrough.

An illuminometer that measures the irradiance of the ultraviolet rays that are radiated from the ultraviolet radiation unit 67 may be installed in the body 66. An output meter that measures the outputs of the first ultraviolet lamp 67a and the second ultraviolet lamps 67b of the ultraviolet radiation unit 67 described later may be installed. The flow meter F described above may always monitor a time (a staying time) required for the water to pass through the body 66. The temperature, turbidity, and/or chromaticity of the water that passes through the body 66 may be always or appropriately measured, and whether the irradiation amount and/or transmittance of the ultraviolet rays is not abnormal may be always checked.

The ultraviolet radiation unit 67 will now be described. The ultraviolet radiation unit 67 may include the first ultraviolet lamp 67a that is disposed at the center of the body 66 in a radial direction and the multiple second ultraviolet lamps 67b that are disposed around the first ultraviolet lamp 67a. In an example illustrated, four second ultraviolet lamps 67b are disposed around the single first ultraviolet lamp 67a.

The second ultraviolet lamps 67b are disposed along the inner surface of the body 66. That is, the second ultraviolet lamps 67b extend upward and radially incline inward. In this case, the second ultraviolet lamps 67b are preferably disposed at a regular interval in the circumferential direction. This can inhibit the cumulative irradiation amount ($mJ/cm^2$) of the ultraviolet rays from varying. The first ultraviolet lamp 67a and the second ultraviolet lamps 67b may be ultraviolet lamps that radiate ultraviolet rays having a wavelength of 200 nm or more and 450 nm or less.

The first ultraviolet lamp 67a and the second ultraviolet lamps 67b may be low-pressure mercury lamps, intermediate-pressure mercury lamps, or an UV-LEDs. In this case, the first ultraviolet lamp 67a and the second ultraviolet lamps 67b are preferably low-pressure mercury lamps or intermediate-pressure mercury lamps. Each low-pressure mercury lamp has a mercury vapor pressure of less than 10 Pa while lighting. The low-pressure mercury lamp can efficiently radiate the ultraviolet rays having a wavelength (253.7 nm) that improves the sterilizing effect. For this reason, in the case where the first ultraviolet lamp 67a and the second ultraviolet lamps 67b are low-pressure mercury lamps, the sterilizing effect as for the first sterilizer 62 and the second sterilizer 64 can be improved. Each low-pressure mercury lamp may be an amalgam lamp (a low-pressure, high-output amalgam lamp) that includes a light-emitting tube in which amalgam, which is an alloy of mercury and another metal, is enclosed.

Each intermediate-pressure mercury lamp has a mercury vapor pressure of 40 kPa or more while lighting. The output of the intermediate-pressure mercury lamp is typically higher than that of the low-pressure mercury lamp. For this reason, in the case where the first ultraviolet lamp 67a and the second ultraviolet lamps 67b are intermediate-pressure mercury lamps, the first sterilizer 62 and the second sterilizer 64 can sterilize a large amount of the water. In the case where the first ultraviolet lamp 67a and the second ultraviolet lamps 67b are intermediate-pressure mercury lamps, the sizes of the first sterilizer 62 and the second sterilizer 64 can be decreased because the outputs of the intermediate-pressure mercury lamps are high.

The sterilizing effect of the ultraviolet rays on the microbes changes depending on the cumulative irradiation amount ($mJ/cm^2$) of the ultraviolet rays. That is, as the cumulative irradiation amount of the ultraviolet rays increases, the sterilizing effect of the ultraviolet rays on the microbes improves. The cumulative irradiation amount is calculated as a product of an irradiance ($mW/cm^2$) and an irradiation time (s). For this reason, it is necessary to decrease distances between light sources (the first ultraviolet lamp 67a and the second ultraviolet lamps 67b) and the water and to increase the irradiation time of the ultraviolet rays in order to improve the sterilizing effect of the ultraviolet rays on the microbes. In particular, the irradiance is inversely proportional to the square of the distances from the light sources that radiate the ultraviolet rays. For example, in the case where the distances from the light sources increase by a factor of two, the irradiance decreases by a factor of ¼. In the case where the distances from the light sources increase by a factor of three, the irradiance decreases by a factor of ⅑. For this reason, the water is caused to pass through a position near the light sources, and the sterilizing effect of the ultraviolet rays on the microbes can be consequently improved.

According to the present embodiment, the introduction portion 68 that introduces the water into the body 66 is formed at the lower portion of the body 66, and the discharge portion 69 that discharges the sterilized water from the body 66 is formed at the upper portion of the body 66 as described above. This can prevent the short pass and enables the time for which the water stays in the body 66 to be increased. For this reason, the irradiation time of the ultraviolet rays to the water can be increased, and the cumulative irradiation amount of the ultraviolet rays can be increased. The water is introduced via the lower portion of the body 66, and the sufficient time for which the water stays in the body 66 can be consequently ensured even as for the water at the beginning of the operation of the first sterilizer 62, that is, the water that is introduced into the body 66 that is empty. For this reason, the irradiation time of the ultraviolet rays to the water can be increased.

The shape of the body 66 is a truncated cone shape. This enables the distances between the first ultraviolet lamp 67a and the water and between the second ultraviolet lamps 67b and the water to be decreased at the upper portion of the body 66. For this reason, the sterilizing effect of the ultraviolet rays on the microbes can be improved. The ultraviolet radiation unit 67 includes the first ultraviolet lamp 67a that is disposed at the center of the body 66 in the radial direction and the multiple second ultraviolet lamps 67b that are disposed around the first ultraviolet lamp 67a. This enables the ultraviolet rays to be uniformly radiated to the water that turns in the circumferential direction and that moves upward. For this reason, the cumulative irradiation amount of the ultraviolet rays can be inhibited from varying.

The cumulative irradiation amount of the ultraviolet rays to the water is preferably 10 mJ/cm$^2$ or more and 10000 mJ/cm$^2$ or less, more preferably 100 mJ/cm$^2$ or more and 10000 mJ/cm$^2$ or less. That is, when the water passes through the body 66, the cumulative irradiation amount of the ultraviolet rays to the water is preferably 10 mJ/cm$^2$ or more and 10000 mJ/cm$^2$ or less, more preferably 100 mJ/cm$^2$ or more and 10000 mJ/cm$^2$ or less. When the cumulative irradiation amount of the ultraviolet rays is 10 mJ/cm$^2$ or more, aquatic bacteria (such as *Pseudomonas*) that can pass through the second sterile filter 65 can be effectively killed. When the cumulative irradiation amount of the ultraviolet rays is 100 mJ/cm$^2$ or more, bacterial spores can be also killed. When the cumulative irradiation amount of the ultraviolet rays is 10000 mJ/cm$^2$ or less, power consumption can be reduced, and the amount of carbon dioxide that is discharged by the content-filling system 10 can be decreased. The wavelength of the ultraviolet rays may be 250 nm or more and 260 nm or less and may be, for example, 253.7 nm. When the wavelength of the ultraviolet rays is 250 nm or more and 260 nm or less, particularly 253.7 nm, the sterilizing effect of the ultraviolet rays on the microbes can be improved.

It is preferable that the first sterilizer 62 can be sterilized (SIP). This enables the first sterilizer 62 to be periodically sterilized. In the case where the first sterilizer 62 is sterilized, the control unit 90 described above may cause the first sterilizer 62 to be sterilized by using vapor or hot water. In the case where the first sterilizer 62 is vulnerable to heat, the control unit 90 may cause the first sterilizer 62 to be sterilized in a manner in which the sterilizing agent containing peracetic acid, for example, is circulated through the circulation system 59A that includes the water sterilizer 60. In this case, the control unit 90 may cause the sterilizing agent to circulate through the circulation system 59A at least for a time of 10 seconds or more and 60 minutes or less.

Figure 5A:
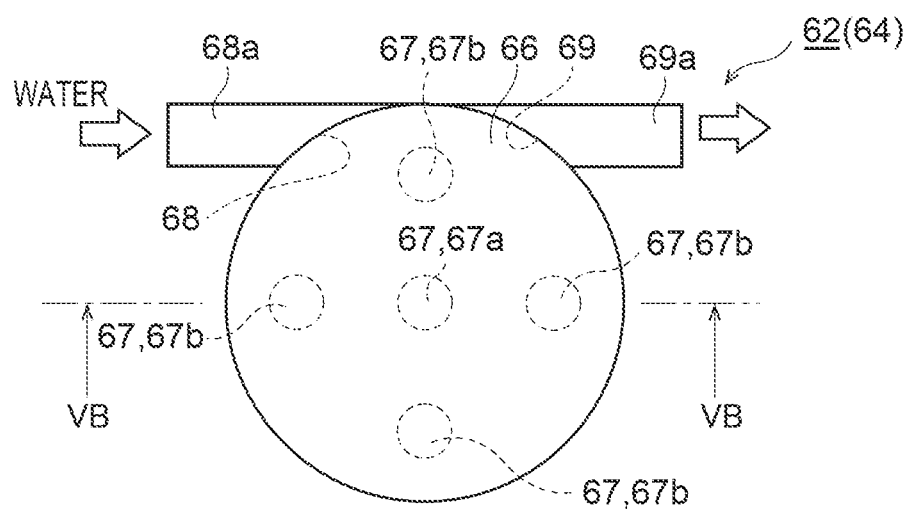
FIG. 5A illustrates a plan view of another example of the first sterilizer of the water sterilizer according to an embodiment.
Figure 5B:
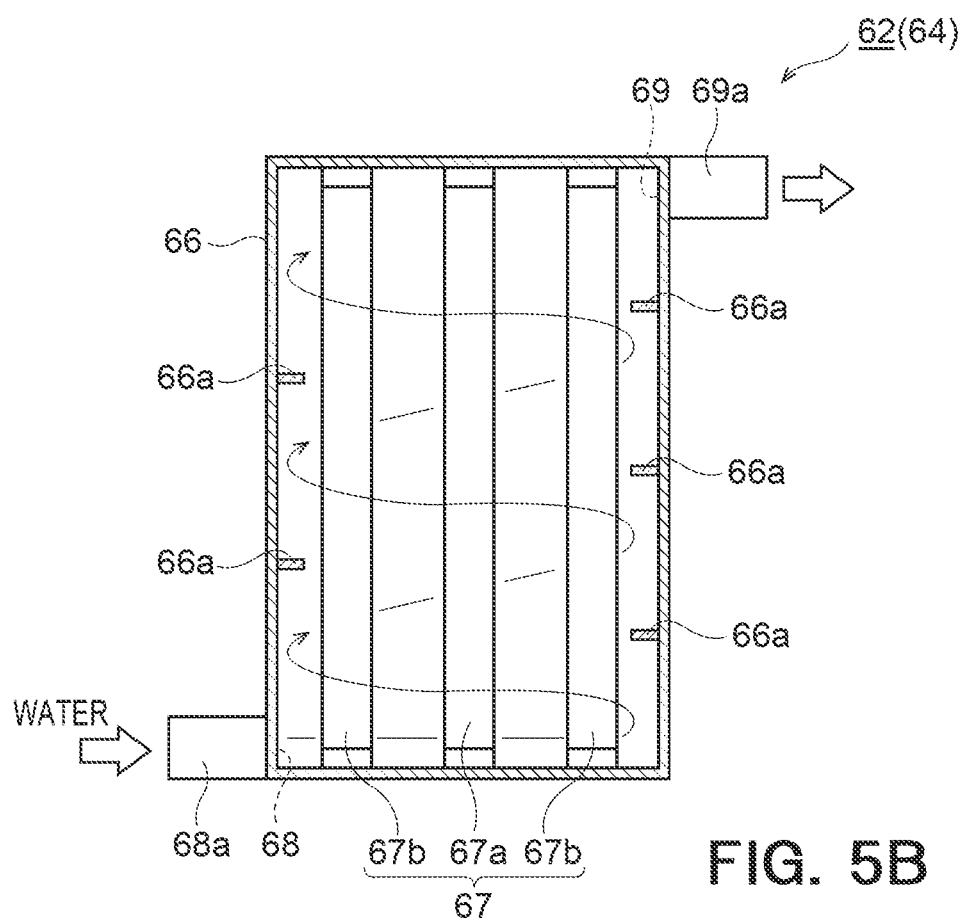
FIG. 5B illustrates a sectional view (a sectional view taken along line VB-VB in FIG. 5A) of another example of the first sterilizer of the water sterilizer according to an embodiment.

As illustrated in FIG. 5A and FIG. 5B, the shape of the body 66 of the first sterilizer 62 may be a cylindrical shape. In this case, a discharge tube 69a may be coupled with the discharge portion 69 that is formed at the body 66, and the discharge tube 69a may extend in a tangential direction of the inner surface of the body 66 in a plan view. In this case, the tangential direction of the inner surface is the direction of a tangent at a position at which the water that is in contact with the inner surface and that turns is separated from the inner surface of the body 66 among tangents of a circle that is defined by the inner surface of the body 66 in a horizontal section including the discharge portion 69. In the case where the shape of the body 66 is a cylindrical shape, the time for which the water stays in the body 66 can be increased. For this reason, the irradiation time of the ultraviolet rays to the water can be increased, and the cumulative irradiation amount of the ultraviolet rays can be increased. In this case, the multiple second ultraviolet lamps 67b may extend upward and radially incline inward although this is not illustrated.

Figure 6A:
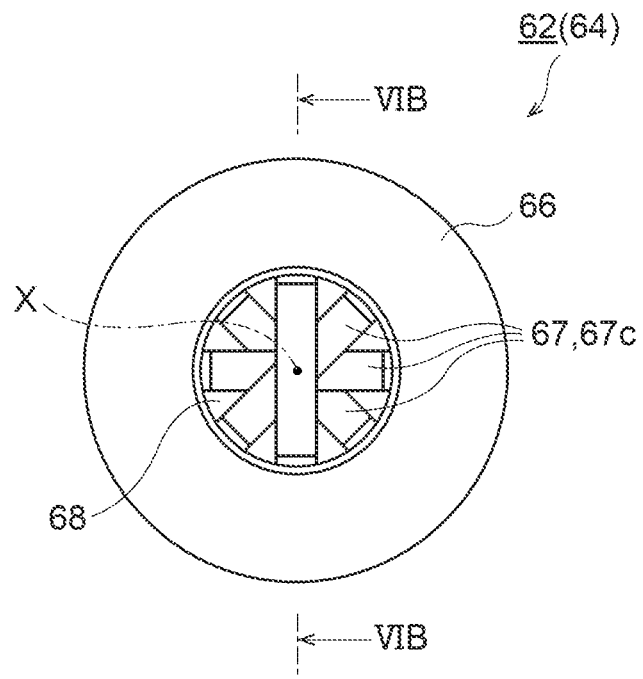
FIG. 6A illustrates a front view of another example of the first sterilizer of the water sterilizer according to an embodiment.
Figure 6B:
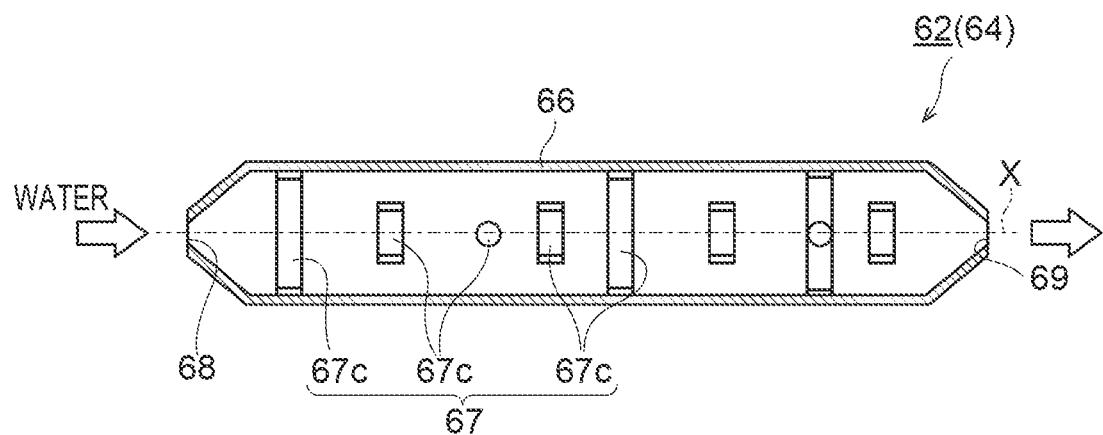
FIG. 6B illustrates a sectional view (a sectional view taken along line VIB-VIB in FIG. 6A) of another example of the first sterilizer of the water sterilizer according to an embodiment.

As illustrated in FIG. 6A and FIG. 6B, the shape of the body 66 may be a cylindrical shape, and the introduction portion 68 that introduces the water into the body 66 may be formed at a first end portion of the body 66. The discharge portion 69 that discharges the sterilized water from the body 66 may be formed at a second end portion of the body 66. In this case, the body 66 may be located such that the longitudinal direction (the direction in which the water moves) of the body 66 is parallel with the horizontal direction, or the body 66 may be located such that the longitudinal direction (the direction in which the water moves) of the body 66 is parallel with the up-down direction.

According to the present modification, the ultraviolet radiation unit 67 may include multiple third ultraviolet lamps 67c that are arranged in the direction in which the water moves. This enables the ultraviolet rays to be uniformly radiated to the water. For this reason, the cumulative irradiation amount of the ultraviolet rays can be inhibited from varying.

The third ultraviolet lamps 67c adjacent to each other in the direction in which the water moves may extend in different directions when viewed in the direction in which the water moves. This can effectively inhibit the cumulative irradiation amount of the ultraviolet rays from varying. In an example illustrated, the third ultraviolet lamps 67c are regularly arranged. That is, an angle at which each third ultraviolet lamp 67c clockwise rotates about the central axis X of the body 66 increases by 45 degrees as the position is nearer to a downstream position (the right in FIG. 6B) in the direction in which the water moves when viewed from an upstream position (the left in FIG. 6B) in the direction in which the water moves. The third ultraviolet lamps 67c may be irregularly arranged.

The third ultraviolet lamps 67c may be the same as the first ultraviolet lamp 67a and the second ultraviolet lamps 67b. That is, the third ultraviolet lamps 67c may be ultraviolet lamps that radiate ultraviolet rays having a wavelength of 200 nm or more and 450 nm or less. The third ultraviolet lamps 67c may be low-pressure mercury lamps (including low-pressure, high-output amalgam lamps) or intermediate-pressure mercury lamps. The baffle plate 66a that restricts the flow of the water may be disposed in the body 66 although this is not illustrated.

Referring to FIG. 2A again, the first sterile filter 63 is disposed downstream of the first sterilizer 62. The first sterile filter 63 collects the microbes that remain in the water and consequently filters the water. The mesh size of the first sterile filter 63 may be 0.1 μm or more and 0.45 μm or less and is preferably 0.1 μm or more and 0.22 μm or less. When the mesh size of the first sterile filter 63 is 0.1 μm or more, the sterilization efficiency on the water can be inhibited from decreasing. When the mesh size of the first sterile filter 63 is 0.45 μm or less, the first sterile filter 63 can effectively collect the microbes that remain in the water.

It is preferable that the first sterile filter 63 can be sterilized (SIP). This enables the first sterile filter 63 to be periodically sterilized. The first sterile filter 63 collects the microbes that pass through the first sterilizer 62 and that remain in the water as described above. For this reason, if the water sterilizer 60 continues to sterilize the water for a long time, the collected microbes can multiply in the first sterile filter 63. In the case where the corpses of the microbes, which are organic matters, adheres to, for example, the first sterile filter 63, the corpses of the microbes can become substrates. In this case, the microbes can further multiply in the first sterile filter 63. In the case where the microbes thus multiply in the first sterile filter 63, there is a possibility that the microbes enter the water that passes through the first sterile filter 63. When the first sterile filter 63 can be sterilized, however, the microbes adhering to the first sterile filter 63 can be inhibited from entering the water that passes through the first sterile filter 63. As a result, the filter performance of the first sterile filter 63 can be inhibited from decreasing. In the case where the first sterile filter 63 is sterilized, vapor for sterilization, for example, may be supplied to the first sterile filter 63 via a sterile-air inlet 60a described later.

The degree of sterilization of the first sterile filter 63 may be managed by using an F value. In other words, when the water sterilizer 60 that includes the first sterile filter 63 is sterilized, the degree of sterilization of the water sterilizer 60 may be managed by using the F value. At this time, the control unit 90, for example, may measure the temperature of heated vapor (fluid) or hot water (fluid) that flows on the flow path in the first sterile filter 63 and may calculate the F value, based on the measured temperature. In the case where the F value is a desired value or more, the control unit 90 may cause the sterilization of the first sterile filter 63 to end. In the case where the temperature of the heated vapor or the hot water is measured, the control unit 90 may cause the heated vapor or the hot water to flow on the flow path in the first sterile filter 63 and may cause the temperature to be measured by temperature sensors that are disposed at positions on the flow path at which the temperature is unlikely to increase. The control unit 90 may cause heating on the flow path by using, for example, the heated vapor to end when the time required for the temperature from the temperature sensors to reach a predetermined temperature is a predetermined time or more. This enables the first sterile filter 63 to be sterilized and prevents the first sterile filter 63 from being excessively heated. The F value is equal to a heating time required for all of the microbes to be killed when the microbes are heated for a predetermined time, is represented as the lethal time of the microbes at 121.1° C., and is calculated as the following expression.

$$F = \int_{t_0}^{t_1} 10^{(T-T_r)/Z} dt \qquad \text{[Math. 1]}$$

(where T is a freely determined sterilization temperature (° C.), $10^{\{(T-T_r)/Z\}}$ is a lethality ratio at the freely determined sterilization temperature T, $T_r$ is a reference temperature (° C.), and Z is a Z value (° C.)).

The first sterile filter 63 is preferably capable of conducting an integrity test for the mesh size of the first sterile filter 63. The integrity test can be conducted as follows. For example, water is first filled in a housing (not illustrated) in the first sterile filter 63. Subsequently, sterile air is injected into the first sterile filter 63 in which the water is filled, for example, via the sterile-air inlet 60a. Subsequently, the pressure of the sterile air is increased until the sterile air is taken out from the first sterile filter 63. The mesh size of the first sterile filter 63 is determined based on the pressure of the sterile air when the sterile air is taken out from the first sterile filter 63. The first sterile filter 63 that can conduct the integrity test for the mesh size of the first sterile filter 63 as above enables the deterioration of the first sterile filter 63 to be readily determined. A pressure gauge P2 may be disposed near the sterile-air inlet 60a in order to measure the pressure in the first sterile filter 63.

The second sterilizer 64 is disposed downstream of the first sterile filter 63. The structure of the second sterilizer 64 may be substantially the same as the structure of the first sterilizer 62 illustrated in FIG. 3 to FIG. 6B. That is, the second sterilizer 64 may sterilize the water by using the ultraviolet rays.

The second sterile filter 65 is disposed downstream of the second sterilizer 64. The second sterile filter 65 collects the microbes that pass through the second sterilizer 64 and that remain in the water and consequently filters the water. The mesh size of the second sterile filter 65 is preferably equal to or smaller than the mesh size of the first sterile filter 63. This enables the second sterile filter 65 to collect the microbes even in the case where the microbes in the water pass through the first sterile filter 63. For this reason, the sterile properties of the water can be sufficiently ensured. In the case where the mesh size of the second sterile filter 65 is equal to the mesh size of the first sterile filter 63, two sterilization sets each of which includes a sterilizer and a sterile filter can be arranged in the direction in which the water is conveyed. That is, a first sterilization set that includes the first sterilizer 62 and the first sterile filter 63 and a second sterilization set that includes the second sterilizer 64 and the second sterile filter 65 can be arranged in series in the direction in which the water is conveyed. For this reason, even in the case where one of the sterilization sets becomes abnormal, the sterile properties of the water can be assured. Multiple sterilization sets may be provided depending on sterility assurance level (SAL) of a final product (the content) or the water.

The mesh size of the second sterile filter 65 may be 0.1 μm or more and 0.45 μm or less and is preferably 0.1 μm or more and 0.22 μm or less. When the mesh size of the second sterile filter 65 is 0.1 μm or more, the sterilization efficiency on the water can be inhibited from decreasing. When the mesh size of the second sterile filter 65 is 0.45 μm or less, the second sterile filter 65 can effectively collect the microbes that remain in the water.

The other structure of the second sterile filter 65 may be substantially the same as the structure of the first sterile filter 63. That is, the second sterile filter 65 may be sterilized (SIP). The second sterile filter 65 may conduct the integrity test for the mesh size of the second sterile filter 65.

As for the water sterilizer 60, the intensity of the sterilization of the water may be adjusted based on a target value (FSO (Food Safety Objective/ISO13409-1996) (=log N)) for a microbial level.

In this case, for example, an initial microbial level in the water before the water enters a filter (for example, the first sterile filter 63) is $H_0$ (=log $N_0$). In this case, the initial microbial level $H_0$ of the filter decreases depending on the filtering effect (a microbial decrease level in the water: $\Sigma R_1$ (=log $(N_0/NR_1)>0$) of the filter (for example, the first sterile filter 63). The "$N_0$" means the number of the initial microbes in the water. The "$NR_1$" means the number of the microbes in the water that is filtered by the filter (for example, the first sterile filter 63).

It is thought that the number of the microbes in the water increases at a certain rate while the water passes through the filter (a microbial increase level in the water: $\Sigma I$ (=log $(N_1 \geq 0)$). The "$N_1$" means the increased number of the microbes while the water passes through the filter.

The microbes in the water decrease again depending on the sterilizing effect (the microbial decrease level in the water: $\Sigma R_2$ (=log $(N_1/NR_2)>0$)) of a sterilizer (for example, the second sterilizer 64). When the microbial level in the water after the water passes through the water sterilizer 60 is the target value (FSO (Food Safety Objective/ISO13409-1996) (=log N)) or less, it can be thought that the sterile properties of the water that is sterilized by the water sterilization line 50 have no problem. The "$NR_2$" means the number of the microbes in the water after the water is sterilized by the sterilizer (for example, the second sterilizer 64). The "N" means the target value of the number of the microbes in the water after the water is sterilized by the sterilizer (for example, the second sterilizer 64).

A relationship among $H_0$, $\Sigma R_1$, $\Sigma I$, $\Sigma R_2$, and FSO described above is expressed as an expression:

$$H_0 - \sum R_1 + \sum I \sum R_2 \leq FSO. \quad \text{(expression 1)}$$

For this reason, the sterilization performance of the sterilizer (for example, the second sterilizer 64) is determined such that the value of $\Sigma R_2$ is equal to or more than $(H_0 - \Sigma R_1 + \Sigma I) - FSO$, and the sterile properties of the water can be consequently the target value (FSO) or less.

Sampling points SP1 to SP6 (SP) for sampling the water in a sterile manner may be provided, for example, at the entrance of the water sterilizer 60, at the first sterilizer 62, and between the foreign-material removal filter 61 and the first sterilizer 62. A sampling line SL may be connected to at least one of the sampling points SP1 to SP6 with a valve, not illustrated, interposed therebetween. This enables the number of the microbes in the water to be readily measured in a manner in which the water is sampled in a sterile manner from the sampling points SP1 to SP6 or the sampling line SL. The sampling line SL may include a thermometer T. When the first sterile filter 63 and the second sterile filter 65 are sterilized by using vapor, the thermometer T may monitor the temperature of the vapor. In the case where the number of the microbes in the water is measured, and/or in the case where the variation in the state such as multiplying microbes is checked, the number of the microbes may be counted by using, for example, a plate culture medium. The number of the microbes in the water and/or the variation in the state of the microbes, for example, may be measured and/or checked by using, for example, a microorganisms-measuring instrument (such as a real-time microorganism detector IMD-W (registered trademark) made by Azbil Corporation) or a fine-particle-measuring instrument (underwater particle counter).

The capacity of the water sterilizer 60 is preferably equal to or more than 105% of the maximum capacity required for manufacturing the product bottles 101, more preferably equal to or more than 110% of the maximum capacity required for manufacturing the product bottles 101. For example, the capacity of the water sterilizer 60 may be 5 m³/h or more and 50 m³/h or less and may be, for example, 24 m³/h. In the case where the capacity of the water sterilizer 60 is equal to or more than 105% of the maximum capacity required for manufacturing the product bottles 101, a predetermined amount of the water can be stored in the second water tank 52 when the product bottles 101 are manufactured. In this case, the appropriate design of the volume of the second water tank 52 prevents the water from lacking even when the first sterile filter 63 described above, for example, is sterilized (SIP) or during the integrity test, enables the product bottles 101 to be manufactured, enables the first sterile filter 63, for example, to be sterilized (SIP), and enables the integrity test to be conducted. The time required for sterilizing (SIP), for example, the first sterile filter 63 and the time required for conducting the integrity test are roughly 30 minutes or more and roughly 1 hour or less. For this reason, the volume of the second water tank 52 may be equal to or more than the amount of the water that is used by the content-filling system 10 when the product bottles 101 are manufactured for 1 hour.

The capacity of the water sterilizer 60 may be controlled by the control unit 90. For example, the control unit 90 may determine the amount of the water that is used to clean and sterilize the content-filling system 10 and may determine the amount of the water that is sterilized by the water sterilizer 60 in the water sterilization line 50 while the product bottles 101 are manufactured, based on the determined amount of the water. The amount of the sterile water required to clean and/or sterilize, for example, the insides of the chambers after the product bottles 101 are manufactured can be grasped for every chamber. For this reason, the capacity of the water sterilizer 60 may be controlled by the control unit 90 such that the sterile water that is used after the product bottles 101 are manufactured is stored while one lot of the product bottles 101 are manufactured. This enables the insides of the chambers, for example, to be cleaned and/or sterilized immediately after the product bottles 101 are manufactured. For this reason, a downtime can be decreased.

The water sterilizer 60 preferably continues to sterilize the water without stopping sterilizing the water while the product bottles 101 are manufactured in a manner in which the content is filled in the bottles 100 at the content-filling system 10. This can inhibit the microbes from multiplying in the first sterile filter 63 and the second sterile filter 65. That is, in the case where the water stops flowing in the water sterilizer 60, there is a possibility that the microbes multiply in the first sterile filter 63 and the second sterile filter 65. However, the microbes can be inhibited from multiplying in the first sterile filter 63 and the second sterile filter 65 in a manner in which the pump P1 is not stopped, and the water continues to be sterilized while the product bottles 101 are manufactured at the content-filling system 10. In the case where the second water tank 52 is completely filled with the water while the product bottles 101 are manufactured at the content-filling system 10, the sterilized water may be circulated in the circulation system 59A (see, for example, FIG.

2A). This can inhibit the water from stopping flowing in the water sterilizer 60 even in the case where the second water tank 52 is completely filled with the water. For this reason, the microbes can be inhibited from multiplying in the first sterile filter 63 and the second sterile filter 65. In some cases where the time for which the sterilized water circulates increases, the temperature of the sterilized water increases due to the radiant energy of the ultraviolet rays that are radiated from the ultraviolet radiation unit 67. In this case, the water that flows through the circulation line 59 may not be supplied to the first water tank 51 but may be discharged from the circulation line 59. The temperature of the circulating water may be inhibited from increasing in a manner in which the pure-water-manufacturing device 50a supplies new pure water to the first water tank 51.

The undiluted-solution sterilization line 70 will now be described. The undiluted-solution sterilization line 70 heats and sterilizes the product undiluted solution.

Figure 7:
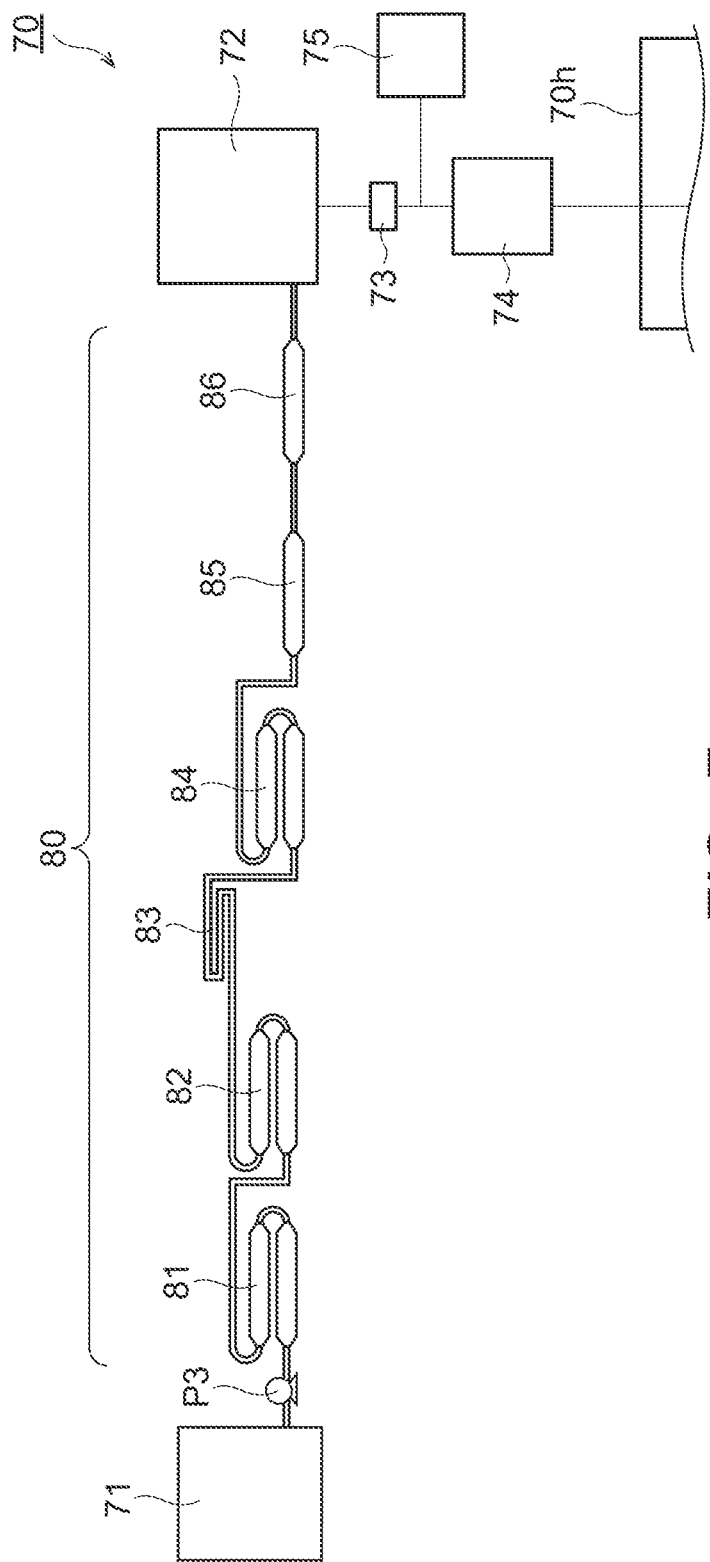
FIG. 7 schematically illustrates an undiluted-solution sterilization line according to an embodiment.

As illustrated in FIG. 7, the undiluted-solution sterilization line 70 includes a first undiluted-solution tank 71, a product-undiluted-solution sterilizer 80, and a second undiluted-solution tank 72. The first undiluted-solution tank 71, the product-undiluted-solution sterilizer 80, and the second undiluted-solution tank 72 are arranged in this order from an upstream position to a downstream position in a direction in which the product undiluted solution is conveyed.

The first undiluted-solution tank 71 stores the product undiluted solution that is supplied from a supply source not illustrated. The first undiluted-solution tank 71 has a function of storing the product undiluted solution and consequently causing the product undiluted solution to smoothly flow. The volume of the first undiluted-solution tank 71 may be 0.3 m$^3$ or more and 3 m$^3$ or less and may be, for example, 1 m$^3$.

A pump P3 that conveys the product undiluted solution may be disposed downstream of the first undiluted-solution tank 71. The product-undiluted-solution sterilizer 80 described above is disposed downstream of the pump P3.

The product-undiluted-solution sterilizer 80 heats and sterilizes the product undiluted solution that is stored in the first undiluted-solution tank 71. According to the present embodiment, the product-undiluted-solution sterilizer 80 may be a sterilizer (Ultra High-temperature, which is simply referred to below as UHT) that sterilizes the product undiluted solution by using an ultra-high-temperature heat treatment method. The UHT 80 includes a first heating portion 81, a second heating portion 82, a holding tube 83, a first cooling portion 84, a second cooling portion 85, and a third cooling portion 86. The product undiluted solution that is supplied to the UHT 80 is gradually heated by the first heating portion 81 and the second heating portion 82 and is heated to a target temperature in the holding tube 83. In this case, for example, the product undiluted solution may be heated to a temperature of 60° C. or more and 80° C. or less by using the first heating portion 81 and may be heated to a temperature of 80° C. or more and 150° C. or less by using the second heating portion 82. The temperature of the product undiluted solution is maintained in the holding tube 83 for a predetermined time. The product undiluted solution that passes through the holding tube 83 is gradually cooled by the first cooling portion 84, the second cooling portion 85, and the third cooling portion 86. The number of the heating portions and the cooling portions are increased or decreased as needed. The pressure loss of the product undiluted solution can increase between the first heating portion 81 and the second heating portion 82. For this reason, an additional pump (not illustrated) may be disposed between the first heating portion 81 and the second heating portion 82. A homogenizer that makes the quality of the product undiluted solution uniform may be disposed, for example, between the first heating portion 81 and the second heating portion 82 or between the first cooling portion 84 and the second cooling portion 85.

The capacity of the UHT 80 may be 3 m$^3$/h or more and 30 m$^3$/h or less and may be, for example, 6 m$^3$/h.

The temperature of a location on the UHT 80 at which the temperature is highest (for example, the second heating portion 82) may be monitored, and scale (such as a calcium deposit) adhering to the UHT 80 may be consequently monitored. When the UHT 80 is cleaned (CIP), the state of removal of the scale may be monitored. This enables a process of cleaning the UHT 80 to be optimized. For this reason, the time for cleaning can be decreased, and the amount of the water, the vapor, and the detergent that are used for cleaning can be decreased. As a result, the amount of carbon dioxide that is discharged by the content-filling system 10 can be decreased.

The UHT 80 may use an injection or infusion method. A heat exchanger that is used to exchange heat at the content-filling system 10 such as a heat exchanger in the UHT 80 may be a plate heat exchanger or a shell and tube heat exchanger.

The second undiluted-solution tank 72 is a tank (a so-called aseptic tank) that stores the product undiluted solution that is sterilized by the product-undiluted-solution sterilizer 80. The second undiluted-solution tank 72 has a function of storing the sterilized product undiluted solution and consequently causing the product undiluted solution to smoothly flow. The volume of the second undiluted-solution tank 72 may be 1 m$^3$ or more and 20 m$^3$ or less and may be, for example, 2 m$^3$.

An auxiliary filter 73 that filters the sterilized product undiluted solution and a third undiluted-solution tank 74 that stores the product undiluted solution that passes through the auxiliary filter 73 may be disposed downstream of the second undiluted-solution tank 72. In this case, the third undiluted-solution tank 74 may be a so-called filling tank and may be installed above the undiluted-solution-filling device 22 in the vertical direction in order to improve the filling accuracy of the undiluted-solution-filling device 22. The third undiluted-solution tank 74 may have a function of ensuring the smooth flow of the product undiluted solution even in the case where the amount of the product undiluted solution that is used at a position downstream of the third undiluted-solution tank 74 changes, that is, may function as a so-called cushion tank. The volume of the third undiluted-solution tank 74 may be 0.1 m$^3$ or more and 1 m$^3$ or less and may be, for example, 0.3 m$^3$. The auxiliary filters 73 may be disposed at ends of or inside all of the undiluted-solution-filling nozzles (see, for example, FIG. 16C described later) of the undiluted-solution-filling device 22.

An addition unit 75 that adds a solid into the product undiluted solution may be coupled downstream of the second undiluted-solution tank 72. This enables the content that contains the solid to be filled in the bottles 100 at the content-filling system 10. In this case, examples of the solid that is added into the product undiluted solution by using the addition unit 75 may include a pulp, nata de coco, tapioca or aloe. The solid may be a sterile solid that is sterilized in advance.

(Method of Filling Content)

A method of filling the content by using the content-filling system 10 (FIG. 1) described above will now be described with reference to FIG. 8.

Figure 8:
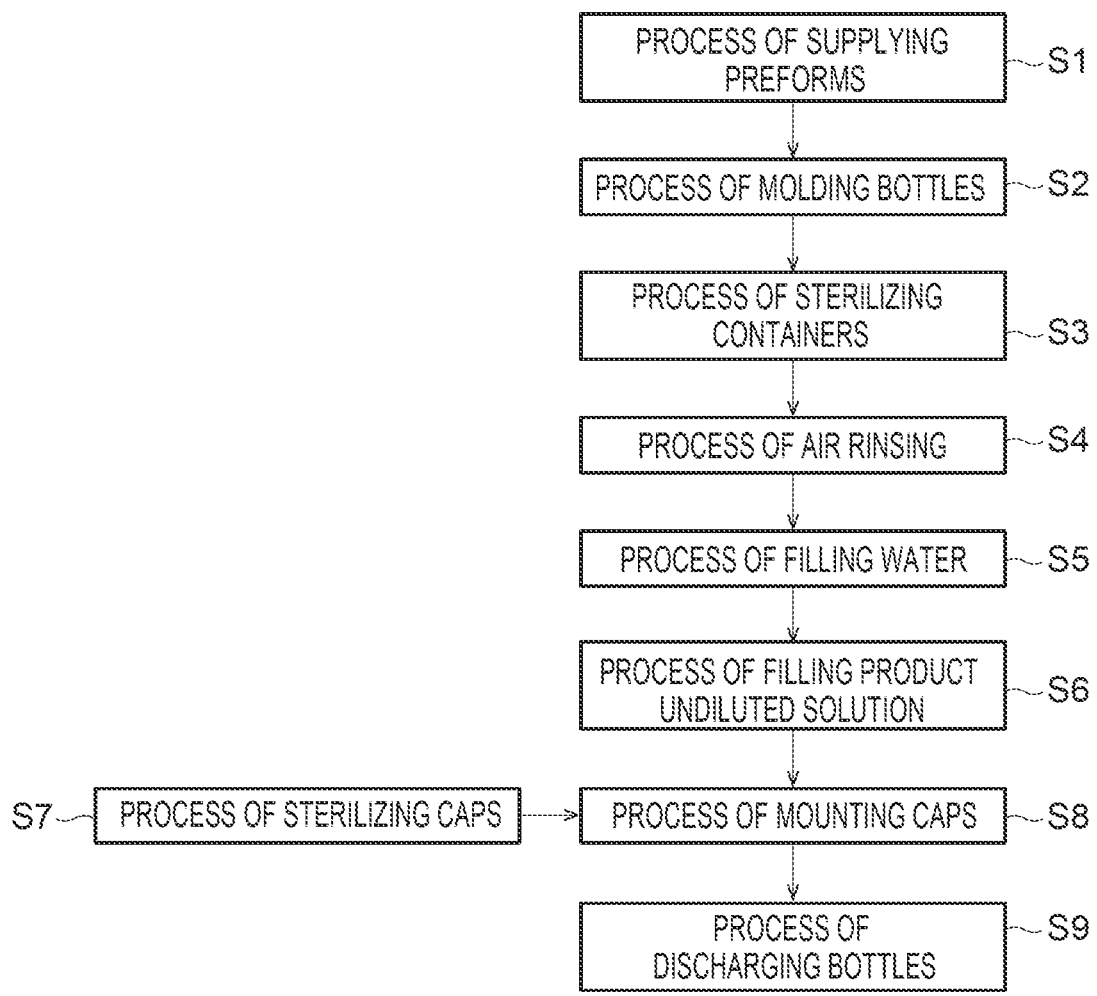
FIG. 8 is a flowchart illustrating a method of filling a content by using the content-filling system according to an embodiment.

First, the preform-supplying device 1 sequentially supplies the multiple preforms 100a to the receiving portion 34 of the preform-conveying unit 31 via the preform-supplying conveyor 2 (a process of supplying the preforms, a symbol S1 in FIG. 8). At this time, at the preform-sterilizing device 34a, gas or mist of hydrogen peroxide is blown to the preforms 100a, and the preforms 100a are consequently sterilized and are subsequently dried by using hot air.

Subsequently, the preforms 100a are conveyed to the heating portion 35 and are heated by the heater 35a roughly to a temperature of, for example, 90° C. or more and 130° C. or less. Subsequently, the preforms 100a that are heated by the heating portion 35 are conveyed to the delivering portion 36. The preforms 100a are conveyed from the delivering portion 36 to the blow molding unit 32.

Subsequently, blow molding is performed on the preforms 100a that are conveyed to the blow molding unit 32 by using the mold not illustrated, and the bottles 100 are blow-molded (a process of molding the bottles, a symbol S2 in FIG. 8). The bottles 100 that are blow-molded are conveyed to the bottle-conveying unit 33.

Subsequently, at the sterilizing device 11, the bottles 100 are sterilized by using the hydrogen peroxide solution that serves as a sterilizing agent (a process of sterilizing the containers, a symbol S3 in FIG. 8). At this time, the sterilizing agent may be gas or mist that is obtained by evaporating the hydrogen peroxide solution once at a boiling point or more. The gas or mist of the hydrogen peroxide solution adheres to the inner surface and outer surface of the bottles 100 and sterilizes the inner and outer surfaces of the bottles 100.

Subsequently, the bottles 100 are conveyed to the air-rinsing device 14. At the air-rinsing device 14, the room temperature air or the heated air that is sterile is supplied to the bottles 100. Consequently, hydrogen peroxide is activated, and foreign material and the hydrogen peroxide, for example, are removed from the bottles 100 (a process of air rinsing, a symbol S4 in FIG. 8). In the process of air rinsing, condensation mist of the hydrogen peroxide having a low concentration may be mixed with the room temperature air that is sterilized or the heated air that is sterile as needed. In this case, the hydrogen peroxide is gasified by the sterile air. In the process of air rinsing, the gasified hydrogen peroxide may be supplied to the bottles 100.

Subsequently, the bottles 100 are conveyed to the filling device 20. At this time, at the water-filling device 21 of the filling device 20, the water is first filled in the bottles 100 (a process of filling the water, a symbol S5 in FIG. 8). At the water-filling device 21, while the bottles 100 are rotated (revolved), the water is filled in the bottles 100 via the mouths thereof. The water is sterilized at the water sterilization line 50 in advance before being filled in the bottles 100 by using the water-filling device 21.

At the water-filling device 21, the sterilized water is filled at room temperature in the bottles 100 that are sterilized. The temperature of the water when the water is filled is, for example, roughly 3° C. or more and 40° C. or less. The filling rate at which the water-filling device 21 fills the water in the bottles 100 may be higher than the filling rate at which the undiluted-solution-filling device 22 fills the product undiluted solution in the bottles 100. At the water-filling device 21, the filling rate at which the water is filled may be 100 ml/sec or more and 500 mL/sec or less.

Subsequently, at the undiluted-solution-filling device 22 of the filling device 20, the product undiluted solution is filled in the bottles 100 in which the water is filled (a process of filling the product undiluted solution, a symbol S6 in FIG. 8). At the undiluted-solution-filling device 22, while the bottles 100 are rotated (revolved), the product undiluted solution is filled in the bottles 100 via the mouths thereof. The product undiluted solution is heated and sterilized in advance at the undiluted-solution sterilization line 70 before being filled in the bottles 100 by using the undiluted-solution-filling device 22. In the case where the acidity of the content is less than a pH of 4.5, a heating temperature at which the product undiluted solution is heated may typically be roughly 60° C. or more and 120° C. or less, and the heating time may be roughly 30 seconds or more and 120 seconds or less. In the case where the acidity of the content is a pH of 4.5 or more, the heating temperature at which the product undiluted solution is heated may be roughly 115° C. or more and 150° C. or less. The heating time may be roughly 30 seconds or more and 120 seconds or less. Consequently, all of microorganisms that can grow in the product bottles 101 among microorganisms in the product undiluted solution before the product undiluted solution is filled are killed. The product undiluted solution that is heated and sterilized is cooled roughly to a temperature of 3° C. or more and 40° C. or less.

At the undiluted-solution-filling device 22, the product undiluted solution that is sterilized as above and that is cooled to room temperature is filled at room temperature in the bottles 100 in which the water is filled. The temperature of the product undiluted solution when the product undiluted solution is filled is, for example, roughly 3° C. or more and 40° C. or less. At the undiluted-solution-filling device 22, the filling rate at which the product undiluted solution is filled may be 30 ml/sec or more and 200 ml/sec or less.

Subsequently, the bottles 100 in which the content is filled are conveyed to the cap-mounting device 16 by using the conveyance wheels 12.

The caps 88 are sterilized by the cap-sterilizing device 18 in advance (a process of sterilizing the caps, a symbol S7 in FIG. 8). Meanwhile, the caps 88 are loaded onto the cap-sterilizing device 18 from a location outside the content-filling system 10. Subsequently, at the cap-sterilizing device 18, gas or mist of hydrogen peroxide is blown to the caps 88, the inner and outer surfaces thereof are sterilized, and subsequently, the caps 88 are dried by using hot air and are conveyed to the cap-mounting device 16.

Subsequently, at the cap-mounting device 16, the caps 88 that are sterilized are mounted on the mouths of the bottles 100 that are conveyed from the filling device 20. Consequently, the bottles 100 are capped, and the product bottles 101 are obtained (a process of mounting the caps, a symbol S8 in FIG. 8).

Subsequently, the product bottles 101 are conveyed from the cap-mounting device 16 to the product-bottle-unloading unit 25 and are unloaded onto a location outside the content-filling system 10 (a process of discharging the bottles, a symbol S9 in FIG. 8). The product bottles 101 are conveyed to a packaging line not illustrated and packed.

The process of sterilizing the containers, the process of air rinsing, the process of filling the water, the process of filling the product undiluted solution, the process of mounting the caps, and the process of discharging the bottles described above are performed in a sterile atmosphere that is surrounded by the sterilizing-agent spray chamber 70d, the air-rinsing chamber 70e, the first sterile chamber 70f, the intermediate area chamber 70g, the second sterile chamber 70h, and the exit chamber 70i, that is, a sterile environment. The process of sterilizing the caps is performed by the cap-sterilizing device 18. In this case, the sterilizing-agent spray chamber 70d, the air-rinsing chamber 70e, the first sterile chamber 70*f*, the intermediate area chamber 70*g*, the second sterile chamber 70*h*, the exit chamber 70*i*, and the cap-sterilizing device 18 are sterilized in advance, for example, in a manner in which hydrogen peroxide or peracetic acid is splayed, or warm water is sprayed.

After the chambers are sterilized, sterile air having positive pressure is supplied into the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i* such that the sterile air is always blown out from the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i*. The sterile air having positive pressure is supplied into the cap-sterilizing device 18 such that the sterile air is always blown out from the cap-sterilizing device 18.

In the case where the sterile air having positive pressure is thus supplied into the chambers 70*d* to 70*i*, the sterile air in the chambers and the sterilizing agent that is used for sterilizing the bottles are exhausted by using the atmosphere shielding chamber 70*c*, the sterilizing-agent spray chamber 70*d*, and the exit chamber 70*i*. At this time, the pressure in the chambers may be adjusted such that the pressure in the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i* is positive pressure. In this case, the pressure in the sterilizing-agent spray chamber 70*d* may be −10 Pa or more and 10 Pa or less as described above. The pressure in the air-rinsing chamber 70*e* may be 10 Pa or more and 30 Pa or less. The pressure in the first sterile chamber 70*f* may be 30 Pa or more and 60 Pa or less. The pressure in the intermediate area chamber 70*g* may be 20 Pa or more and 50 Pa or less. The pressure in the second sterile chamber 70*h* may be 10 Pa or more and 40 Pa or less. The pressure in the exit chamber 70*i* may be 10 Pa or more and 20 Pa or less.

A rate at which the bottles 100 are manufactured (conveyed) at the content-filling system 10 is preferably 100 bpm or more and 1500 bpm or less. The bpm (the bottles per minute) represents the conveyance speed of the bottles 100 per one minute.

(Method of Sterilizing Content-Filling System)

A method of sterilizing the content-filling system 10 described above (FIG. 1) will now be described. A method (simply referred to below as a method of sterilizing the chambers) of sterilizing the first sterile chamber 70*f*, the intermediate area chamber 70*g*, and the second sterile chamber 70*h* will be described below with reference to FIG. 9.

Method of Sterilizing Chambers

An operation button of the control unit 90, for example, is first operated after the content-filling system 10 ends filling the beverage. In response to this, the water-filling nozzles of the water-filling device 21 are covered by CIP cups (not illustrated). The water-filling nozzles of the water-filling device 21 are thus covered by the CIP cups (not illustrated), and the inside of the water-filling device 21 is consequently kept sterile. That is, the water-filling device 21 is physically protected such that no microbes enter the water-filling device 21 via the ends of the water-filling nozzles. The operation button of the control unit 90 is operated, and the gaps of the partition walls that separate the sterilizing-agent spray chamber 70*d*, the air-rinsing chamber 70*e*, the first sterile chamber 70*f*, the intermediate area chamber 70*g*, and the second sterile chamber 70*h* from each other are covered by the shutters (not illustrated).

Subsequently, the pressure in the first sterile chamber 70*f* is increased. At this time, sterile air is supplied into the first sterile chamber 70*f* from a sterile-air-supplying device (not illustrated), and the pressure in the first sterile chamber 70*f* is consequently increased. At this time, an intake amount and/or a displacement amount of each chamber is adjusted such that the pressure in the first sterile chamber 70*f* is predetermined pressure. At this time, the pressure in the first sterile chamber 70*f* is increased, for example, from 30 Pa to, for example, 40 Pa. Consequently, the air in the sterilizing-agent spray chamber 70*d* and the air in the intermediate area chamber 70*g* do not enter the first sterile chamber 70*f*.

In this case, the pressure in the sterilizing-agent spray chamber 70*d* may be 0 Pa or more and 20 Pa or less as described above. The pressure in the air-rinsing chamber 70*e* may be 10 Pa or more and 40 Pa or less. The pressure in the first sterile chamber 70*f* may be 40 Pa or more and 100 Pa or less. The pressure in the intermediate area chamber 70*g* may be 10 Pa or more and 40 Pa or less. The pressure in the second sterile chamber 70*h* may be 0 Pa or more and 20 Pa or less. The pressure in the exit chamber 70*i* may be 0 Pa or more and 20 Pa or less.

Figure 9:
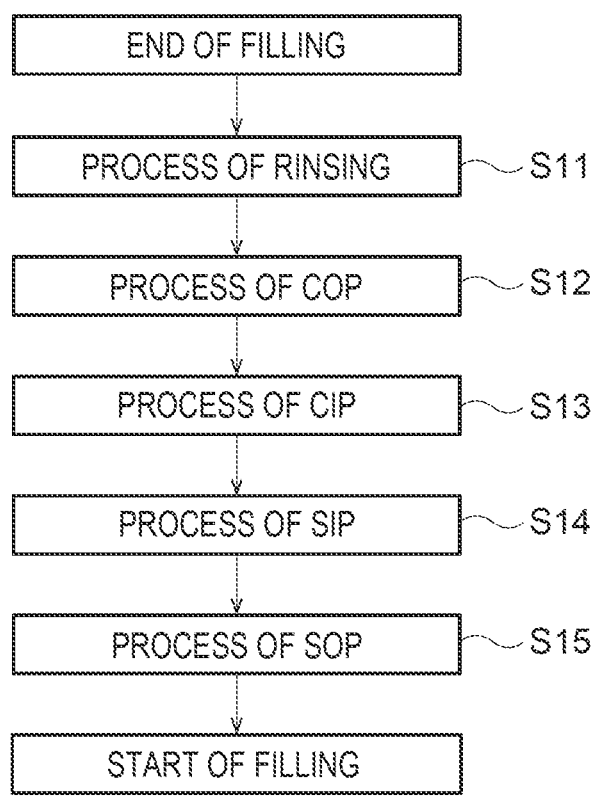
FIG. 9 is a flowchart illustrating a method of sterilizing a chamber corresponding to a method of sterilizing the content-filling system according to an embodiment.

Subsequently, sterile water is supplied into the intermediate area chamber 70*g* and the second sterile chamber 70*h* (a process of rinsing, a symbol S11 in FIG. 9). Consequently, the content adhering to the inside of the intermediate area chamber 70*g* and the inside of the second sterile chamber 70*h* is rinsed by using the sterile water. At this time, the sterile water may be the water that is sterilized by the water sterilizer 60. There is a possibility that the content enters the first sterile chamber 70*f* from the second sterile chamber 70*h* via the intermediate area chamber 70*g*. For this reason, the sterile water may be supplied into the first sterile chamber 70*f*, and the content adhering to the inside of the first sterile chamber 70*f* may be consequently rinsed. If the caps 88 or the bottles 100, for example, fall into the second sterile chamber 70*h*, the caps 88 or the bottles 100 are collected. The conveyance wheel 12 that is disposed downstream of the cap-mounting device 16 may be replaced with a different type of the conveyance wheel 12 so as to be suitable for, for example, the shapes of the bottles 100 to be subsequently used. At the cap-mounting device 16, a chuck (not illustrated) of a capper head may be replaced so as to be suitable for, for example, the sizes of the caps 88 to be subsequently used.

Subsequently, the inside of the second sterile chamber 70*h* is cleaned with the inside of the first sterile chamber 70*f* kept sterile. At this time, the inside of the intermediate area chamber 70*g* and the inside of the second sterile chamber 70*h* are first cleaned (COP) (a process of COP, a symbol S12 in FIG. 9). At this time, detergent such as an alkali chemical and water, for example, are sprayed into the intermediate area chamber 70*g* and the second sterile chamber 70*h* via spraying nozzles (not illustrated) that are disposed in the intermediate area chamber 70*g* and the second sterile chamber 70*h*. Consequently, an inner wall surface of, for example, the intermediate area chamber 70*g* and the surface of equipment of, for example, the filling device 20 are cleaned. At this time, the water may be the sterile water that is sterilized by the water sterilizer 60.

When the inside of the second sterile chamber 70*h* is cleaned (COP), of the first bypass line 55 and the second bypass line 56, at least the second bypass line 56 is preferably cleaned (CIP) and is sterilized (SIP) in advance. In the case where the second bypass line 56 is cleaned (CIP) or sterilized (SIP), detergent or a sterilizing agent may be supplied to the second bypass line 56 from a connection point CP1 (see, for example, FIG. 1 and FIG. 2A) at which the second bypass line 56 is connected to the water sterilization line 50. Examples of the detergent and the sterilizing agent may include peracetic acid, hydrogen peroxide, an alkali chemical, an acid chemical, and sodium hypochlorite. Subsequently, the sterile water may be supplied from the second water tank 52 that stores the sterile water in advance to the second bypass line 56, and the second bypass line 56 may be consequently rinsed by using the sterile water. In the case where the first bypass line 55 is cleaned (CIP) or sterilized (SIP), the detergent or the sterilizing agent may be supplied to the first bypass line 55 from a connection point CP2 (see, for example, FIG. 1 and FIG. 2A) at which the first bypass line 55 is connected to the water sterilization line 50.

Subsequently, the undiluted-solution-filling device 22 is cleaned (CIP) (a process of CIP, a symbol S13 in FIG. 9) with the inside of the first sterile chamber 70f kept sterile. At this time, the undiluted-solution-filling nozzles of the undiluted-solution-filling device 22 are first covered by CIP cups (not illustrated). Subsequently, the flow path for the content in the undiluted-solution-filling device 22 is rinsed by water, and detergent obtained by adding an alkali chemical such as caustic soda or an acid chemical such as nitric acid into the water, for example, is supplied to the flow path. Consequently, a residue of the previous beverage adhering to the flow path for the content in the undiluted-solution-filling device 22, for example, is removed. At this time, the water may be the sterile water that is sterilized by the water sterilizer 60.

Subsequently, the inside of the second sterile chamber 70h is sterilized with the inside of the first sterile chamber 70f kept sterile. At this time, the undiluted-solution-filling device 22 is first sterilized (SIP) (a process of SIP, a symbol S14 in FIG. 9). At this time, heated vapor or hot water is supplied to the flow path for the content in the undiluted-solution-filling device 22. Consequently, the flow path for the content in the undiluted-solution-filling device 22 is sterilized. At this time, the water may be the sterile water that is sterilized by the water sterilizer 60.

Subsequently, the inside of the intermediate area chamber 70g and the inside of the second sterile chamber 70h are sterilized (SOP) (a process of SOP, a symbol S15 in FIG. 9). At this time, a sterilizing agent such as peracetic acid or a hydrogen peroxide solution is sprayed to the inside of the intermediate area chamber 70g and the inside of the second sterile chamber 70h from the spraying nozzles (not illustrated) that are disposed in the intermediate area chamber 70g and in the second sterile chamber 70h. Subsequently, sterile water is sprayed to the inside of the intermediate area chamber 70g and the inside of the second sterile chamber 70h from the spraying nozzles (not illustrated). Consequently, the inner wall surface of, for example, the intermediate area chamber 70g and the surface of the equipment of, for example, the filling device 20 are sterilized. At this time, the sterile water may be the sterile water that is sterilized by the water sterilizer 60. This enables the amount of carbon dioxide that is discharged by the content-filling system 10 to be decreased. Before and after or simultaneously while the inside of the second sterile chamber 70h is sterilized by using the sterilizing agent, at least the inside of the first sterile chamber 70f and the insides of the air-rinsing chamber 70e and the sterilizing-agent spray chamber 70d may also be cleaned by using peracetic acid detergent and may be rinsed by using the sterile water that is sterilized by the water sterilizer 60. This enables the sterile properties that are stable to be maintained for a long time and enables the level of the sterile properties to be increased.

The inside of the first sterile chamber 70f may be sterilized again over the entire area while the inside of the second sterile chamber 70h is sterilized. At this time, the inside of the first sterile chamber 70f may be sterilized again over the entire area, for example, in a manner in which a sterilizing agent such as a hydrogen peroxide solution is sprayed to the inside of the first sterile chamber 70f, and subsequently, the inside of the first sterile chamber 70f is dried by using hot air.

In this way, the content-filling system 10 is sterilized.

Subsequently, the CIP cups (not illustrated) by which the water-filling nozzles of the water-filling device 21 are covered are removed. The sterile water that is held in the water-filling nozzles of the water-filling device 21 is discharged into the first sterile chamber 70f. This can prevent the sterilizing agent from being filled in the bottles 100 even though the sterilizing agent, for example, enters the water-filling nozzles from locations outside the CIP cups. In addition, in the case where the inside of the first sterile chamber 70f is sterilized again as described above and even in the case where the sterilizing agent is not completely removed from the CIP cups by which the water-filling nozzles are covered, and the sterilizing agent adheres to the CIP cups, the sterilizing agent, for example, can be prevented from being filled in the bottles 100. The amount of the water that is discharged into the first sterile chamber 70f is preferably equal to or more than that for the single bottle 100 that is used for next manufacturing. Subsequently, the gaps that are covered by the shutters are uncovered, and the next content starts to be filled.

Figure 10A:
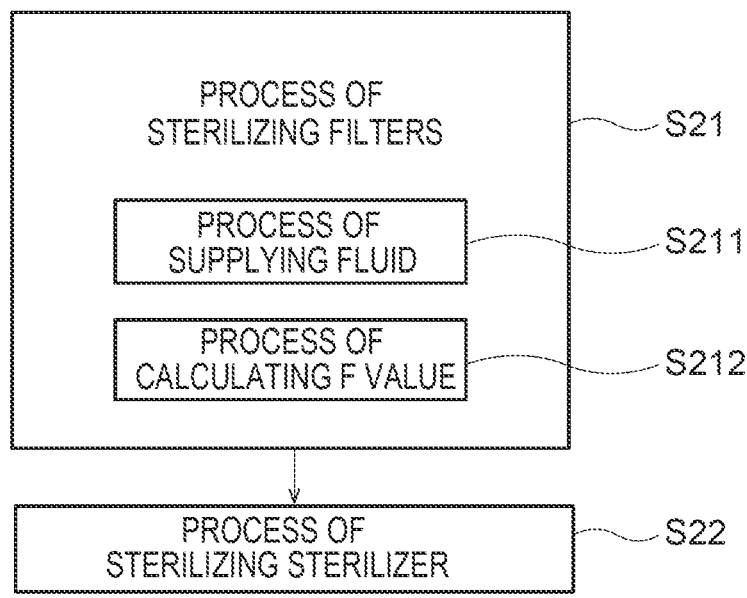
FIG. 10A is a flowchart illustrating a method of sterilizing the water sterilizer corresponding to the method of sterilizing the content-filling system according to an embodiment.

A method of sterilizing the water sterilizer 60 will now be described with reference to FIG. 10A.

Method of Sterilizing Water Sterilizer

The operation button of the control unit 90, for example, is first operated after the content-filling system 10 ends filling the beverage. In response to this, the water sterilizer 60 starts to be sterilized (SIP). The water sterilizer 60 may be sterilized while the product bottles 101 are manufactured. In this case, even in the case where the water sterilizer 60 stops sterilizing the water, the use of the sterile water that is stored in the second water tank 52 enables the product bottles 101 to be manufactured.

When the water sterilizer 60 is sterilized, the first sterile filter 63 and/or the second sterile filter 65 (also simply referred to below as the first sterile filter 63, for example,) is sterilized (a process of sterilizing the filters, a symbol S21 in FIG. 10A). At this time, heated vapor (fluid) or hot water (fluid) is supplied to the flow path in, for example, the first sterile filter 63 (a process of supplying the fluid, a symbol S211 in FIG. 10A). At this time, the vapor for sterilization is supplied to, for example, the first sterile filter 63 from, for example, the sterile-air inlet 60a.

Subsequently, the temperature of the heated vapor or the hot water that is supplied to the flow path in, for example, the first sterile filter 63 is measured, and the F value is calculated based on the measured temperature (a process of calculating the F value, a symbol S212 in FIG. 10A).

Subsequently, in the case where the F value is the desired value or more, sterilizing the first sterile filter 63, for example, ends. In this way, the first sterile filter 63, for example, is sterilized. The first sterile filter 63, for example, is thus heated and sterilized by using the F value, and the first sterile filter 63, for example, can be consequently sterilized without excessively heating, for example, the first sterile filter 63. For this reason, the amount of carbon dioxide that is discharged by the content-filling system 10 can be decreased. Since the first sterile filter 63, for example, can be sterilized without excessively heating, for example, the first sterile filter 63, the membrane of, for example, the first sterile filter 63 can be inhibited from being damaged. For this reason, the lifetime of the first sterile filter 63, for example, can be increased, and the first sterile filter 63, for example, can be used for a long time without being replaced.

When the first sterile filter 63, for example, is sterilized, valves (not illustrated) that are disposed at the sampling points SP1 to SP6 may be opened or closed, and a region to be sterilized by using the vapor may be consequently divided. For example, the vapor that is used to sterilize the first sterile filter 63 may be supplied to a region between the sampling point SP3 and the sampling point SP4, and the region may be consequently sterilized. The vapor that is used to sterilize the second sterile filter 65 may be supplied to a region between the sampling point SP5 and the sampling point SP6, and the region may be consequently sterilized. The foreign-material removal filter 61 may be sterilized together with the first sterile filter 63 and the second sterile filter 65.

Subsequently, the first sterilizer 62 and/or the second sterilizer 64 (also simply referred to below as the first sterilizer 62, for example,) is sterilized. At this time, vapor or hot water is supplied to, for example, the circulation system 59A that includes the water sterilizer 60 (a process of sterilizing the sterilizer, a symbol S22 in FIG. 10A). Consequently, the first ultraviolet lamp 67$a$, the second ultraviolet lamps 67$b$, and the third ultraviolet lamps 67$c$ (also simply referred to below as the first ultraviolet lamp 67$a$, for example,) of, for example, the first sterilizer 62 are sterilized by using the vapor or the hot water.

In the case where the first sterilizer 62, for example, is vulnerable to heat, the first sterilizer 62, for example, may be sterilized by using a sterilizing agent. At this time, the sterilizing agent is first supplied to the circulation system 59A that includes the water sterilizer 60 (a process of supplying the sterilizing agent, a symbol S221 in FIG. 10B). The sterilizing agent may be supplied from the sampling point SP2 or the sampling point SP4. The sterilizing agent may contain peracetic acid. In the case where the sterilizing agent contains peracetic acid, the concentration of the sterilizing agent may be 1000 ppm or more and 3000 ppm or less. When the concentration of the sterilizing agent is 1000 ppm or more, the sterilizing effect of the sterilizing agent on the first sterilizer 62, for example, can be improved. When the concentration of the sterilizing agent is 3000 ppm or less, the amount of the peracetic acid that is used can be decreased, and costs when the water sterilizer 60 is sterilized can be reduced.

The temperature of the sterilizing agent that is supplied to the circulation system 59A may be 50° C. or more and 70° C. or less. When the temperature of the sterilizing agent is 50° C. or more, the sterilizing effect of the sterilizing agent on the first sterilizer 62, for example, can be improved. When the temperature of the sterilizing agent is 70° C. or less, the first sterilizer 62, for example, can be sterilized without excessively heating the sterilizing agent. For this reason, the amount of carbon dioxide that is discharged by the content-filling system 10 can be decreased.

Figure 10B:
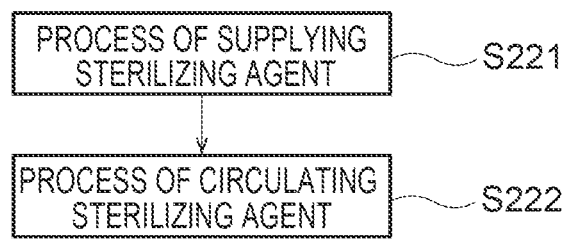
FIG. 10B is a flowchart illustrating another example of the method of sterilizing the water sterilizer corresponding to the method of sterilizing the content-filling system according to an embodiment.

Subsequently, the sterilizing agent is circulated through the circulation system 59A that includes the water sterilizer 60 (a process of circulating the sterilizing agent, a symbol S222 in FIG. 10B). In this case, the sterilizing agent may be circulated through the circulation system 59A at least for 10 seconds or more and 60 minutes or less, and the first sterilizer 62, for example, may be consequently sterilized. When the time for circulation is 10 seconds or more, the sterilizing effect of the sterilizing agent on the first sterilizer 62, for example, can be improved. When the time for circulation is 60 minutes or less, the time for sterilizing, for example, the first sterilizer 62 can be decreased. For this reason, the downtime can be decreased.

Subsequently, the sterilizing agent may be discharged from the sampling point SP3 or the sampling point SP5.

In this way, the water sterilizer 60 is sterilized.

No content adheres to the water sterilizer 60. As for, for example, the first sterilizer 62, the first ultraviolet lamp 67$a$, for example, radiates the ultraviolet rays when the product bottles 101 are manufactured. This reduces a possibility that the first sterilizer 62, for example, is contaminated by the microbes. For this reason, when the water sterilizer 60 is sterilized, the first sterilizer 62, for example, may not be sterilized.

According to the present embodiment described above, the content-filling system 10 includes the water sterilization line 50 that sterilizes water, the undiluted-solution sterilization line 70 that sterilizes the product undiluted solution, the water-filling device 21 that is connected to the water sterilization line 50 and is disposed in the first sterile chamber 70$f$, the undiluted-solution-filling device 22 that is connected to the undiluted-solution sterilization line 70 and is disposed in the second sterile chamber 70$h$, and the control unit 90 that controls the water-filling device 21 and the undiluted-solution-filling device 22. The control unit 90 causes the inside of the second sterile chamber 70$h$ to be cleaned with the inside of the first sterile chamber 70$f$ kept sterile. The control unit 90 causes the inside of the second sterile chamber 70$h$ to be sterilized with the inside of the first sterile chamber 70$f$ kept sterile. This enables the number of times the inside of the first sterile chamber 70$f$ is cleaned and sterilized can be decreased, and as for the content-filling system 10, the regions to be cleaned and sterilized can be narrowed. For this reason, the amount of the vapor that is used can be decreased. Since the regions to be cleaned and sterilized can be narrowed, the time for cleaning and the time for sterilization can be decreased. For this reason, the amount of carbon dioxide that is discharged by the content-filling system 10 can be decreased.

According to the present embodiment, the control unit 90 causes the undiluted-solution-filling device 22 to be cleaned with the inside of the first sterile chamber 70$f$ kept sterile. The control unit 90 causes the undiluted-solution-filling device 22 to be sterilized with the inside of the first sterile chamber 70$f$ kept sterile. This enables the number of times the inside of the first sterile chamber 70$f$ is cleaned and sterilized can be decreased, and as for the content-filling system 10, the regions to be cleaned and sterilized can be narrowed. For this reason, the amount of the vapor that is used can be decreased. Since the regions to be cleaned and sterilized can be narrowed, the time for cleaning and the time for sterilization can be decreased. For this reason, the amount of carbon dioxide that is discharged by the content-filling system 10 can be decreased.

According to the present embodiment, the pressure in the first sterile chamber 70$f$ is higher than the pressure in the second sterile chamber 70$h$. This can inhibit air in the second sterile chamber 70$h$ from entering the first sterile chamber 70$f$. For this reason, the state of the inside of the first sterile chamber 70$f$ that is sterile can be successfully maintained.

According to the present embodiment, the intermediate area chamber (the third sterile chamber) 70$g$ that couples the first sterile chamber 70$f$ and the second sterile chamber 70$h$ with each other is disposed between the first sterile chamber 70$f$ and the second sterile chamber 70$h$. The pressure in the intermediate area chamber 70$g$ is lower than the pressure in the first sterile chamber 70f and equal to or more than the pressure in the second sterile chamber 70h. This can inhibit air in the second sterile chamber 70h from entering the first sterile chamber 70f via the intermediate area chamber 70g. As a result, the state of the inside of the first sterile chamber 70f that is sterile can be successfully maintained.

According to the present embodiment, the air-rinsing chamber (the fourth sterile chamber) 70e is disposed upstream of the first sterile chamber 70f. The pressure in the air-rinsing chamber 70e is equal to or lower than the pressure in the first sterile chamber 70f. This can inhibit air in the air-rinsing chamber 70e from entering the first sterile chamber 70f. For this reason, the state of the inside of the first sterile chamber 70f that is sterile can be successfully maintained.

According to the present embodiment, the second bypass line 56 that connects the water sterilization line 50 and the second sterile chamber 70h to each other is disposed at the water sterilization line 50. This enables the water that is sterilized by the water sterilization line 50 to be supplied to the second sterile chamber 70h via the second bypass line 56. For this reason, the water that is sterilized by the water sterilization line 50 can be used in the second sterile chamber 70h.

According to the present embodiment, when the inside of the second sterile chamber 70h is cleaned, the control unit 90 causes the water that is sterilized by the water sterilization line 50 to be supplied to the second sterile chamber 70h via the second bypass line 56. This enables the amount of carbon dioxide that is discharged by the content-filling system 10 to be further decreased, unlike the case where the inside of the second sterile chamber 70h is cleaned by using sterile water that is manufactured by using a sterilizer that heats and sterilizes water.

According to the present embodiment, when the undiluted-solution-filling device 22 is cleaned, the control unit 90 causes the water that is sterilized by the water sterilization line 50 to be supplied to the second sterile chamber 70h via the second bypass line 56. This enables the amount of carbon dioxide that is discharged by the content-filling system 10 to be further decreased, unlike the case where the undiluted-solution-filling device 22 is cleaned by using sterile water that is manufactured by using a sterilizer that heats and sterilizes water.

According to the present embodiment, the control unit 90 determines the amount of the water that is used to clean and sterilize the content-filling system 10 and determines the amount of the water that is sterilized by the water sterilization line 50 while the product bottles 101 are manufactured, based on the determined amount of the water. In this case, the sterile water that is used after the product bottles 101 are manufactured can be stored while one lot of the product bottles 101 are manufactured. This enables the insides of the chambers to be cleaned and/or sterilized immediately after the product bottles 101 are manufactured. For this reason, a downtime can be decreased.

(Modifications to Content-Filling System)

Modifications to the content-filling system will now be described.

(First Modification)

In an example described according to the embodiment described above, the water sterilization line 50 (the water sterilizer 60) sterilizes the water without heating, but this is not a limitation. For example, the water sterilization line 50 (the water sterilizer 60) may sterilize the water by heating the water to a predetermined temperature. The number of the microbes in the pure water that is manufactured by the pure-water-manufacturing device 50a is typically smaller than that in the product undiluted solution, provided that the pure-water-manufacturing device 50a is appropriately managed. Accordingly, in the case where the content has a pH of less than 4.5 after filling, or after the caps 88 are mounted on the bottles 100, the water sterilization line 50 (the first sterilizer 62 and the second sterilizer 64) may sterilize the water such that the $F_0$ value is 0.00029 or more and less than 3.1. In the case where the content has a pH of 4.5 or more, the water sterilization line 50 (the first sterilizer 62 and the second sterilizer 64) may sterilize the water such that the $F_0$ value is 3.1 or more and 40 or less. In the case where contents that have different values of pH are filled in turn, the water sterilization line 50 (the first sterilizer 62 and the second sterilizer 64) may sterilize the water such that the $F_0$ value is uniformly 3.1 or more and 40 or less in order to decrease the number of times of cleaning and/or sterilization of the water sterilization line 50. The $F_0$ value is equal to the F value that is calculated in the case where the reference temperature Tr is 121.1° C., and the Z value is 10° C. in the above-described expression:

$$F = \int_{t_0}^{t_1} 10^{(T-Tr)/Z} dt \qquad \text{[Math, 2]}$$

(where T is the freely determined sterilization temperature (° C.), $10^{(T-Tr)/Z}$ is the lethality ratio at the freely determined sterilization temperature T, Tr is the reference temperature (° C.), and Z is the Z value (° C.)).

According to the present modification, the amount of carbon dioxide that is discharged when the water is sterilized can be decreased, unlike the case of using a sterilizer that simultaneously heats water and a product undiluted solution to high temperature and sterilizes the water and the product undiluted solution at the same sterilization intensity (typically, the $F_0$ value is roughly 30 or more and 80 or less). For this reason, the amount of carbon dioxide that is discharged by the content-filling system 10 can be decreased. In the case where the water sterilization line 50 (the first sterilizer 62 and the second sterilizer 64) changes the sterilization conditions, based on the pH of the content, the amount of carbon dioxide that is discharged when the water is sterilized can be further decreased, and the amount of carbon dioxide that is discharged by the content-filling system 10 can be further decreased.

(Second Modification)

In an example described according to the embodiment described above, the water-filling device 21 fills the water that is sterilized in the bottles 100, and the undiluted-solution-filling device 22 fills the product undiluted solution that is sterilized in the bottles 100 in which the water is filled, but this is not a limitation. For example, the undiluted-solution-filling device 22 may fill the product undiluted solution that is sterilized in the bottles 100, and the water-filling device 21 may fills the water that is sterilized in the bottles 100 in which the product undiluted solution is filled.

Figure 11:
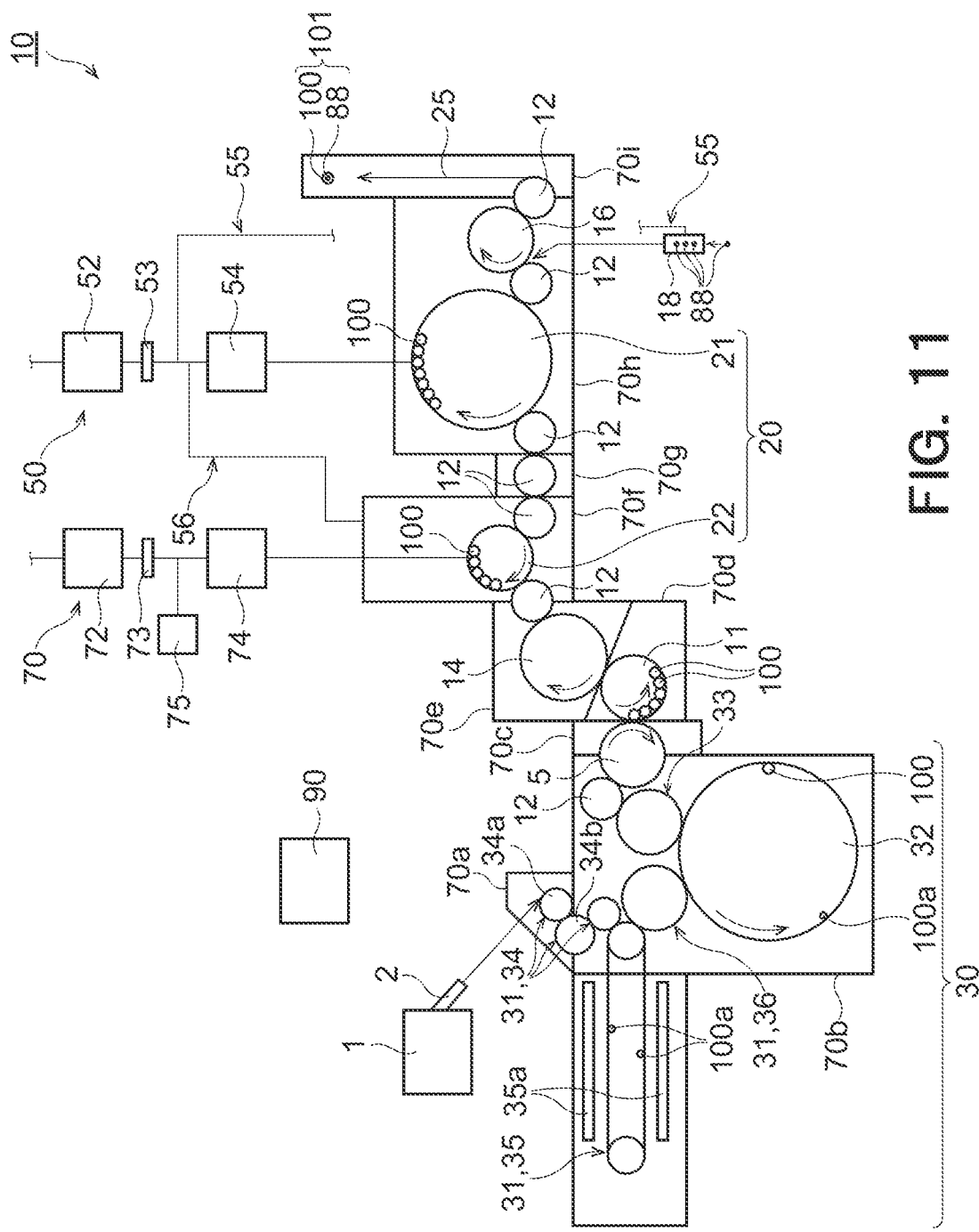
FIG. 11 schematically illustrates a plan view of a second modification to the content-filling system according to an embodiment.

In this case, as illustrated in FIG. 11, the undiluted-solution-filling device 22 may be disposed upstream of the water-filling device 21 in the direction in which the bottles 100 are conveyed. The undiluted-solution-filling device 22 may be contained in the first sterile chamber 70f. The water-filling device 21 may be contained in the second sterile chamber 70h.

(Third Modification)

In an example described according to the embodiment described above, the product undiluted solution is diluted with the water, but this is not a limitation. For example, the water or the product undiluted solution may be filled in the bottles 100 by using only the water-filling device 21 or the undiluted-solution-filling device 22. Specifically, only the water may be filled in the bottles 100 by using only the water-filling device 21. That is, at the content-filling system 10, mineral water may be manufactured by using only the water-filling device 21. Only the product undiluted solution may be filled in the bottles 100 by using only the undiluted-solution-filling device 22. That is, at the content-filling system 10, a so-called concentrated product may be manufactured by using only the undiluted-solution-filling device 22. In the case where only the product undiluted solution that does not need to be sterilized is filled in the bottles 100, the bottles 100 may be supplied to the conveyance wheel 12 that is contained in the intermediate area chamber 70g.

According to the present modification, the water or the product undiluted solution is filled in the bottles 100 by using only the water-filling device 21 or the undiluted-solution-filling device 22. This enables the mineral water and the so-called concentrated product to be manufactured at the content-filling system 10. For this reason, the kind of the product bottles 101 that are manufactured at the content-filling system 10 can be increased.

(Fourth Modification)

Figure 12A:
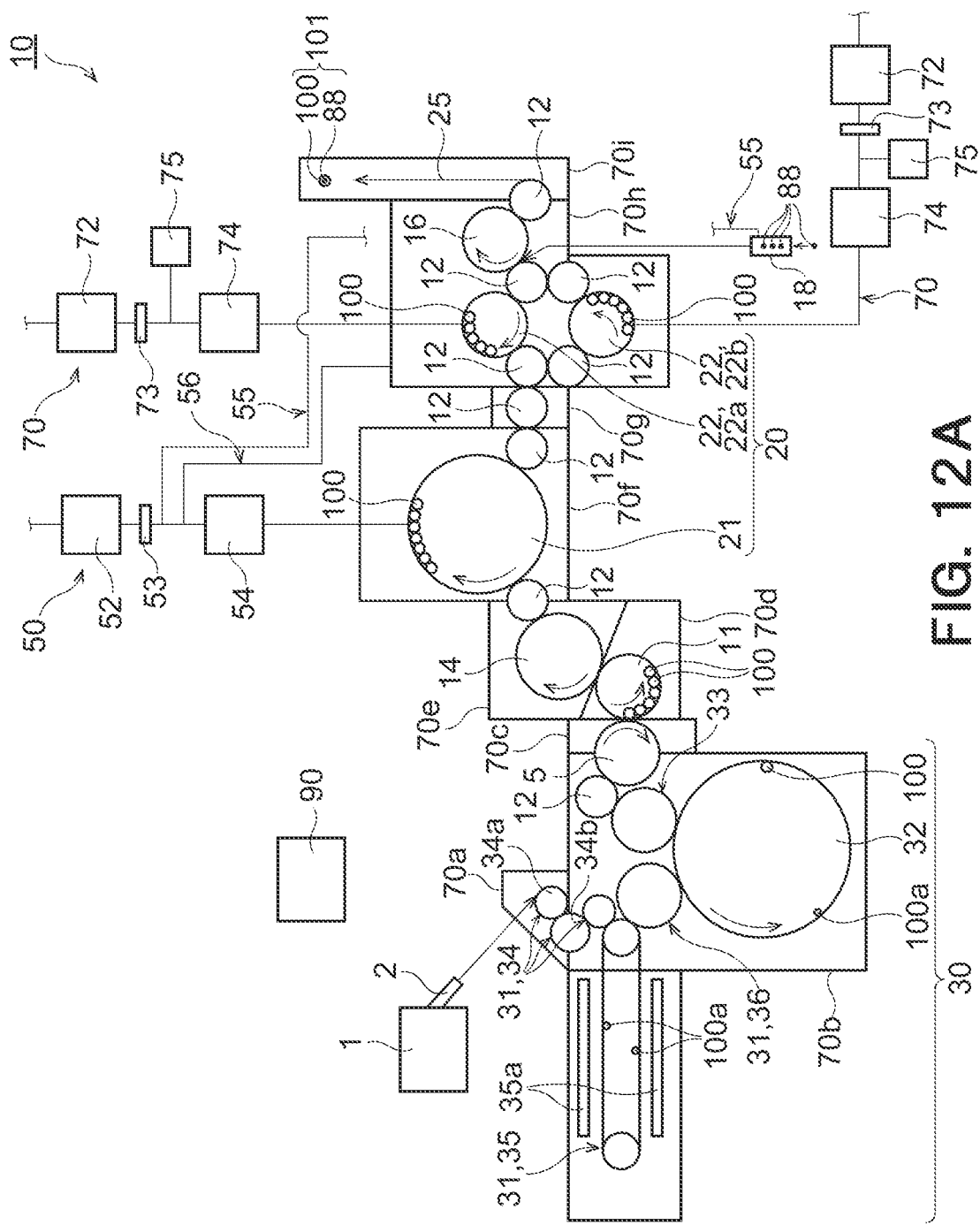
FIG. 12A schematically illustrates a plan view of a fourth modification to the content-filling system according to an embodiment.

In an example described according to the embodiment described above, the filling device 20 includes the water-filling device 21 that is connected to the water sterilization line 50 and the undiluted-solution-filling device 22 that is connected to the undiluted-solution sterilization line 70. In this case, the filling device 20 may include multiple undiluted-solution-filling devices 22. As illustrated in, for example, FIG. 12A, the content-filling system 10 may include multiple (for example, two) undiluted-solution sterilization lines 70. The filling device 20 may include the multiple (for example, two) undiluted-solution-filling devices 22 that are connected to the respective undiluted-solution sterilization lines 70.

In this case, the filling device 20 may include a first undiluted-solution-filling device 22a that fills a product undiluted solution that has no flavor and a second undiluted-solution-filling device 22b that fills a product undiluted solution that has flavor. In other words, one of the two undiluted-solution-filling devices 22 may be, for example, the filling device (the first undiluted-solution-filling device 22a) that fills the product undiluted solution that has no flavor such as a tea beverage. The other undiluted-solution-filling device 22 may be the filling device (the second undiluted-solution-filling device 22b) that fills the product undiluted solution that has flavor such as a fruit beverage, a milk beverage, or a sports drink. The second undiluted-solution-filling device 22b may be a filling device that fills a solid.

Since the filling device 20 thus includes the first undiluted-solution-filling device 22a and the second undiluted-solution-filling device 22b, the scent of the previous content can be inhibited from being transferred to the content when the content that has no flavor such as a tea beverage is filled in the bottles 100. In the case where one of the undiluted-solution-filling devices 22 is the filling device (the first undiluted-solution-filling device 22a) that fills the product undiluted solution that has no flavor, no flavor is transferred to, for example, a flow path for the product undiluted solution in the first undiluted-solution-filling device 22a. For example, no flavor is transferred to seal elements such as packings that are disposed, for example, at positions at which the pipes and the devices are connected. For this reason, when the kind of the content is changed, the regions to be cleaned (CIP) can be narrowed. This enables the time for cleaning to be decreased. For this reason, the amount of carbon dioxide that is discharged by the content-filling system 10 can be decreased.

Figure 12B:
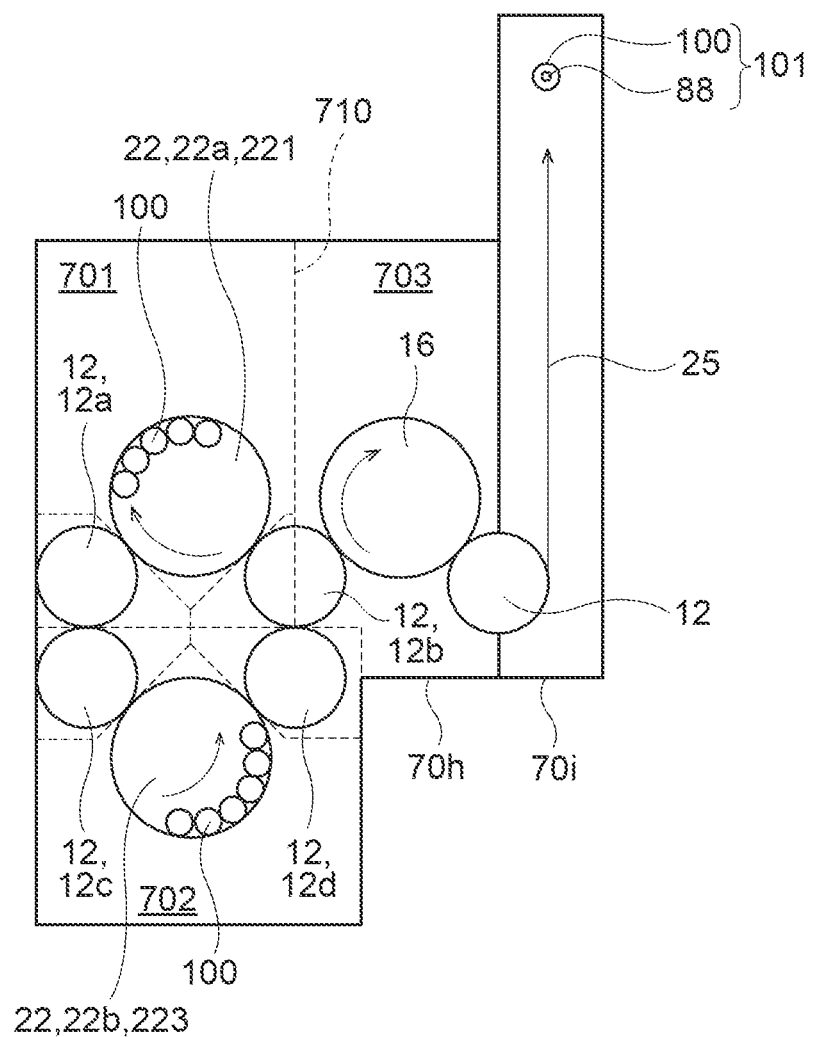
FIG. 12B schematically illustrates an enlarged plan view of a second sterile chamber and an exit chamber according to the fourth modification to the content-filling system according to an embodiment.

In an example illustrated, the first undiluted-solution-filling device 22a, the second undiluted-solution-filling device 22b, and the cap-mounting device 16 are contained in the second sterile chamber 70h. As illustrated in FIG. 12B, the second sterile chamber 70h contains a chamber wall 710. The chamber wall 710 separates a first space (a space) 701 in which the first undiluted-solution-filling device 22a is contained, a second space 702 in which the second undiluted-solution-filling device 22b is contained, and a third space 703 in which the cap-mounting device 16 is contained from each other. In other words, the first undiluted-solution-filling device 22a is contained in the first space 701 that is divided by the chamber wall 710. The second undiluted-solution-filling device 22b is contained in the second space 702 that is divided by the chamber wall 710. The cap-mounting device 16 is contained in the third space 703 that is divided by the chamber wall 710.

The chamber wall 710 has a function of preventing, for example, the sterilizing agent in the spaces from flowing into an unintentional space and stabilizing pressure in the spaces. The chamber wall 710 has gaps G1 to G6 (see FIG. 12C described later) through which the bottles 100 can pass. The gaps G1 to G6 have, for example, a size roughly equal to the size of the single bottle 100 at minimum such that the pressure in the spaces does not change. The chamber wall 710 may include shutters sh1 to sh6 (see FIG. 12C described later) that cover and uncover the gaps G1 to G6 described above. The shutters sh1 to sh6 may automatically open and close, for example, in response to a signal from the control unit 90.

Since the second sterile chamber 70h thus contains the chamber wall 710, the second space 702 can be cleaned (COP) and sterilized (SOP), and the second undiluted-solution-filling device 22b can be cleaned (CIP) and sterilized (SIP), for example, while the first undiluted-solution-filling device 22a operates. This enables the downtime to be greatly decreased and enables the productivity of the product bottles 101 to be improved. The shutter sh1 that is included in the chamber wall 710, for example, may be closed when the second undiluted-solution-filling device 22b is cleaned (CIP) and sterilized (SIP), for example, while the first undiluted-solution-filling device 22a operates. In this way, the sterilizing agent, for example, may be prevented from entering the space (a sterile space) in which the first undiluted-solution-filling device 22a is contained from the space (an unsterile space) in which the second undiluted-solution-filling device 22b is contained.

Among the conveyance wheels 12 that are contained in the second sterile chamber 70h, a first conveyance wheel (a first wheel) 12a that delivers the bottles 100 to the first undiluted-solution-filling device 22a and a second conveyance wheel 12b that receives the bottles 100 from the first undiluted-solution-filling device 22a are disposed outside the first space 701. Among the conveyance wheels 12 that are contained in the second sterile chamber 70h, a third conveyance wheel 12c that delivers the bottles 100 to the second undiluted-solution-filling device 22b and a fourth conveyance wheel 12d that receives the bottles 100 from the second undiluted-solution-filling device 22b are disposed outside the second space 702.

Figure 12C:
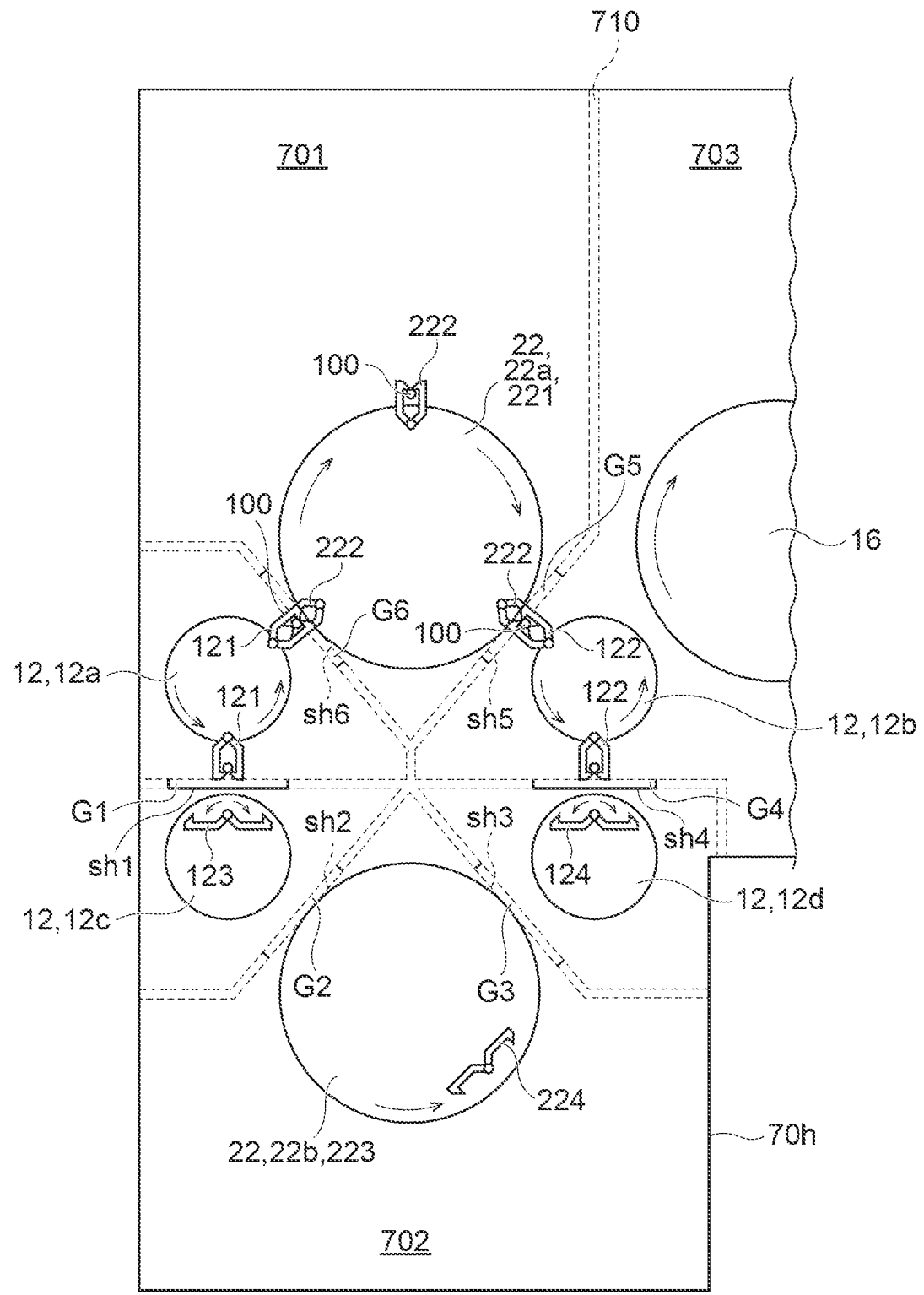
FIG. 12C schematically illustrates a plan view for illustrating a method of filling the content by using the fourth modification to the content-filling system according to an embodiment.

As illustrated in FIG. 12C, the first conveyance wheel 12a includes grippers (first grippers) 121 that convey the bottles 100. The grippers 121 are provided so as to be capable of opening and closing. Similarly, the second conveyance wheel 12b to the fourth conveyance wheel 12d include respective grippers 122, 123, and 124 that convey the bottles 100. The grippers 122, 123, and 124 are provided so as to be capable of opening and closing.

The first undiluted-solution-filling device 22a includes a wheel 221 (a second wheel). The wheel 221 (the second wheel) is disposed in the first space 701. The wheel 221 includes grippers (second grippers) 222 that convey the bottles 100. The grippers 222 are provided so as to be capable of opening and closing.

Similarly, the second undiluted-solution-filling device 22b includes a wheel 223. The wheel 223 is disposed in the second space 702. The wheel 223 includes a gripper 224 that conveys the bottles 100. The gripper 224 is provided so as to be capable of opening and closing.

The following description with reference to FIG. 12C contains the case where the second space 702 (and/or the second undiluted-solution-filling device 22b) is cleaned and sterilized while the first undiluted-solution-filling device 22a that is contained in the first space 701 operates. That is, the following description contains the case where the second space 702 and/or the second undiluted-solution-filling device 22b (also simply referred to below as the second space 702, for example,) is cleaned and sterilized while the first undiluted-solution-filling device 22a fills the product undiluted solution in the bottles 100.

After the second undiluted-solution-filling device 22b ends filling the product undiluted solution, the operation button of the control unit 90, for example, is first operated. In response to this, the gap G1 and G4, for example, among the gaps G1 to G6 of the chamber wall 710 are covered by the shutters sh1 and sh4.

Subsequently, the bottles 100 are conveyed from the first conveyance wheel 12a to the first undiluted-solution-filling device 22a. At this time, the gripper 123 of the third conveyance wheel 12c moves to an open position so as not to interfere with the grippers 121 of the first conveyance wheel 12a. According to the present embodiment, as for the gripper 123, a pair of pawls of the gripper 123 rotates 90 degrees from a close position to the open position in the horizontal direction. An angle at which each pawl rotates may be 60 degrees or more and 130 degrees or less.

At the open position, the gripper 123 does not interfere with the shutter sh1 that covers the gap G1. This enables the inside of the first space 701 to be kept sterile when the second space 702, for example, is cleaned and sterilized and enables the bottles 100 to be conveyed to the first undiluted-solution-filling device 22a.

In the case where the first undiluted-solution-filling device 22a fills the product undiluted solution in the bottles 100, the grippers (the second grippers) 222 of the wheel 221 of the first undiluted-solution-filling device 22a receive the bottles 100 from the grippers (the first grippers) 121 of the first conveyance wheel 12a. That is, the bottles 100 are delivered from the first conveyance wheel (the first wheel) 12a that is disposed outside the first space 701 to the wheel 221 (the second wheel) that is disposed in the first space 701.

Subsequently, at the first undiluted-solution-filling device 22a, the product undiluted solution is filled in the bottles 100. At this time, the product undiluted solution is filled in the bottles 100 that are conveyed by the grippers 222.

Subsequently, the bottles 100 in which the content is filled are conveyed to the cap-mounting device 16 by using the second conveyance wheel 12b. At this time, the gripper 124 of the fourth conveyance wheel 12d moves to an open position so as not to interfere with the grippers 122 of the second conveyance wheel 12b. According to the present embodiment, as for the gripper 124, a pair of pawls of the gripper 124 rotates 90 degrees from a close position to the open position in the horizontal direction. An angle at which each pawl rotates may be 60 degrees or more and 130 degrees or less.

At the open position, the gripper 124 does not interfere with the shutter sh4 that covers the gap G4. This enables the insides of the first space 701 and the third space 703 to be kept sterile when the second space 702, for example, is cleaned and sterilized and enables the bottles 100 to be conveyed to the cap-mounting device 16.

In this way, the product bottles 101 in which the product undiluted solution is filled by the first undiluted-solution-filling device 22a are obtained. Meanwhile, the second space 702, for example, is cleaned and sterilized.

When the second space 702 is thus cleaned while the first undiluted-solution-filling device 22a that is contained in the first space 701 operates, the pressure in the first space 701 is preferably 10 Pa or more and 40 Pa or less, the pressure in the second space 702 is preferably −10 Pa or more and 10 Pa or less, and the pressure in the third space 703 is preferably 5 Pa or more and 30 Pa or less. This can effectively inhibit air in the second space 702 and air in the third space 703 from entering the first space 701 and enables the state of the inside of the first space 701 that is sterile to be more successfully maintained.

The pressure in the second space 702 when the second space 702 is sterilized while the first undiluted-solution-filling device 22a that is contained in the first space 701 operates may be higher than the pressure in the second space 702 when the second space 702 is cleaned while the first undiluted-solution-filling device 22a that is contained in the first space 701 operates. When the second space 702 is sterilized, the pressure in the first space 701 is preferably 10 Pa or more and 40 Pa or less, the pressure in the second space 702 is preferably 0 Pa or more and 20 Pa or less, and the pressure in the third space 703 is preferably 5 Pa or more and 30 Pa or less. This can effectively inhibit the air in the second space 702 and the air in the third space 703 from entering the first space 701 and enables the state of the inside of the first space 701 that is sterile to be successfully maintained.

Figure 12D:
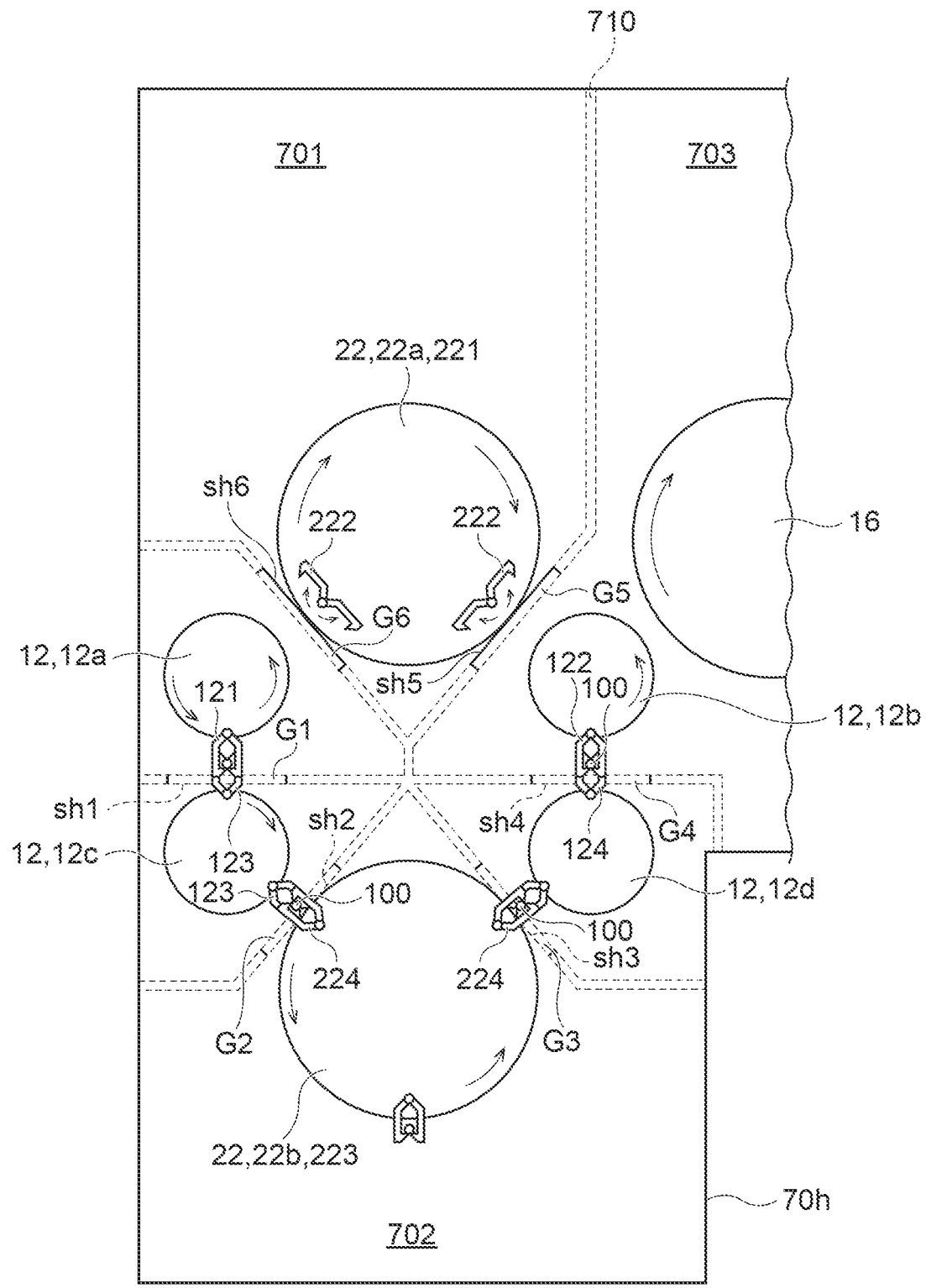
FIG. 12D schematically illustrates a plan view for illustrating the method of filling the content by using the fourth modification to the content-filling system according to an embodiment.

The following description contains the case where the first undiluted-solution-filling device 22a does not fill the product undiluted solution in the bottles 100. The description herein with reference to FIG. 12D contains the case where the first space 701 and/or the first undiluted-solution-filling device 22a (also simply referred to below as the first space 701, for example,) is cleaned and sterilized while the second undiluted-solution-filling device 22b that is contained in the second space 702 operates. That is, the description contains the case where the first space 701, for example, is cleaned and sterilized while the second undiluted-solution-filling device 22b fills the product undiluted solution in the bottles 100.

After the first undiluted-solution-filling device 22a ends filling the product undiluted solution, the operation button of the control unit 90, for example, is first operated. In response to this, the gaps G5 and G6, for example, among the gaps G1 to G6 of the chamber wall 710 are covered by the shutters sh5 and sh6.

Subsequently, the bottles 100 are conveyed from the first conveyance wheel 12a to the second undiluted-solution-filling device 22b. At this time, the grippers (the second grippers) 222 of the wheel 221 (the second wheel) of the first undiluted-solution-filling device 22a move to an open position so as not to interfere with the gripper (the first gripper) 121 of the first conveyance wheel 12a. According to the present embodiment, as for each gripper 222, a pair of pawls of the gripper 222 rotates 90 degrees from a close position to the open position in the horizontal direction. An angle at which each pawl rotates may be 60 degrees or more and 130 degrees or less.

At the open position, the grippers 222 do not interfere with the shutter sh6 that covers the gap G6. This enables the inside of the second space 702 to be kept sterile when the first space 701, for example, is cleaned and sterilized and enables the bottles 100 to be conveyed to the second undiluted-solution-filling device 22b.

In the case where the second undiluted-solution-filling device 22b fills the product undiluted solution in the bottles 100, the grippers 123 of the third conveyance wheel 12c receive the bottles 100 from the gripper 121 of the first conveyance wheel 12a.

In the case where the second undiluted-solution-filling device 22b fills the product undiluted solution in the bottles 100, the grippers 224 of the wheel 223 of the second undiluted-solution-filling device 22b receive the bottles 100 from the grippers 123 of the third conveyance wheel 12c. That is, the bottles 100 are delivered from the third conveyance wheel 12c that is disposed outside the second space 702 to the wheel 223 that is disposed in the second space 702.

Subsequently, at the second undiluted-solution-filling device 22b, the product undiluted solution is filled in the bottles 100. At this time, the product undiluted solution is filled in the bottles 100 that are conveyed by the grippers 224.

Subsequently, the fourth conveyance wheel 12d conveys the bottles 100 in which the content is filled to the second conveyance wheel 12b.

Subsequently, the second conveyance wheel 12b conveys the bottles 100 to the cap-mounting device 16. At this time, the grippers 222 of the wheel 221 of the first undiluted-solution-filling device 22a move to the open position so as not to interfere with the gripper 122 of the second conveyance wheel 12b. At the open position, the grippers 222 do not interfere with the shutter sh5 that covers the gap G5. This enables the state of the insides of the second space 702 and the third space 703 that are sterile to be maintained when the first space 701, for example, is cleaned and sterilized and enables the bottles 100 to be conveyed to the cap-mounting device 16.

In this way, the product bottles 101 in which the product undiluted solution is filled by the second undiluted-solution-filling device 22b are obtained. Meanwhile, the first space 701, for example, is cleaned and sterilized.

When the first space 701 is cleaned while the second undiluted-solution-filling device 22b that is contained in the second space 702 operates, the pressure in the first space 701 is preferably −10 Pa or more and 10 Pa or less, the pressure in the second space 702 is preferably 10 Pa or more and 40 Pa or less, and the pressure in the third space 703 is preferably 5 Pa or more and 30 Pa or less. This can effectively inhibit the air in the first space 701 and the air in the third space 703 from entering the second space 702 and enables the state of the inside of the second space 702 that is sterile to be more successfully maintained.

The pressure in the first space 701 when the first space 701 is sterilized while the second undiluted-solution-filling device 22b that is contained in the second space 702 operates may be higher than the pressure in the first space 701 when the first space 701 is cleaned while the second undiluted-solution-filling device 22b that is contained in the second space 702 operates. When the first space 701 is sterilized, the pressure in the first space 701 is preferably 0 Pa or more and 20 Pa or less, the pressure in the second space 702 is preferably 10 Pa or more and 40 Pa or less, and the pressure in the third space 703 is preferably 5 Pa or more and 30 Pa or less. This can effectively inhibit the air in the first space 701 and the air in the third space 703 from entering the second space 702 and enables the state of the inside of the second space 702 that is sterile to be successfully maintained.

The above description is summarized. The pressure in the spaces may be determined as illustrated in Table 3 and Table 4 below.

TABLE 3

| | During Operation of First Undiluted-solution-filling Device 22a | |
|---|---|---|
| | During Cleaning of Second Space 702 | During Sterilization of Second Space 702 |
| First Space 701 | 10 Pa or more and 40 Pa or less | 10 Pa or more and 40 Pa or less |
| Second Space 702 | −10 Pa or more and 10 Pa or less | 0 Pa or more and 20 Pa or less |
| Third Space 703 | 5Pa or more and 30 Pa or less | |

TABLE 4

| | During Operation of Second Undiluted-solution-filling Device 22b | |
|---|---|---|
| | During Cleaning of First Space 701 | During Sterilization of First Space 701 |
| First Space 701 | −10 Pa or more and 10 Pa or less | 0 Pa or more and 20 Pa or less |
| Second Space 702 | 10 Pa or more and 40 Pa or less | 10 Pa or more and 40 Pa or less |
| Third Space 703 | 5 Pa or more and 30 Pa or less | |

According to the present modification, the filling device 20 includes the multiple undiluted-solution-filling devices 22. This enables the second undiluted-solution-filling device 22b to be cleaned (CIP) and sterilized (SIP), for example, while the first undiluted-solution-filling device 22a operates. This enables the downtime to be greatly decreased and enables the productivity of the product bottles 101 to be improved.

According to the present modification, the content-filling system 10 includes the multiple undiluted-solution sterilization lines 70. The multiple undiluted-solution-filling devices 22 are connected to the respective undiluted-solution sterilization lines 70. This enables the kind of the product bottles 101 that are manufactured at the content-filling system 10 to be increased.

According to the present modification, the filling device 20 includes the first undiluted-solution-filling device 22a that fills the product undiluted solution that has no flavor and the second undiluted-solution-filling device 22b that fills the product undiluted solution that has flavor. This can inhibit the scent of the previous content from being transferred when the content that has no flavor is filled in the bottles 100. Since the first undiluted-solution-filling device 22a fills the product undiluted solution that has no flavor, no flavor is transferred to the flow path for the product undiluted solution in the first undiluted-solution-filling device 22a. For this reason, when the kind of the content is changed, the regions to be cleaned (CIP) can be narrowed. This enables the time for cleaning to be decreased. For this reason, the amount of carbon dioxide that is discharged by the content-filling system 10 can be decreased. At this time, since the first undiluted-solution-filling device 22a and the second undiluted-solution-filling device 22b are connected to the respective undiluted-solution sterilization lines 70, cleaning (so-called deodorization CIP) for removing flavor is not needed, for example, at the undiluted-solution sterilization line 70 to which the first undiluted-solution-filling device 22a is connected. The deodorization CIP needs time and energy more than normal CIP. For this reason, the downtime can be decreased, and the energy can be reduced in the case where the deodorization CIP is not performed, unlike the case where the deodorization CIP is performed.

According to the present modification, in the case where the first undiluted-solution-filling device 22a fills the product undiluted solution in the bottles 100, the grippers (the second grippers) 222 of the wheel 221 of the first undiluted-solution-filling device 22a receive the bottles 100 from the gripper (the first gripper) 121 of the first conveyance wheel 12a. In the case where the first undiluted-solution-filling device 22a does not fill the product undiluted solution in the bottles 100, the grippers (the second grippers) 222 of the wheel 221 (the second wheel) of the first undiluted-solution-filling device 22a move to the open position so as not to interfere with the gripper (the first gripper) 121 of the first conveyance wheel 12a. This enables the bottles 100 to be conveyed to the first undiluted-solution-filling device 22a when the second space 702, for example, is cleaned and sterilized.

According to the present modification, in the case where the first undiluted-solution-filling device 22a does not fill the product undiluted solution in the bottles 100, the gaps G5 and G6 are covered by the shutters sh5 and sh6. The grippers (the second grippers) 222 of the wheel 221 of the first undiluted-solution-filling device 22a move to the open position so as not to interfere with the shutters sh5 and sh6 that cover the gaps G5 and G6. This enables the bottles 100 to be conveyed to the first undiluted-solution-filling device 22a with the state of the insides of the second space 702 and the third space 703 that are sterile being maintained when the second space 702, for example, is cleaned and sterilized.

In an example described above, the pair of pawls of, for example, each gripper 222 rotates from the close position in the horizontal direction, and consequently, the gripper 222, for example, moves to the open position, but this is not a limitation. The gripper 222, for example, may move to the open position by using a freely determined structure. For example, the gripper 222, for example, may move to the open position such that the pair of pawls is folded upward or downward. The pair of pawls may be capable of expanding and contracting, and the gripper 222, for example, may be consequently capable of opening and closing.

(Fifth Modification)

Figure 13:
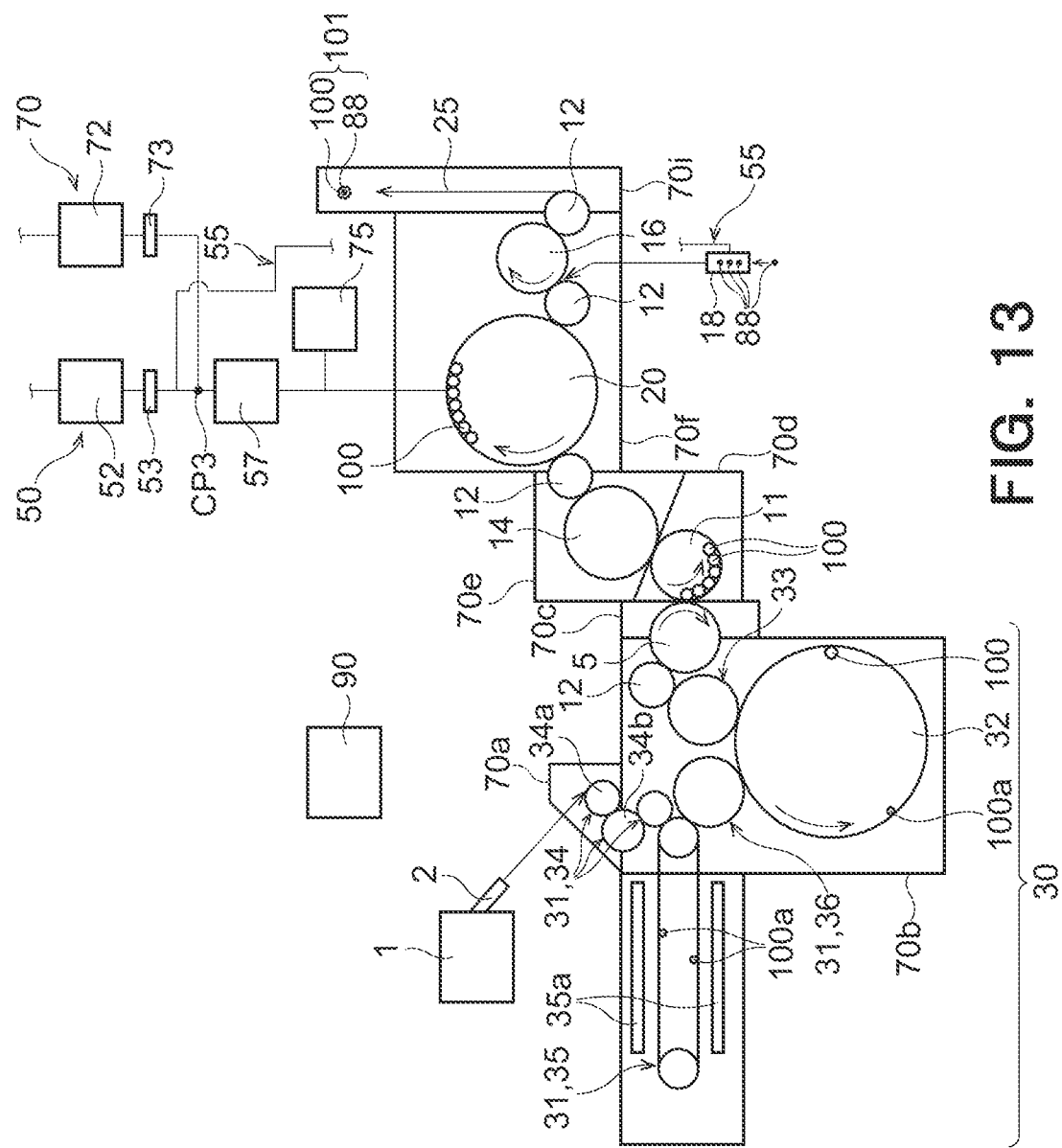
FIG. 13 schematically illustrates a plan view of a fifth modification to the content-filling system according to an embodiment.

In an example described according to the embodiment described above, the filling device 20 includes the water-filling device 21 that is connected to the water sterilization line 50 and the undiluted-solution-filling device 22 that is connected to the undiluted-solution sterilization line 70, but this is not a limitation. For example, as illustrated in FIG. 13, the content-filling system 10 may include the single filling device 20.

In this case, the content-filling system 10 may include the preform-sterilizing chamber 70a, the molding unit chamber 70b, the atmosphere shielding chamber 70c, the sterilizing-agent spray chamber 70d, the air-rinsing chamber 70e, the first sterile chamber 70f, and the exit chamber 70i. That is, the content-filling system 10 may not include the intermediate area chamber 70g and the second sterile chamber 70h. The first sterile chamber 70f may contain the filling device 20 and the cap-mounting device 16.

According to the present modification, a mixing tank 57 that mixes the water and the product undiluted solution may be interposed between the water sterilization line 50 and the filling device 20 and between the undiluted-solution sterilization line 70 and the filling device 20. This enables the content to be prepared in a manner in which the product undiluted solution is diluted with the water before being filled. In this case, the mixing tank 57 may be a so-called filling tank and may be installed above the filling device 20 in the vertical direction in order to improve the filling accuracy of the filling device 20. The mixing tank 57 may function as a so-called cushion tank that ensures the smooth flow of the content even in the case where the amount of the content that is used at a position downstream of the mixing tank 57 changes.

For the mixing tank 57, a concentration meter that measures the concentration of the prepared content may be installed. At least one or more tanks such as one or more filling tanks may be disposed downstream of the mixing tank 57 for which the concentration meter is installed in order to guarantee the concentration of the content that is prepared at the mixing tank 57. The volume of the mixing tank 57 may be 0.1 $m^3$ or more and 30 $m^3$ or less and may be, for example, 0.3 $m^3$. According to the present modification, the addition unit 75 described above may be coupled downstream of the mixing tank 57.

According to the present modification, in the case where the inside of the first sterile chamber 70f is cleaned (COP) and sterilized (SOP), a portion downstream of the connection point CP3 may be cleaned (CIP) and sterilized (SIP), for example, with a portion of the water sterilization line 50 upstream of the connection point CP3 at which the water sterilization line 50 and the undiluted-solution sterilization line 70 are connected to each other kept sterile. Similarly, in the case where the filling device 20 that is contained in the first sterile chamber 70f is cleaned (CIP) and sterilized (SIP), the portion downstream of the connection point CP3 may be cleaned (CIP) and sterilized (SIP), for example, with the portion upstream of the connection point CP3 kept sterile. Also in this case, the regions to be cleaned and sterilized can be narrowed. For this reason, the amount of the vapor that is used, for example, can be decreased. In addition, since the regions to be cleaned and sterilized can be narrowed, the time for cleaning and the time for sterilization can be decreased. For this reason, the amount of carbon dioxide that is discharged by the content-filling system 10 can be decreased.

Also according to the present modification, the amount of carbon dioxide that is discharged when the content is manufactured can be decreased, unlike the case where the product undiluted solution is diluted with sterile water that is manufactured by using a sterilizer that heats and sterilizes water.

For this reason, the amount of carbon dioxide that is discharged by the content-filling system 10 can be decreased.

Figure 14:
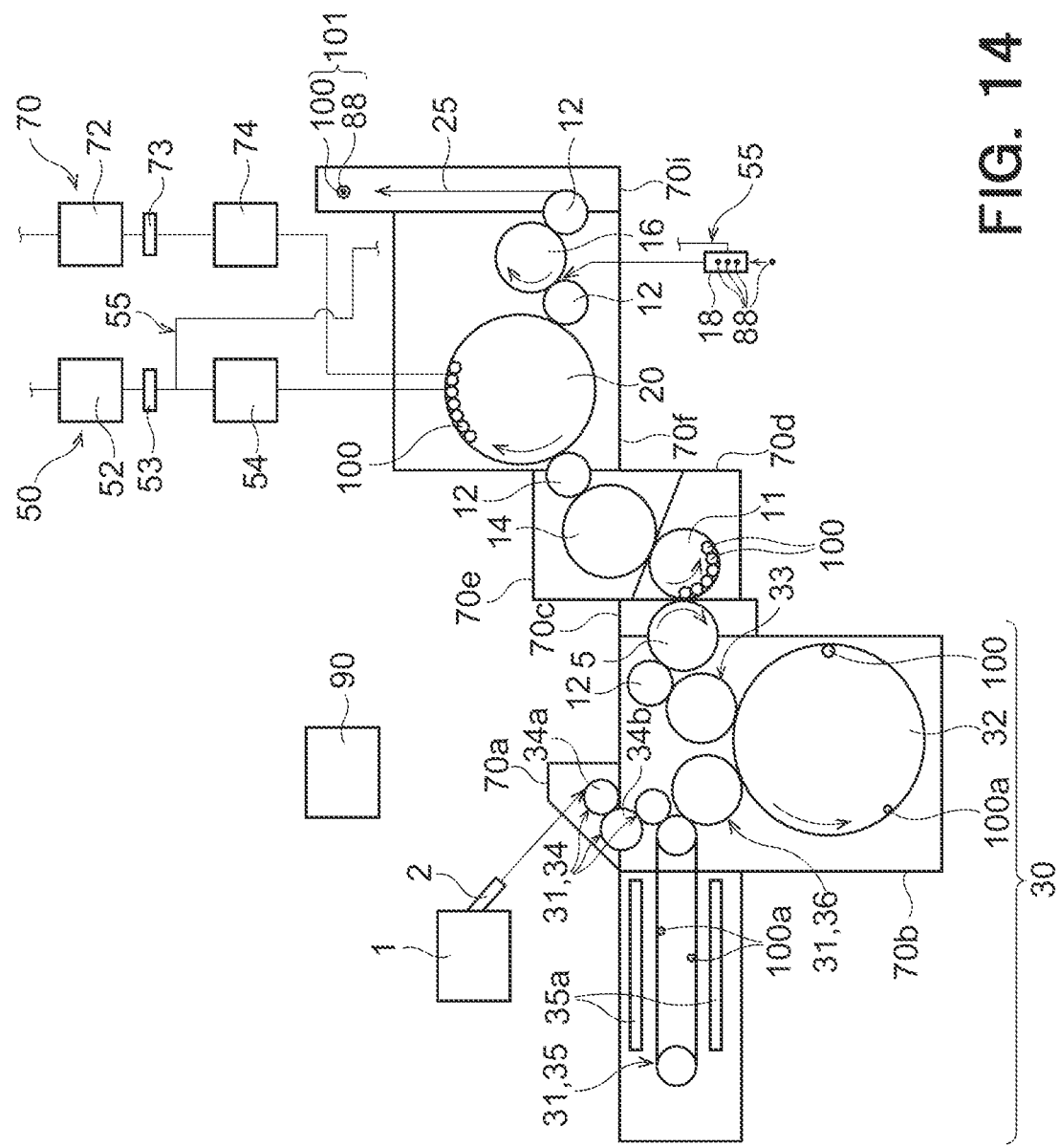
FIG. 14 schematically illustrates a plan view of another example of the fifth modification to the content-filling system according to an embodiment.

As illustrated in FIG. 14, the mixing tank 57 that mixes the water and the product undiluted solution may not be interposed between the water sterilization line 50 and the filling device 20 and between the undiluted-solution sterilization line 70 and the filling device 20. In this case, the filling device 20 may include multiple filling nozzles 20a (see FIG. 15) that fill the water and the product undiluted solution, and the water sterilization line 50 and the undiluted-solution sterilization line 70 may be connected to the filling nozzles 20a. The water and the product undiluted solution may be filled by using one of the filling nozzles 20a.

Figure 15:
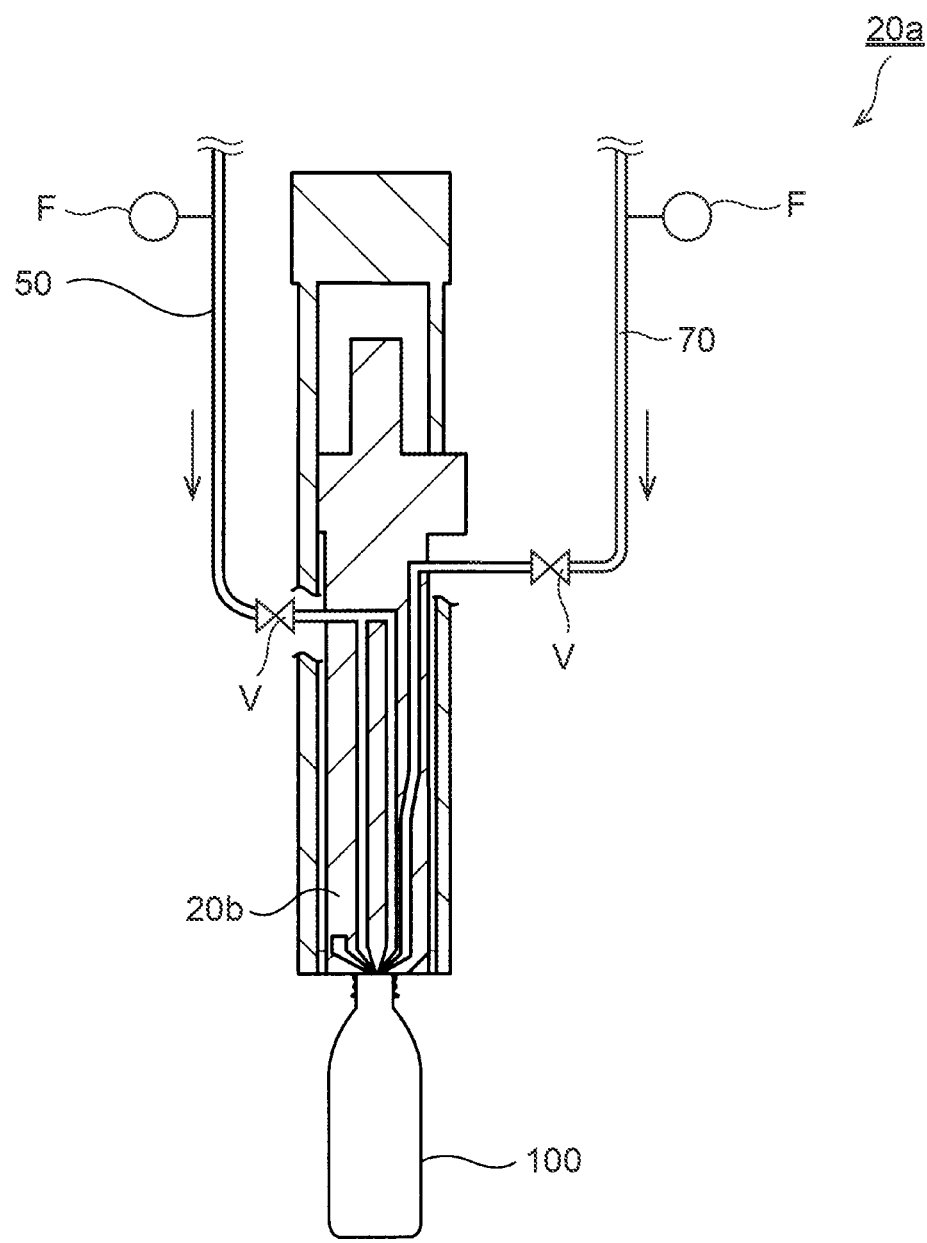
FIG. 15 schematically illustrates a sectional view of a filling nozzle of a filling device in another example of the fifth modification to the content-filling system according to an embodiment.

Specifically, as illustrated in FIG. 15, the filling nozzles 20a may include nozzle bodies 20b. The water sterilization line 50 and the undiluted-solution sterilization line 70 may be connected to the nozzle bodies 20b. The water sterilization line 50 and the undiluted-solution sterilization line 70 may include respective flow meters F that measure the flow rate of the water or the product undiluted solution and respective valves V. A load cell may detect the actual weight of the water or the product undiluted solution that is filled, and the amount of the water or the product undiluted solution that is filled may be consequently measured. In this case, the order in which the water and the product undiluted solution are filled in the bottles 100 may be appropriately changed, for example, in consideration for bubbles in the bottles 100 or ease of mixing the water and the product undiluted solution. For example, the product undiluted solution may be filled after the water is filled, or the water may be filled after the product undiluted solution is filled. In the case where the water is filled after the product undiluted solution is filled, a risk of causing a stain due to the content to adhere to an end of each filling nozzle 20a can be reduced. The product undiluted solution may be filled after the water is filled, and subsequently, the water may be further filled. The water and the product undiluted solution may be simultaneously filled.

In an example illustrated in FIG. 14, in the case where the inside of the first sterile chamber 70f is cleaned (COP) and sterilized (SOP), a portion downstream of the third water tank 54 may be cleaned (CIP) and sterilized (SIP), for example, with a portion of the water sterilization line 50 up to the third water tank 54 kept sterile. Similarly, in the case where the filling device 20 that is contained in the first sterile chamber 70f is cleaned (CIP) and sterilized (SIP), the portion downstream of the third water tank 54 may be cleaned (CIP) and sterilized (SIP), for example, with the portion of the water sterilization line 50 up to the third water tank 54 kept sterile. Also in this case, the regions to be cleaned and sterilized can be narrowed. For this reason, the amount of the vapor that is used, for example, can be decreased. In addition, since the regions to be cleaned and sterilized can be narrowed, the time for cleaning and the time for sterilization can be decreased. For this reason, the amount of carbon dioxide that is discharged by the content-filling system 10 can be decreased.

Also according to the present modification, the amount of carbon dioxide that is discharged when the content is manufactured can be decreased, unlike the case where the product undiluted solution is diluted with sterile water that is manufactured by using a sterilizer that heats and sterilizes water. For this reason, the amount of carbon dioxide that is discharged by the content-filling system 10 can be decreased.

(Sixth Modification)

Figure 16A:
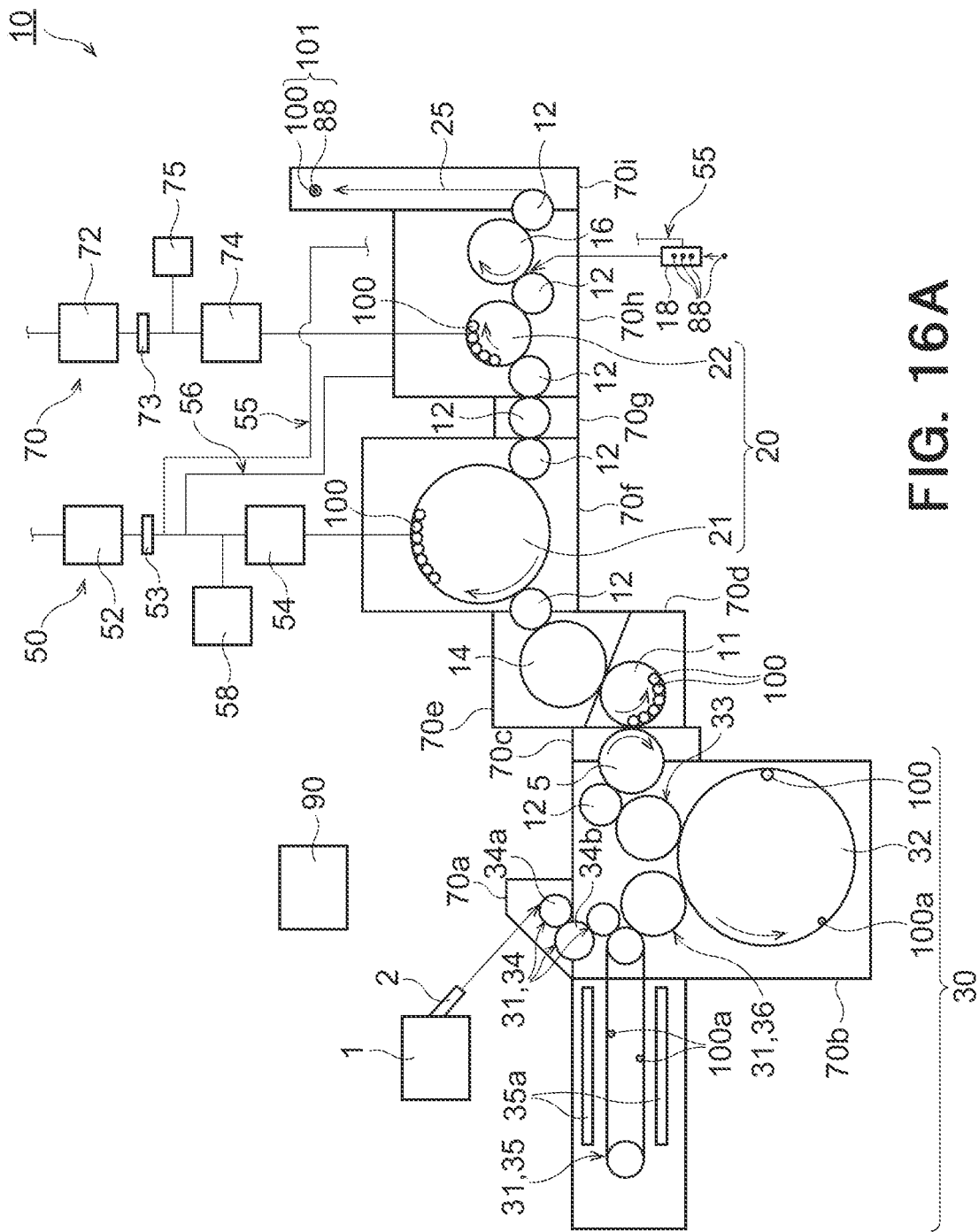
FIG. 16A schematically illustrates a plan view of a sixth modification to the content-filling system according to an embodiment.

In an example described according to the embodiment described above, the third water tank 54 is disposed downstream of the second water tank 52. In this case, as illustrated in FIG. 16A, a carbonic-acid-adding device 58 that adds carbonic acid into the water may be coupled upstream of the third water tank 54.

Figure 16B:
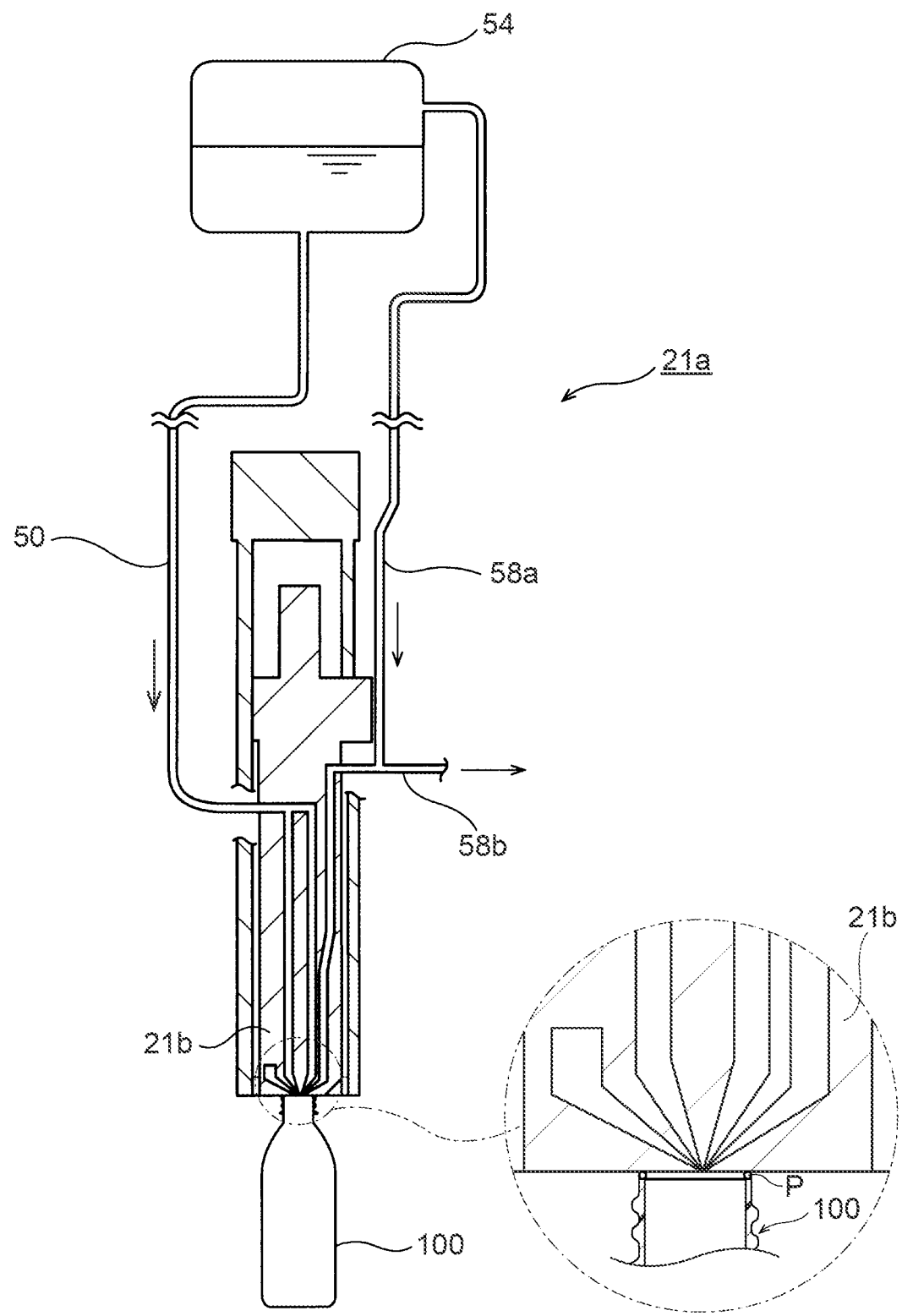
FIG. 16B schematically illustrates a sectional view of a water-filling nozzle of a water-filling device according to the sixth modification to the content-filling system according to an embodiment.

The water-filling device 21 includes multiple water-filling nozzles 21a (see FIG. 16B) that fill the water. According to the present modification, the water-filling nozzles 21a of the water-filling device 21 fill carbonated water. As illustrated in FIG. 16B, the water sterilization line 50 and a counter gas line 58a are connected to the water-filling nozzles 21a. Specifically, the water-filling nozzles 21a include nozzle bodies 21b. The water sterilization line 50 and the counter gas line 58a are connected to the nozzle bodies 21b. Of these, as for the water sterilization line 50, an end thereof is connected to the third water tank 54 in which sterile carbonated water is filled, and the other end is in communication with the insides of the bottles 100. The sterile carbonated water that is supplied from the third water tank 54 passes through the water sterilization line 50 and is injected into the bottles 100.

The counter gas line 58a supplies sterile carbon dioxide that is filled in the third water tank 54 toward the water-filling nozzles 21a. An end of the counter gas line 58a is connected to the third water tank 54, and the other end is in communication with the insides of the bottles 100. Gas for counter pressure composed of the sterile carbon dioxide that is supplied from the third water tank 54 passes through the counter gas line 58a and is filled in the bottles 100.

Snifting lines 58b for discharging the gas in the bottles 100 are connected to the respective water-filling nozzles 21a. Ends of the snifting lines 58b are connected to the counter gas line 58a. The gas in the bottles 100 is discharged from the other ends of the snifting lines 58b into the first sterile chamber 70f via the snifting lines 58b.

Packings P (seal members) that inhibit the gas in the bottles 100 from leaking by coming into close contact with the bottles 100 are disposed at ends of the respective water-filling nozzles 21a. When a carbonated beverage is filled in the bottles 100, the water-filling device 21 fills the carbonated beverage in the bottles 100 with the packings P being in close contact with the mouths of the bottles 100 (close contact filling). The sterile carbon dioxide for counter pressure can be inhibited from leaking from the bottles 100. For this reason, the internal pressure of the bottles 100 can be increased to pressure higher than atmospheric pressure such that the internal pressure of the bottles 100 is equal to the internal pressure of the third water tank 54. The water sterilization line 50, for example, may include, for example, a flow meter that measures the flow rate of, for example, the water and a valve although this is not illustrated.

According to the present modification, the carbonic-acid-adding device 58 that adds carbonic acid into the water is coupled upstream of the third water tank 54. This enables the carbonated beverage to be filled in the bottles 100 at the content-filling system 10. The carbonic-acid-adding device 58 is thus coupled with the water sterilization line 50, and the flavor of the previous content can be inhibited from being transferred to the carbonated water in the case where the carbonated water is filled as the content. Only in the case where the carbonated beverage is filled in the bottles 100, the water from the second water tank 52 may be supplied to the carbonic-acid-adding device 58 and cooled, carbon dioxide may be added by a sterile carbonator in a sterile manner, and the water containing carbonic acid may be supplied to the third water tank 54. In the case where the carbonated water is manufactured as the content, the undiluted-solution-filling device 22 may be used or may not be used.

Also in the case where the water-filling device 21 includes the water-filling nozzles 21*a* that can fill the carbonated water, the water-filling device 21 may fill the water that contains no carbon dioxide. In this case, at the content-filling system 10, mineral water may be manufactured by using only the water-filling device 21. Also in this case, the water-filling device 21 may fill the water with the packings P being in close contact with the mouths of the bottles 100. This can inhibit the water from spilling from the bottles 100 as much as possible. In this case, the water-filling device 21 may compress and fill the water. This enables the water to be filled in a short time. In the case where the bottles 100 have low pressure resistance, the water-filling device 21 preferably compresses and fills the water with the gas in the bottles 100 being to be discharged via the snifting lines 58*b*. For example, the water-filling device 21 preferably compresses and fills the water with the snifting lines 58*b* opened after the packings P are brought into close contact with the mouths of the bottles 100. This can inhibit the bottles 100 from deforming and/or breaking due to pressure even in the case where the water is compressed and filled. For this reason, the water can be filled in a short time, and the bottles 100 can be inhibited from deforming and/or breaking.

In the case where the undiluted-solution-filling device 22 is used together with the water-filling device 21, the level of the liquid surface of the water that is filled by the water-filling device 21 is lower than that in the case where only the water-filling device 21 is used. Accordingly, there is a low risk of causing the filled water to spill. For this reason, the filling rate at which the water is filled may be 100 mL/sec or more and is preferably 200 ml/sec or more. This enables the number of the water-filling nozzles 21*a* to be further decreased. In this case, the water can be filled in the bottles 100 with the internal pressure of the third water tank 54 being higher than the internal pressure of the third undiluted-solution tank 74. During the close contact filling, the internal pressure of the third undiluted-solution tank 74 may be 0.02 MPa or more and 0.1 MPa or less, and the internal pressure of the third water tank 54 may be 0.03 MPa or more and 0.9 MPa or less.

The water-filling device 21 may fill the water in the bottles 100 in a state in which the packings P are not in close contact with the mouths of the bottles 100 and gaps are formed between the water-filling nozzles 21*a* (the packings P) and the bottles 100 (over mouth filling). Also in this case, the water can be filled in the bottles 100 with the internal pressure of the third water tank 54 being higher than the internal pressure of the third undiluted-solution tank 74. Specifically, during the over mouth filling, the internal pressure of the third undiluted-solution tank 74 may be 0.02 MPa or more and 0.1 MPa or less, and the internal pressure of the third water tank 54 may be 0.03 MPa or more and 0.07 MPa or less.

Figure 16C:
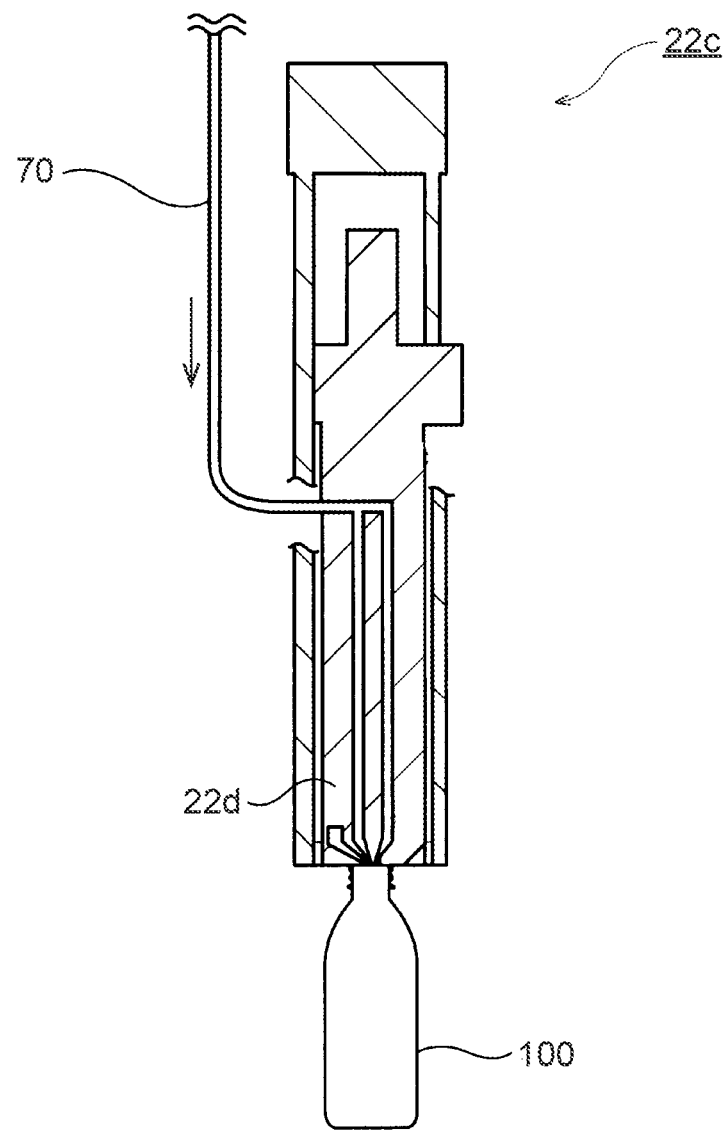
FIG. 16C schematically illustrates a sectional view of an undiluted-solution-filling nozzle of an undiluted-solution-filling device according to the sixth modification to the content-filling system according to an embodiment.

In the case where the undiluted-solution-filling device 22 is used together with the water-filling device 21, the water-filling device 21 may fill the water in the bottles 100 that are empty as described above. In this case, bubbles in the bottles 100 can be reduced, and accordingly, there is a low risk of causing a part of a filled liquid to splash toward a location outside the mouths of the bottles 100. The undiluted-solution-filling device 22 includes multiple undiluted-solution-filling nozzles 22*c* (see FIG. 16C) that fill the product undiluted solution. As illustrated in FIG. 16C, the undiluted-solution sterilization line 70 is connected to the undiluted-solution-filling nozzles 22*c*. Specifically, the undiluted-solution-filling nozzles 22*c* include nozzle bodies 22*d*. The undiluted-solution sterilization line 70 is connected to the nozzle bodies 22*d*. The undiluted-solution sterilization line 70 may include, for example, a flow meter that measures the flow rate of the product undiluted solution and a valve although this is not illustrated.

In the case where the water-filling device 21 fills the water in the bottles 100 that are empty as described above, bubbles in the bottles 100 can be reduced, and accordingly, there is a low risk of causing a part of the filled liquid to splash toward a location outside the mouths of the bottles 100. For this reason, the diameters of the water-filling nozzles 21*a* of the water-filling device 21 may be larger than the diameters of the undiluted-solution-filling nozzles 22*c* of the undiluted-solution-filling device 22. This enables the time for filling the water to be decreased. For example, the diameters of the water-filling nozzles 21*a* of the water-filling device 21 may be 1.2 times the diameters of the undiluted-solution-filling nozzles 22*c* of the undiluted-solution-filling device 22 or more and 1.5 times the diameters of the undiluted-solution-filling nozzles 22*c* of the undiluted-solution-filling device 22 or less. When the diameters of the water-filling nozzles 21*a* are equal to or more than 1.2 times the diameters of the undiluted-solution-filling nozzles 22*c*, the time for filling the water can be further decreased. When the diameters of the water-filling nozzles 21*a* are equal to or less than 1.5 times the diameters of the undiluted-solution-filling nozzles 22*c*, the risk of causing a part of the filled liquid to splash toward a location outside the mouths of the bottles 100 can be further reduced. The method of filling (the close contact filling or the over mouth filling), filling pressure, and/or the diameters of the water-filling nozzles 21*a*, for example, may be appropriately changed in order to decrease the number of the water-filling nozzles 21*a* of the water-filling device 21 and to enable the water-filling device 21 to be compact.

(Seventh Modification)

Figure 17:
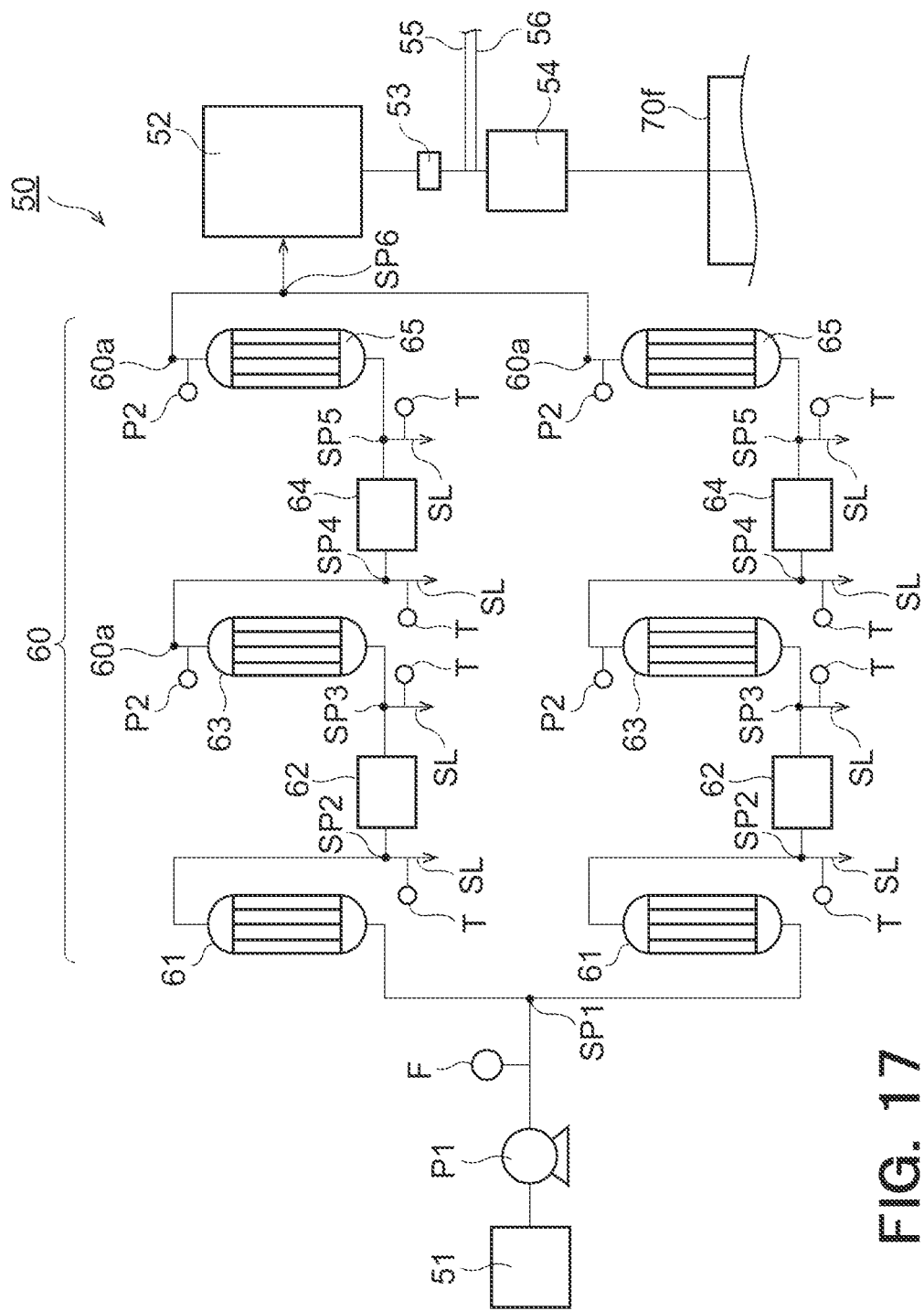
FIG. 17 schematically illustrates a water sterilization line according to a seventh modification to the content-filling system according to an embodiment.

In an example described according to the embodiment described above, the water sterilization line 50 includes the first water tank 51, the water sterilizer 60, and the second water tank 52. In this case, as illustrated in FIG. 17, the water sterilization line 50 may include multiple (for example, two) water sterilizers 60. This enables the water to be sterilized by using the other water sterilizer 60 in the case where one of the water sterilizers 60 is cleaned (CIP) or sterilized (SIP). For this reason, the product bottles 101 can be continuously manufactured. For example, in the case where while one of the water sterilizers 60 is cleaned (CIP) or sterilized (SIP), the inside of the second sterile chamber 70*h*, for example, is cleaned by using the other water sterilizer 60, the water that is supplied to, for example, the second sterile chamber 70*h* can be inhibited from lacking. For example, in the case where while the first sterile filter 63 of one of the water sterilizers 60, for example, is sterilized (SIP) or the integrity test is conducted, and the inside of the second sterile chamber 70*h*, for example, is cleaned by using the other water sterilizer 60, the water that is supplied to, for example, the second sterile chamber 70*h* can be inhibited from lacking.

(Eighth Modification)

In an example described according to the embodiment described above, the water sterilizer 60 includes the foreign-material removal filter 61, the first sterilizer 62, the first sterile filter 63, the second sterilizer 64, and the second sterile filter 65, but this is not a limitation. For example, in the case where the hygiene of the pure water that is manufactured by the pure-water-manufacturing device 50*a* is high, and no mold is detected in the first water tank 51, the water sterilizer 60 may not include the foreign-material removal filter 61. In the case where the number of the microbes in the first water tank 51 is large, the water sterilizer 60 may further include a third sterilizer (not illustrated) that is disposed upstream of the foreign-material removal filter 61. In this case, the structure of the third sterilizer may be substantially the same as that of the first sterilizer 62 illustrated in FIG. 3 to FIG. 6B. That is, the third sterilizer may sterilize the water by using ultraviolet rays.

(Ninth Modification)

Figure 18:
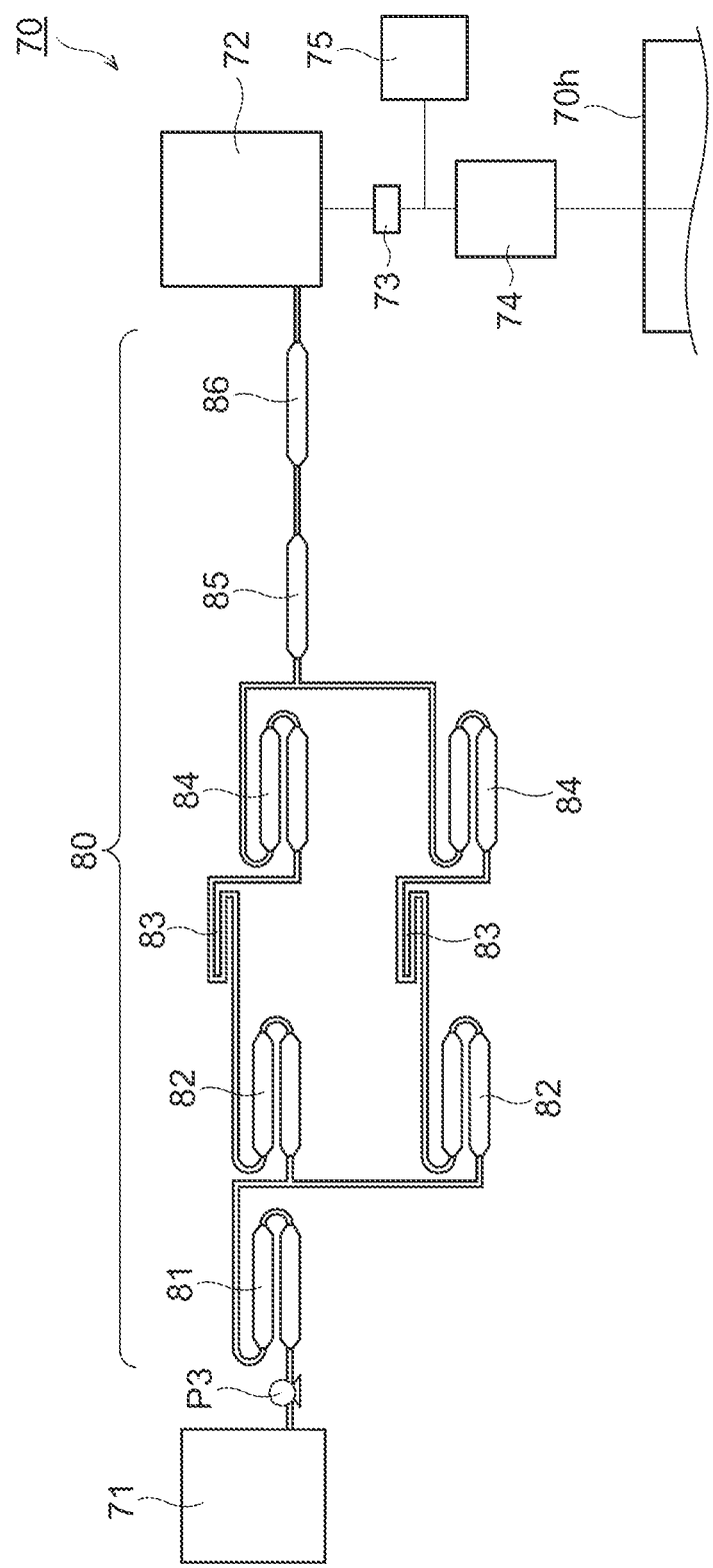
FIG. 18 schematically illustrates an undiluted-solution sterilization line according to a ninth modification to the content-filling system according to an embodiment.

In an example described according to the embodiment described above, the UHT 80 includes the first heating portion 81, the second heating portion 82, the holding tube 83, the first cooling portion 84, the second cooling portion 85, and the third cooling portion 86. In this case, as illustrated in FIG. 18, the UHT 80 may include multiple (for example, two) second heating portions 82, multiple (for example, two) holding tubes 83, and multiple (for example, two) first cooling portions 84. This enables the product undiluted solution to be sterilized by using, for example, the other holding tube 83 even in the case where a charred substance, for example, adheres to, for example, one of the second heating portions 82, one of the holding tubes 83 or one of the first cooling portions 84. That is, in the case where one of the holding tubes 83, for example, is cleaned (CIP), sterilized (SIP), or cleaned and sterilized (CSIP), the product undiluted solution can be sterilized by using, for example, the other holding tube 83. For this reason, the product bottles 101 can be continuously manufactured.

(Tenth Modification)

In an example described according to the embodiment described above, the product-undiluted-solution sterilizer 80 is the UHT, but this is not a limitation. For example, the product-undiluted-solution sterilizer 80 may be an ohmic (joule) heating sterilizer that directly conducts electricity though the product undiluted solution for self-heat generation. The product-undiluted-solution sterilizer 80 may sterilize the product undiluted solution by using a microwave (at 915 MHz or 2450 MHZ). In this case, the microwave may be radiated from a location outside a pipe through which the product undiluted solution or the solid passes. This enables the temperature of the product undiluted solution or the solid to be increased and enables the product undiluted solution or the solid to be sterilized. Also in these cases, the amount of carbon dioxide that is discharged by the content-filling system 10 can be decreased.

(Eleventh Modification)

In an example described according to the embodiment described above, the filling device 20 (the water-filling device 21 and the undiluted-solution-filling device 22) is a so-called rotary filler, but this is not a limitation. For example, the filling device 20 may be a so-called linear sterile filling device that fills, for example, the water in a container (such as a cup or a paper container) that is conveyed by, for example, a conveyor. In this case, for example, the sterile water may be first filled, and the product undiluted solution may be subsequently filled. An undiluted-solution-filling device 22 that fills a product undiluted solution or a solid that has flavor may be disposed downstream of the undiluted-solution-filling device 22 that fills the product undiluted solution. The order in which the sterile water and the product undiluted solution are filled is not limited thereto. For example, the product undiluted solution may be first filled, and the sterile water may be subsequently filled. The sterile water and the product undiluted solution may be filled by using one of the filling nozzles 20*a* as described with reference to FIG. 15.

(Twelfth Modification)

In the case described according to the embodiment described above, sterilizing devices for hydrogen peroxide sterilization are used as the sterilizing device for the preforms and the sterilizing device for the containers, but this is not a limitation. For example, a sterilizing device for hydrogen peroxide sterilization may be the sterilizing device for the preforms or the sterilizing device for the containers. The sterilizing device for the preforms and the sterilizing device for the containers may use a peracetic acid sterilization method in which the inner and outer surfaces of the bottles are sterilized by using a peracetic acid solution (or gas, mist, or a mixture thereof), and subsequently, the inner and outer surfaces are rinsed in a sterile manner. The sterilizing device for preforms and the sterilizing device for the containers may use, for example, peracetic acid, acetic acid, peroxynitric acid, nitric acid, sodium hypochlorite, chlorine, or caustic soda alone as the sterilizing agent other than hydrogen peroxide and ethanol or may use a combination of two or more of these as the sterilizing agent. A sterilizing device may be used not only to sterilize the bottles but also to sterilize a cup, a pouch, a paper container or a composite thereof. The sterilizing device for the preforms may sterilize the preforms by chemical spraying, or chemical rinsing, or by using vapor, sterile water, sterile air, electron beams, X-rays, or ultraviolet rays. Similarly, the sterilizing device for the containers may sterilize the containers by chemical spraying, or chemical rinsing, or by using vapor, sterile water, sterile air, electron beams, X-rays, or ultraviolet rays.

(Thirteenth Modification)

In the case described according to the embodiment described above, the content-filling system 10 includes the bottle-molding unit 30, but this is not a limitation. For example, the content-filling system may sequentially receive the bottles 100 that are molded and that are empty from the outside, for example, through air transportation and may convey the bottles 100 that are received toward the sterilizing device 11. Also in this case, the effects described above can be exerted.

(Fourteenth Modification)

In the case described by way of example according to the embodiment described above, the content-filling system 10 fills the content in the bottles 100, but this is not a limitation. The content-filling system 10 according to the present embodiment can be used for a filling system that fills a so-called chilled beverage such as a milk beverage in a container such as a cup. Also in this case, the amount of carbon dioxide that is discharged when the content is manufactured can be decreased, unlike the case where the product undiluted solution is diluted with sterile water that is manufactured by using a sterilizer that heats and sterilizes water. For this reason, the amount of carbon dioxide that is discharged by the content-filling system 10 can be decreased. In the case where the content is, for example, a milk beverage, the number of the microbes in the product undiluted solution can increase. Even in the case where the number of the microbes in the product undiluted solution thus increases, the product undiluted solution is heated and sterilized. For this reason, even when the content is, for example, a milk beverage, the sterile properties of the content can be sufficiently ensured. At the content-filling system 10 according to the present embodiment, a freely selected liquid to be sterilized (such as seasoning, an alcohol beverage, or a milk beverage) may be filled in a container.

(Modifications to Method of Sterilizing Content-Filling System)

Modifications to the method of sterilizing the content-filling system will now be described.

(First Modification)

Figure 19:
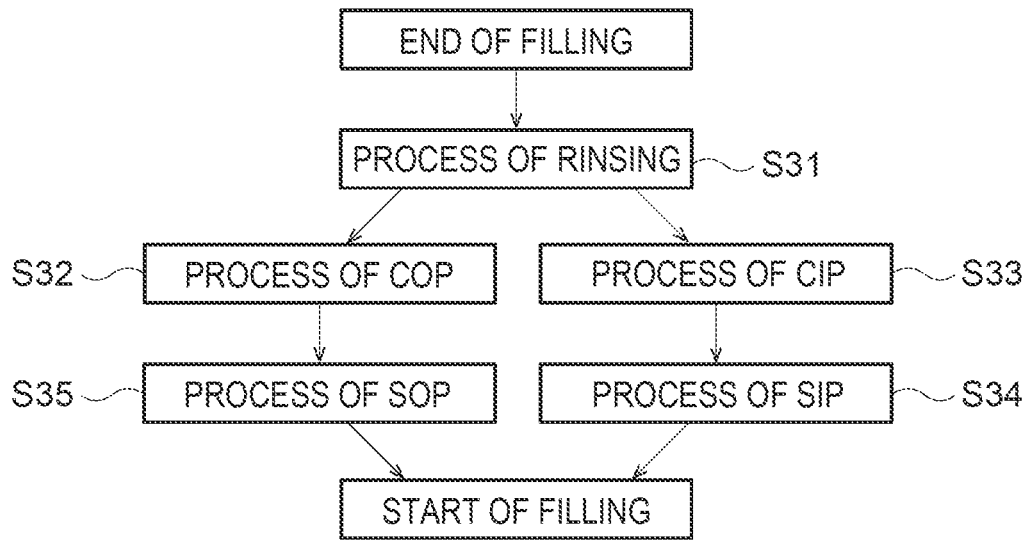
FIG. 19 is a flowchart illustrating a first modification to the method of sterilizing the content-filling system according to an embodiment.

In an example described according to the embodiment described above, the method of sterilizing the chambers includes the process of COP (the symbol S12 in FIG. 9), the process of CIP (the symbol S13 in FIG. 9), the process of SIP (the symbol S14 in FIG. 9), and the process of SOP (the symbol S15 in FIG. 9) that are sequentially performed, but this is not a limitation. As for the method of sterilizing the chambers, as illustrated in, for example, FIG. 19, the process of COP (a symbol S32 in FIG. 19) and the process of CIP (a symbol S33 in FIG. 19) may be simultaneously performed after the process of rinsing (a symbol S31 in FIG. 19). The process of SIP (a symbol S34 in FIG. 19) and the process of SOP (a symbol S35 in FIG. 19) may be simultaneously performed after the process of COP and the process of CIP. This enables the downtime to be greatly decreased and enables the productivity of the product bottles 101 to be improved.

Figure 20:
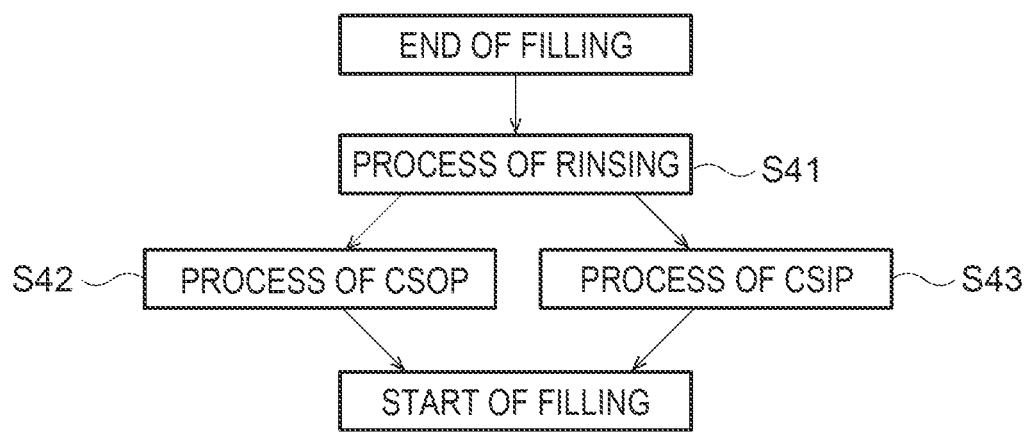
FIG. 20 is a flowchart illustrating another example of the first modification to the method of sterilizing the content-filling system according to an embodiment.

As for the method of sterilizing the chambers, as illustrated in FIG. 20, a process of CSOP (a symbol S42 in FIG. 20) in which the process of COP and the process of SOP are simultaneously performed, and a process of CSIP (a symbol S43 in FIG. 20) in which the process of CIP and the process of SIP are simultaneously performed may be simultaneously performed after the process of rinsing (a symbol S41 in FIG. 20). In this case, for example, during the process of CSOP, detergent having a temperature of 70° C. or more is preferably sprayed to the inside of the intermediate area chamber 70g and the inside of the second sterile chamber 70h at least for one minute or more, preferably five minutes or more. Consequently, the inner wall surface of, for example, the intermediate area chamber 70g and the surface of the equipment of, for example, the filling device 20 are purified and sterilized. For example, during the process of CSIP, a flow path for the product undiluted solution in the undiluted-solution-filling device 22 is rinsed by using sterile water, and the detergent having a temperature of 70° C. or more is supplied to a circulation path (not illustrated) including the flow path. The detergent is preferably circulated through the circulation path at least for five minutes or more, preferably 10 minutes or more. Consequently, the flow path for the product undiluted solution in the undiluted-solution-filling device 22 is sterilized. Also in this case, the downtime can be greatly decreased and the productivity of the product bottles 101 can be improved.

Also according to the present modification, the number of times the inside of the first sterile chamber 70f is cleaned and sterilized can be decreased, and as for the content-filling system 10, the regions to be cleaned and sterilized can be narrowed. In addition, the number of times the filling device 20 that is contained in the first sterile chamber 70f is cleaned and sterilized can be decreased, and as for the content-filling system 10, the regions to be cleaned and sterilized can be narrowed. For this reason, the amount of the vapor that is used, for example, can be decreased. Since the regions to be cleaned and sterilized can be narrowed, the time for cleaning and the time for sterilization can be decreased. For this reason, the amount of carbon dioxide that is discharged by the content-filling system 10 can be decreased.

In the case where the process of CSIP in which the process of CIP and the process of SIP are simultaneously performed is performed, it is necessary to rinse the used detergent with the inside of the undiluted-solution-filling device 22, for example, kept sterile after the process of CSIP. At this time, the use of the water that is sterilized by the water sterilization line 50 for rinsing enables the amount of carbon dioxide that is discharged by the content-filling system 10 to be decreased. The water that is sterilized by the water sterilization line 50 can be stored in the second water tank 52, and accordingly, the detergent can be rinsed right after the process of CSIP. For this reason, the downtime can be decreased. A flow path from the second water tank 52 to a sterile area at which the process of CSIP and the process of CSOP are performed is preferably cleaned (CIP) and sterilized (SIP) before the detergent is rinsed after the process of CSIP. In this case, the detergent or a sterilizing agent may be supplied to the second bypass line 56, for example, from the connection point CP1 (see, for example, FIG. 1 and FIG. 2A) at which the second bypass line 56 is connected to the water sterilization line 50, or the flow path described above may be sterilized by using, for example, vapor or hot water.

(Second Modification)

In an example described according to the embodiment described above, the first sterilizer 62, for example, is sterilized by using the vapor, the hot water, or the sterilizing agent in the case where the first sterilizer 62 of the water sterilizer 60, for example, is sterilized, but this is not a limitation. For example, in the case where the first sterilizer 62, for example, is vulnerable to heat and/or has low chemical resistance, the first sterilizer 62, for example, may be sterilized by using sterilized water. In this case, the sterilized water may be the water that is sterilized by using the ultraviolet rays in, for example, the first sterilizer 62. The control unit 90 may cause the sterilized water to circulate through the circulation system 59A (see, for example, FIG. 2A) that includes the water sterilizer 60 and may consequently cause the first sterilizer 62, for example, to be sterilized. At this time, the control unit 90 may cause the sterilized water to circulate through the circulation system 59A at least three times or more, preferably 10 times or more.

Figure 21:
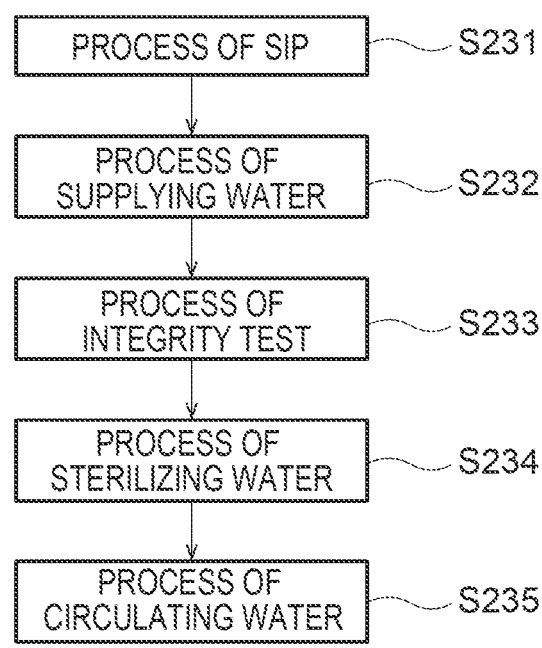
FIG. 21 is a flowchart illustrating a second modification to the method of sterilizing the content-filling system according to an embodiment.

According to the present modification, the first sterile filter 63 and the second sterile filter 65 are first sterilized (SIP) (the process of SIP, a symbol S231 in FIG. 21). In this case, the foreign-material removal filter 61 is preferably sterilized (SIP) by using vapor in advance.

Subsequently, the water is supplied to the circulation system 59A that includes the water sterilizer 60 (a process of supplying the water, a symbol S232 in FIG. 21). At this time, the pump P1 first conveys pure water. At this time, the pure water the temperature of which is adjusted to a predetermined temperature (for example, 25° C.) by using, for example, a heat exchanger (not illustrated) is supplied to, for example, the first sterile filter 63. Consequently, the membrane of, for example, the first sterile filter 63 is moistened. Subsequently, the pump P1 is stopped.

Subsequently, the integrity test (a process of the integrity test, a symbol S233 in FIG. 21) is conducted for the first sterile filter 63 and the second sterile filter 65. During the integrity test, the valve (not illustrated) near, for example, the first sterile filter 63 is closed, and sterile air is supplied to, for example, the first sterile filter 63. The sterile air that is supplied to, for example, the first sterile filter 63 is gradually compressed, and the value of the bubble point of, for example, the first sterile filter 63 is measured. Subsequently, whether the first sterile filter 63, for example, is perfect (whether the sterile air does not leak at predetermined pressure) is checked by using the value of the bubble point that is measured multiple times (for example, three times). In the case where it is determined that the first sterile filter 63, for example, is not perfect during the integrity test, the first sterile filter 63, for example, is replaced.

Subsequently, the water is sterilized in, for example, the first sterilizer 62 (a process of sterilizing the water, a symbol S234 in FIG. 21). At this time, the pump P1 first conveys the pure water. After the first sterilizer 62, for example, is filled with the water, the first ultraviolet lamp 67a, for example, radiates the ultraviolet rays to the water. In this case, the irradiation time (the time for sterilization) for which the ultraviolet rays are radiated is preferably 10 seconds or more and 30 minutes or less. At this time, the irradiance of the ultraviolet rays that are radiated from, for example, the first ultraviolet lamp 67a may be checked. In the case where the irradiance of the ultraviolet rays that are radiated from, for example, the first ultraviolet lamp 67a, is abnormal, the first ultraviolet lamp 67a, for example, may be replaced.

An intermediate-pressure mercury lamp operates roughly at a temperature of 600° C. or more and 900° C. or less. For this reason, in the case where the first ultraviolet lamp 67a, for example, is an intermediate-pressure mercury lamp, the ultraviolet rays are preferably radiated to the water while the pump P1 conveys the water. This can inhibit the first ultraviolet lamp 67a, for example, from excessively generating heat. At this time, the water to which the ultraviolet rays are radiated may be stored in, for example, the second water tank 52. Alternatively, the water to which the ultraviolet rays are radiated may be circulated in the circulation system 59A. In the case where the water to which the ultraviolet rays are radiated is circulated in the circulation system 59A, the sterilizing effect on the water can be improved.

A low-pressure mercury lamp operates roughly at a temperature of 40° C. or more and 100° C. or less. For this reason, in the case where the first ultraviolet lamp 67a, for example, is a low-pressure mercury lamp, the ultraviolet rays may be radiated to the water with the pump P1 stopped.

Subsequently, the sterilized water is circulated through the circulation system 59A that includes the water sterilizer 60 (a process of circulating the water, a symbol S235 in FIG. 21). At this time, the water to which the ultraviolet rays are radiated passes through the second sterile filter 65. The pure water that passes through the second sterile filter 65 is supplied to the first water tank 51 via the circulation line 59. In this way, the sterilized pure water circulates in the circulation system 59A.

Subsequently, the sterilized water may be circulated through the circulation system 59A at least three time or more, preferably 10 times or more. Since the pure water is thus circulated in the circulation system 59A three times or more, the sterilizing effect of the water on, for example, the first sterilizer 62 can be improved. At this time, the cumulative irradiation amount of the ultraviolet rays to the circulating sterilized water is preferably at least 100 mJ/cm$^2$ or more and 3000 mJ/cm$^2$ or less, more preferably 1000 mJ/cm$^2$ or more and 3000 mJ/cm$^2$ or less. When the cumulative irradiation amount of the ultraviolet rays to the circulating water is 100 mJ/cm$^2$ or more, the sterilizing effect of the ultraviolet rays on the water can be improved. When the cumulative irradiation amount of the ultraviolet rays is 3000 mJ/cm$^2$ or less, power consumption can be reduced, and the amount of carbon dioxide that is discharged by the content-filling system 10 can be decreased.

In this way, the first sterilizer 62, for example, is sterilized.

The first sterilizer 62, for example, may be sterilized by using, for example, detergent. In this case, the detergent may be supplied to only the first sterilizer 62 and the second sterilizer 64, and the first sterilizer 62, for example, may be consequently sterilized. Examples of the detergent may include detergent that contains peracetic acid and may include hydrogen peroxide, an alkali chemical, an acid chemical, and sodium hypochlorite. Subsequently, the sterile water may be supplied from the second water tank 52 that stores the sterile water in advance to the circulation system 59A, and the first sterilizer 62, for example, may be consequently rinsed by using the sterile water.

According to the present modification, the control unit 90 causes the sterilized water to circulate through the circulation system 59A that includes the water sterilizer 60 and consequently causes the first sterilizer 62 to be sterilized. The first sterilizer 62 is thus sterilized without using vapor, hot water, and heated sterilizing agent. This enables the amount of carbon dioxide that is discharged by the content-filling system 10 to be decreased and enables the costs when the water sterilizer 60 is sterilized to be reduced.

According to the present modification, the ultraviolet rays sterilize the water in the first sterilizer 62. This enables the amount of carbon dioxide that is discharged by the content-filling system to be decreased, unlike the case where the water is sterilized by being heated.

Multiple components disclosed in the embodiments and the modifications described above can be appropriately combined as needed. Some components may be removed from all of the components disclosed in the embodiments and the modifications described above.

The invention claimed is:

1. A content-filling system comprising:
a water sterilization line that sterilizes water;
an undiluted-solution sterilization line that sterilizes a product undiluted solution;
a water-filling device that is connected to the water sterilization line and is disposed in a first sterile chamber;
an undiluted-solution-filling device that is connected to the undiluted-solution sterilization line and is disposed in a second sterile chamber; and
a control unit that controls the water-filling device and the undiluted-solution-filling device;
wherein the control unit causes the inside of the second sterile chamber to be cleaned with the inside of the first sterile chamber kept sterile, and
wherein the control unit causes the inside of the second sterile chamber to be sterilized with the inside of the first sterile chamber kept sterile.

2. The content-filling system according to claim 1, wherein the pressure in the first sterile chamber is higher than the pressure in the second sterile chamber.

3. The content-filling system according to claim 1, wherein when the inside of the second sterile chamber is cleaned and sterilized, the pressure in the first sterile chamber is 40 Pa or more and 100 Pa or less, and the pressure in the second sterile chamber is 0 Pa or more and 20 Pa or less.

4. The content-filling system according to claim 1, wherein when the undiluted-solution-filling device is cleaned and sterilized, the pressure in the first sterile chamber is 40 Pa or more and 100 Pa or less, and the pressure in the second sterile chamber is 0 Pa or more and 20 Pa or less.

5. The content-filling system according to claim 1, wherein a third sterile chamber that couples the first sterile chamber and the second sterile chamber with each other is disposed between the first sterile chamber and the second sterile chamber, and wherein the pressure in the third sterile chamber is lower than the pressure in the first sterile chamber and equal to or more than the pressure in the second sterile chamber.

6. The content-filling system according to claim 5, wherein when the inside of the second sterile chamber is cleaned and sterilized, the pressure in the third sterile chamber is 10 Pa or more and 40 Pa or less.

7. The content-filling system according to claim 5, wherein when the undiluted-solution-filling device is cleaned and sterilized, the pressure in the third sterile chamber is 10 Pa or more and 40 Pa or less.

8. The content-filling system according to claim 1, wherein a fourth sterile chamber is disposed upstream of the first sterile chamber, and
wherein the pressure in the fourth sterile chamber is equal to or lower than the pressure in the first sterile chamber.

9. The content-filling system according to claim 8, wherein when the inside of the second sterile chamber is cleaned and sterilized, the pressure in the fourth sterile chamber is 10 Pa or more and 40 Pa or less.

10. The content-filling system according to claim 8, wherein when the undiluted-solution-filling device is cleaned and sterilized, the pressure in the fourth sterile chamber is 10 Pa or more and 40 Pa or less.

11. The content-filling system according to claim 1, wherein a bypass line that connects the water sterilization line and the second sterile chamber to each other is disposed at the water sterilization line.

12. The content-filling system according to claim 11, wherein when the inside of the second sterile chamber is cleaned, the control unit causes the water that is sterilized by the water sterilization line to be supplied to the second sterile chamber via the bypass line.

13. The content-filling system according to claim 11, wherein when the undiluted-solution-filling device is cleaned, the control unit causes the water that is sterilized by the water sterilization line to be supplied to the second sterile chamber via the bypass line.

14. The content-filling system according to claim 1, wherein the control unit determines the amount of the water that is used to clean and sterilize the content-filling system and determines the amount of the water that is sterilized by the water sterilization line while the product bottles are manufactured, based on the determined amount of the water.

15. A content-filling system comprising:
a water sterilization line that sterilizes water;
an undiluted-solution sterilization line that sterilizes a product undiluted solution;
a water-filling device that is connected to the water sterilization line and is disposed in a first sterile chamber;
an undiluted-solution-filling device that is connected to the undiluted-solution sterilization line and is disposed in a second sterile chamber; and
a control unit that controls the water-filling device and the undiluted-solution-filling device;
wherein the control unit causes the undiluted-solution-filling device to be cleaned with the inside of the first sterile chamber kept sterile, and
wherein the control unit causes the undiluted-solution-filling device to be sterilized with the inside of the first sterile chamber kept sterile.

16. A sterilizing method of sterilizing a content-filling system,
the content-filling system comprising:
a water sterilization line that sterilizes water;
an undiluted-solution sterilization line that sterilizes a product undiluted solution;
a water-filling device that is connected to the water sterilization line and is disposed in a first sterile chamber; and
an undiluted-solution-filling device that is connected to the undiluted-solution sterilization line and is disposed in a second sterile chamber;
wherein the sterilizing method comprising:
a step of cleaning the inside of the second sterile chamber with the inside of the first sterile chamber kept sterile, and
a step of sterilizing the inside of the second sterile chamber with the inside of the first sterile chamber kept sterile.

17. A sterilizing method of sterilizing a content-filling system,
the content-filling system comprising: a water sterilization line that sterilizes water;
an undiluted-solution sterilization line that sterilizes a product undiluted solution;
a water-filling device that is connected to the water sterilization line and is disposed in a first sterile chamber; and
an undiluted-solution-filling device that is connected to the undiluted-solution sterilization line and is disposed in a second sterile chamber;
wherein the sterilizing method comprising:
a step of cleaning the undiluted-solution-filling device with the inside of the first sterile chamber kept sterile, and
a step of sterilizing the undiluted-solution-filling device with the inside of the first sterile chamber kept sterile.

* * * * *